(12) United States Patent
Huang et al.

(10) Patent No.: US 11,477,843 B2
(45) Date of Patent: Oct. 18, 2022

(54) METHOD AND APPARATUS FOR HANDLING A DRX TIMER FOR BUNDLE OF A CONFIGURED UPLINK GRANT IN A WIRELESS COMMUNICATION SYSTEM

(71) Applicant: ASUSTek Computer Inc., Taipei (TW)

(72) Inventors: Yi-Hsuan Huang, Taipei (TW); Meng-Hui Ou, Taipei (TW); Li-Chih Tseng, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 17/367,775

(22) Filed: Jul. 6, 2021

(65) Prior Publication Data

US 2022/0015187 A1    Jan. 13, 2022

Related U.S. Application Data

(60) Provisional application No. 63/051,236, filed on Jul. 13, 2020, provisional application No. 63/051,214, (Continued)

(51) Int. Cl.
*H04W 76/28* (2018.01)
*H04L 1/18* (2006.01)
(Continued)

(52) U.S. Cl.
CPC ........... *H04W 76/28* (2018.02); *H04L 1/1816* (2013.01); *H04W 72/1268* (2013.01); (Continued)

(58) Field of Classification Search
CPC . H04W 76/28; H04W 72/1268; H04W 72/14; H04W 74/0808; H04W 80/02; H04L 1/1816
See application file for complete search history.

(56) References Cited

U.S. PATENT DOCUMENTS 8,489,950 B2    7/2013  Huang et al.
2007/0275657 A1*  11/2007  Chang .................. H04L 1/1854
455/9

(Continued)

FOREIGN PATENT DOCUMENTS

EP    3273633 A2    1/2018
EP    3273633 A3    5/2018
(Continued)

OTHER PUBLICATIONS

Corresponding European Patent Application No. 21183871.9, Extended European Search Report dated Nov. 24, 2021.

*Primary Examiner* — Parth Patel
(74) *Attorney, Agent, or Firm* — Cooper Legal Group LLC

(57) ABSTRACT

A method and apparatus are disclosed. In an example from the perspective of a User Equipment (UE) configured with bundled transmission, the UE initializes a configured uplink grant. The UE performs a plurality of transmissions within a bundle of a Medium Access Control Protocol Data Unit (MAC PDU) using the configured uplink grant. The UE stops a Discontinuous Reception (DRX) timer in response to a first transmission of the plurality of transmissions, wherein the DRX timer is not stopped in response to one or more second transmissions of the plurality of transmissions. When the DRX timer is running, the UE monitors a downlink control channel for an uplink grant for retransmission.

20 Claims, 16 Drawing Sheets

Related U.S. Application Data filed on Jul. 13, 2020, provisional application No. 63/051,228, filed on Jul. 13, 2020, provisional application No. 63/051,205, filed on Jul. 13, 2020.

(51) Int. Cl.
*H04W 72/12* (2009.01)
*H04W 72/14* (2009.01)
*H04W 74/08* (2009.01)
*H04W 80/02* (2009.01)

(52) U.S. Cl.
CPC ....... *H04W 72/14* (2013.01); *H04W 74/0808* (2013.01); *H04W 80/02* (2013.01)

(56) References Cited

U.S. PATENT DOCUMENTS

| | | | | |
|---|---|---|---|---|
| 2011/0305290 | A1* | 12/2011 | Kim | H04L 5/0096 375/267 |
| 2013/0242953 | A1* | 9/2013 | Malkamaki | H04W 56/0045 370/336 |
| 2014/0056243 | A1* | 2/2014 | Pelletier | H04W 72/1263 370/329 |
| 2014/0161111 | A1* | 6/2014 | Kim | H04W 56/0045 370/336 |
| 2014/0286240 | A1* | 9/2014 | Kim | H04W 76/28 370/328 |
| 2015/0189690 | A1* | 7/2015 | Lee | H04W 76/28 370/328 |
| 2015/0327323 | A1* | 11/2015 | Wang | H04W 52/0216 370/311 |
| 2016/0029317 | A1* | 1/2016 | Kim | H04W 72/0473 370/311 |
| 2016/0366682 | A1* | 12/2016 | Tseng | H04W 72/0446 |
| 2017/0318620 | A1* | 11/2017 | Tseng | H04L 1/1812 |
| 2017/0347270 | A1* | 11/2017 | Iouchi | H04W 72/0406 |
| 2018/0139772 | A1* | 5/2018 | Ozturk | H04W 52/0225 |
| 2018/0146398 | A1* | 5/2018 | Kim | H04W 80/02 |
| 2018/0302821 | A1* | 10/2018 | Gustafsson | H04W 28/04 |
| 2018/0359064 | A1* | 12/2018 | Kim | H04W 56/0015 |
| 2019/0037594 | A1* | 1/2019 | Shan | H04W 72/1289 |
| 2019/0132845 | A1* | 5/2019 | Babaei | H04W 72/042 |
| 2019/0261255 | A1* | 8/2019 | You | H04L 47/801 |
| 2019/0274077 | A1* | 9/2019 | Suzuki | H04W 74/08 |
| 2019/0373669 | A1* | 12/2019 | Dai | H04W 74/0833 |
| 2020/0015199 | A1* | 1/2020 | Singh | H04L 1/1848 |
| 2020/0154469 | A1* | 5/2020 | Chin | H04L 1/1812 |
| 2020/0177263 | A1* | 6/2020 | Zhang | H04W 74/0833 |
| 2020/0187245 | A1* | 6/2020 | Fujishiro | H04W 74/0833 |
| 2020/0245272 | A1* | 7/2020 | Hong | H04W 4/40 |
| 2020/0260377 | A1* | 8/2020 | Jin | H04W 52/0216 |
| 2020/0275376 | A1* | 8/2020 | Lee | H04L 1/1812 |
| 2020/0344835 | A1* | 10/2020 | Wang | H04W 72/0413 |
| 2020/0351026 | A1* | 11/2020 | Babaei | H04L 1/1822 |
| 2021/0105096 | A1* | 4/2021 | Chin | H04L 1/1812 |
| 2021/0212099 | A1* | 7/2021 | Yi | H04W 72/042 |
| 2021/0266953 | A1* | 8/2021 | Pelletier | H04W 72/14 |
| 2021/0266954 | A1* | 8/2021 | Xu | H04L 1/1822 |
| 2022/0007399 | A1* | 1/2022 | Rastegardoost | H04L 1/1896 |
| 2022/0053346 | A1* | 2/2022 | Zhang | H04L 69/40 |

FOREIGN PATENT DOCUMENTS

| | | |
|---|---|---|
| WO | 2009132236 A2 | 10/2009 |
| WO | 2018058056 A1 | 3/2018 |

\* cited by examiner

METHOD AND APPARATUS FOR HANDLING A DRX TIMER FOR BUNDLE OF A CONFIGURED UPLINK GRANT IN A WIRELESS COMMUNICATION SYSTEM

CROSS-REFERENCE TO RELATED APPLICATIONS

The present Application claims the benefit of U.S. Provisional Patent Application Ser. No. 63/051,205 filed on Jul. 13, 2020, the entire disclosure of which is incorporated herein in its entirety by reference. The present Application also claims the benefit of U.S. Provisional Patent Application Ser. No. 63/051,214 filed on Jul. 13, 2020, the entire disclosure of which is incorporated herein in its entirety by reference. The present Application also claims the benefit of U.S. Provisional Patent Application Ser. No. 63/051,228 filed on Jul. 13, 2020, the entire disclosure of which is incorporated herein in its entirety by reference. The present Application also claims the benefit of U.S. Provisional Patent Application Ser. No. 63/051,236 filed on Jul. 13, 2020, the entire disclosure of which is incorporated herein in its entirety by reference.

FIELD

This disclosure generally relates to wireless communication networks, and more particularly, to a method and apparatus for handling a Discontinuous Reception (DRX) timer for a bundle of a configured uplink grant in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example from the perspective of a User Equipment (UE) configured with bundled transmission, the UE initializes a configured uplink grant. The UE performs a plurality of transmissions within a bundle of a Medium Access Control Protocol Data Unit (MAC PDU) using the configured uplink grant. The UE stops a Discontinuous Reception (DRX) timer in response to a first transmission of the plurality of transmissions, wherein the DRX timer is not stopped in response to one or more second transmissions of the plurality of transmissions. When the DRX timer is running, the UE monitors a downlink control channel for an uplink grant for retransmission.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), $3^{rd}$ Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio) wireless access for 5G, or some other modulation techniques.

In particular, the exemplary wireless communication systems devices described below may be designed to support one or more standards such as the standard offered by a consortium named "3rd Generation Partnership Project" referred to herein as 3GPP, including: 3GPP TS 38.331 V16.0.0, "NR, RRC protocol specification"; 3GPP TS 38.321 V16.0.0, "NR, MAC protocol specification"; 3GPP TS 38.214 V16.1.0, "NR, Physical layer procedures for data"; RP-193238, "New SID on support of reduced capability NR devices"; R2-2003875, "Corrections of NR operating with shared spectrum channel access in 38.321". The standards and documents listed above are hereby expressly incorporated by reference in their entirety.

Figure 1:
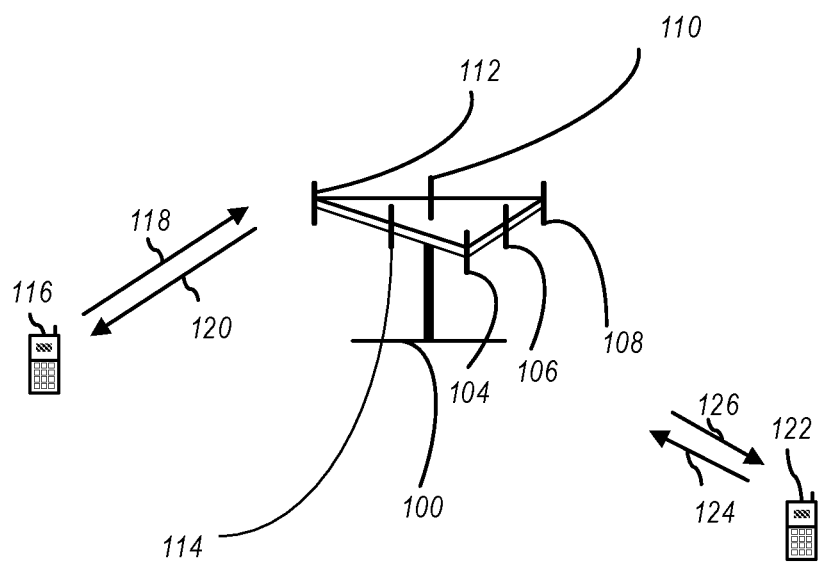
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to its access terminals.

An access network (AN) may be a fixed station or base station used for communicating with the terminals and may also be referred to as an access point, a Node B, a base station, an enhanced base station, an eNodeB (eNB), a Next Generation NodeB (gNB), or some other terminology. An access terminal (AT) may also be called user equipment (UE), a wireless communication device, terminal, access terminal or some other terminology.

Figure 2:
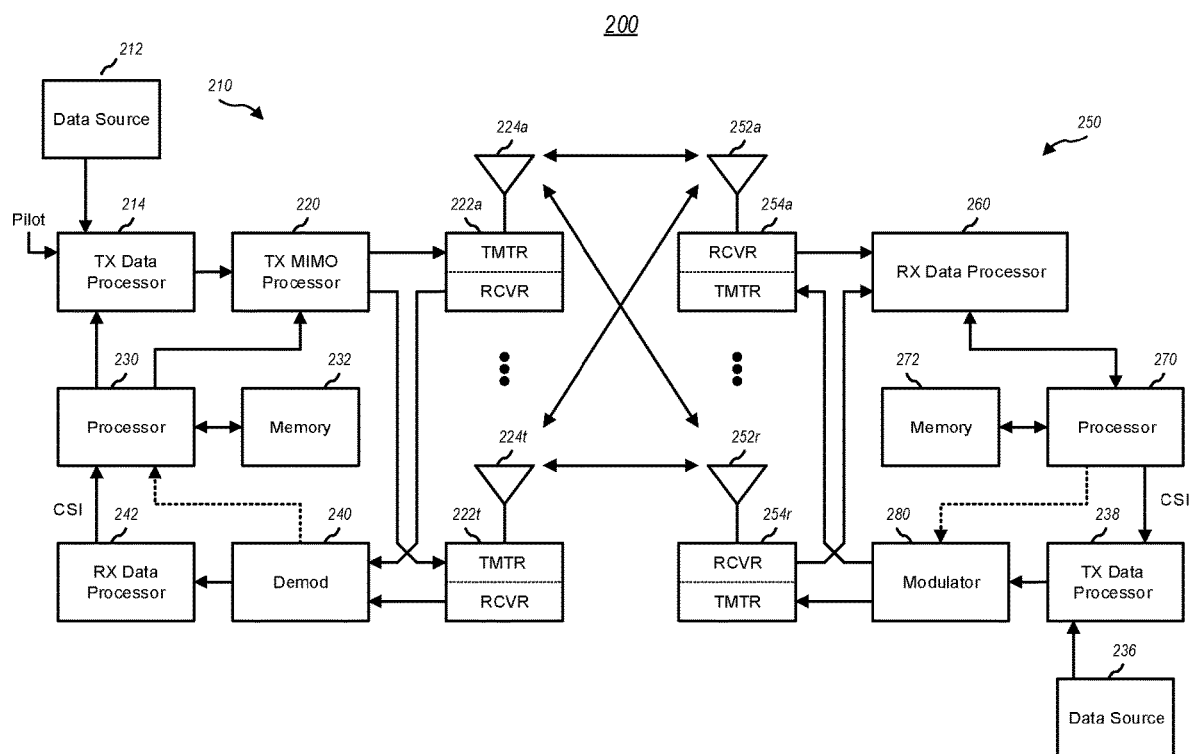
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using orthogonal frequency-division multiplexing (OFDM) techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222a through 222t may then be transmitted from $N_T$ antennas 224a through 224t, respectively.

At receiver system 250, the transmitted modulated signals are received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further process the samples to provide a corresponding "received" symbol stream.

An RX data processor 260 then receives and/or processes the $N_R$ received symbol streams from $N_R$ receivers 254 based on a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which pre-coding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights and may then process the extracted message.

Figure 3:
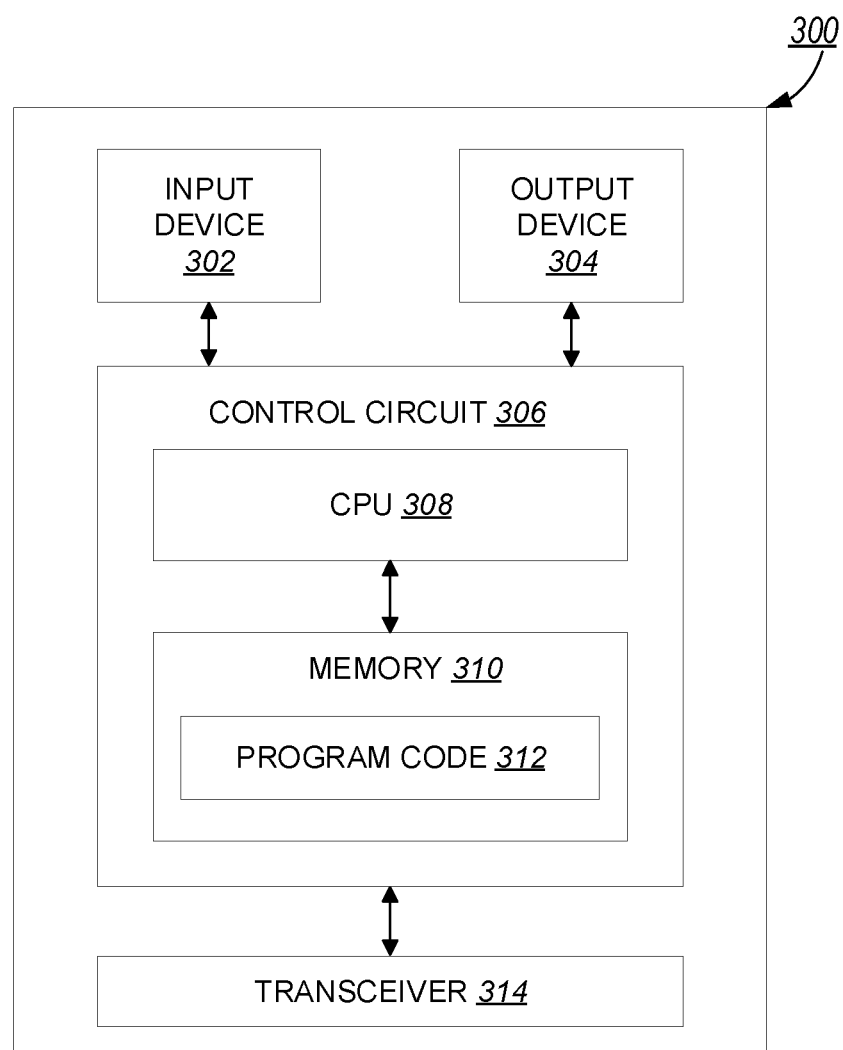
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system may be the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
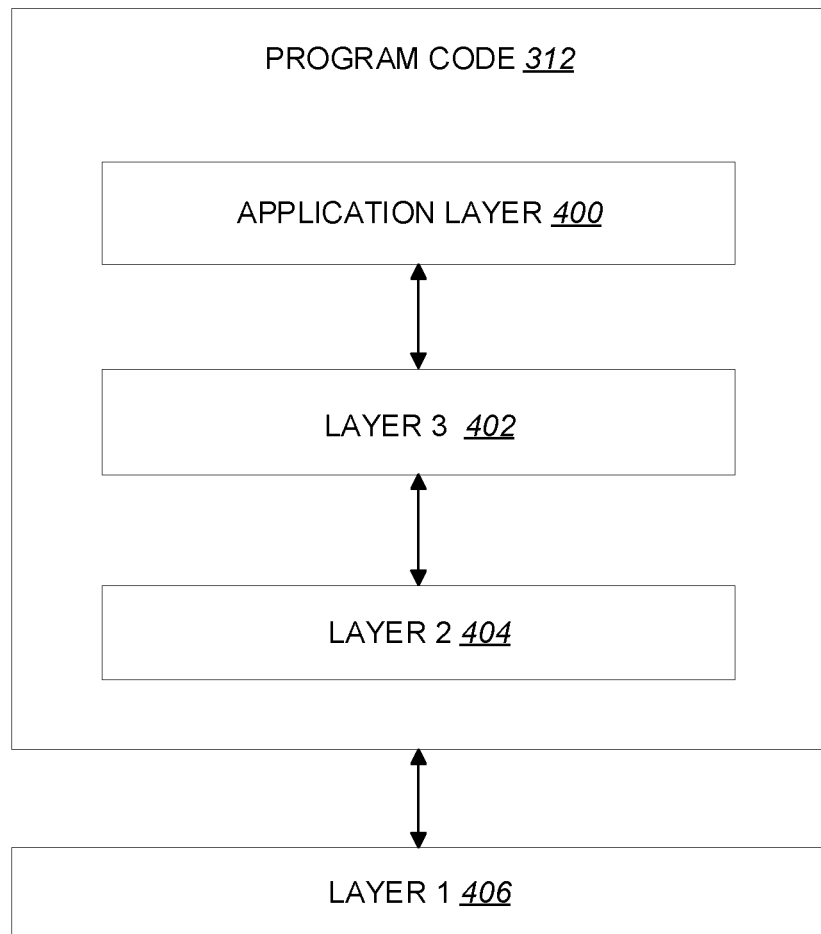
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

Configurations for configured uplink grant including bundled transmission may be provided by Radio Resource Control (RRC), such as specified in 3GPP TS 38.331 V16.0.0, one or more parts of which are quoted below:

ConfiguredGrantConfig

The IE ConfiguredGrantConfig is used to configure uplink transmission without dynamic grant according to two possible schemes. The actual uplink grant may either be configured via RRC (type1) or provided via the PDCCH (addressed to CS-RNTI) (type2). Multiple Configured Grant configurations may be configured in one BWP of a serving cell.

ConfiguredGrantConfig information element

```
-- ASN1START
-- TAG-CONFIGUREDGRANTCONFIG-START
ConfiguredGrantConfig ::=                SEQUENCE {
    frequencyHopping                     ENUMERATED {intraSlot,
intraSlot}                                                  OPTIONAL, -- Need S
    cg-DMRS-Configuration                DMRS-UplinkConfig,
    mcs-Table                            ENUMERATED {qam256,
qam64LowSE}                                                 OPTIONAL, --
Need S
    mcs-TableTransformPrecoder           ENUMERATED {qam256,
qam64LowSE}                                                 OPTIONAL, --
Need S
    uci-OnPUSCH                          SetupRelease { CG-UCI-OnPUSCH
}                                                           OPTIONAL, -- Need M
    resourceAllocation                   ENUMERATED {
resourceAllocationType0, resourceAllocationType1, dynamicSwitch },
    rbg-Size                             ENUMERATED {config2}
OPTIONAL, -- Need S
    powerControlLoopToUse                ENUMERATED {n0, n1},
    p0-PUSCH-Alpha                       P0-PUSCH-AlphaSetId,
    transformPrecoder                    ENUMERATED {enabled, disabled}
OPTIONAL, -- Need S
    nrofHARQ-Processes                   INTEGER(1..16),
    repK                                 ENUMERATED {n1, n2, n4, n8},
    repK-RV                              ENUMERATED {s1-0231, s2-0303,
s3-0000}                                                    OPTIONAL, -- Need R
    periodicity                          ENUMERATED {
                                            sym2, sym7, sym1x14,
sym2x14, sym4x14, sym5x14, sym8x14, sym10x14, sym16x14, sym20x14,
                                            sym32x14, sym40x14,
sym64x14, sym80x14, sym128x14, sym160x14, sym256x14, sym320x14,
sym512x14,
                                            sym640x14, sym1024x14,
sym1280x14, sym2560x14, sym5120x14,
                                            sym6, sym1x12,
sym2x12, sym4x12, sym5x12, sym8x12, sym10x12, sym16x12, sym20x12,
sym32x12,
                                            sym40x12, sym64x12,
sym80x12, sym128x12, sym160x12, sym256x12, sym320x12, sym512x12,
sym640x12,
                                            sym1280x12, sym2560x12
    },
    configuredGrantTimer                 INTEGER (1..64)
OPTIONAL, -- Need R
    rrc-ConfiguredUplinkGrant            SEQUENCE {
        timeDomainOffset                     INTEGER (0..5119),
        timeDomainAllocation                 INTEGER (0..15),
        frequencyDomainAllocation            BIT STRING (SIZE(18)),
        antennaPort                          INTEGER (0..31),
        dmrs-SeqInitialization               INTEGER (0..1),
OPTIONAL, -- Need R
        precodingAndNumberOfLayers           INTEGER (0..63),
        srs-ResourceIndicator                INTEGER (0..15)
OPTIONAL, -- Need R
```

| ConfiguredGrantConfig information element |
|---|
| ```
    mcsAndTBS                           INTEGER (0..31),
    frequencyHoppingOffset              INTEGER (1..
maxNrofPhysicalResourceBlocks-1)        OPTIONAL, -- Need
R
    pathlossReferenceIndex              INTEGER
(0..maxNrofPUSCH-PathlossReferenceRSs-1),
    ...,
    [[
    pusch-RepTypeIndicator-r16          ENUMERATED {pusch-
RepTypeA,pusch-RepTypeB}                OPTIONAL, -- Need
M
    frequencyHoppingPUSCH-RepTypeB-r16  ENUMERATED
{interRepetition, interSlot}            OPTIONAL, -- Cond
RepTypeB
    timeReferenceSFN-r16                ENUMERATED {sfn512}
OPTIONAL -- Need R
    ]]
    }
OPTIONAL, -- Need R
    ...,
    [[
    cg-RetransmissionTimer-r16          INTEGER (1..64)
OPTIONAL, -- Need R
    cg-minDFI-Delay-r16                 INTEGER (1..ffsValue)
OPTIONAL, -- Need R Upper limit 7 FFS
    cg-nrofPUSCH-InSlot-r16             INTEGER (1..ffsValue)
OPTIONAL, -- Need R
    cg-nrofSlots-r16                    INTEGER (1..ffsValue)
OPTIONAL, -- Need R
    cg-StartingFullBW-InsideCOT-r16     ENUMERATED {ffs}
OPTIONAL,-- Need R
    cg-StartingFullBW-OutsideCOT-r16    ENUMERATED {ffs}
OPTIONAL, -- Need R
    cg-StartingPartialBW-InsideCOT-r16  ENUMERATED {ffs}
OPTIONAL, -- Need R
    cg-StartingPartialBW-OutsideCOT-r16 ENUMERATED {ffs}
OPTIONAL, -- Need R
    cg-UCI-Multiplexing                 ENUMERATED {enabled}
OPTIONAL, -- Need R
    cg-COT-SharingOffset-r16            INTEGER (1..ffsValue)
OPTIONAL, -- Need R
    betaOffsetCG-UCI-r16                INTEGER (1..ffsValue)
OPTIONAL, -- Need R
    cg-COT-SharingList-r16              SEQUENCE (SIZE
(1..ffsValue)) OF CG-COT-Sharing-r16 OPTIONAL, -- Need R
    harq-ProcID-Offset-r16              INTEGER (0..15)
OPTIONAL, -- Need M
    harq-ProcID-Offset2-r16             INTEGER (0..15)
OPTIONAL, -- Need M
    configuredGrantConfigIndex-r16
ConfiguredGrantConfigIndex-r16                     OPTIONAL, --
Need M
    configuredGrantConfigIndexMAC-r16
ConfiguredGrantConfigIndexMAC-r16                  OPTIONAL, --
Need M
    periodicityExt-r16                  INTEGER (1..5120)
OPTIONAL, -- Need M
    startingFromRV0-r16                 ENUMERATED {on, off}
OPTIONAL, -- Need M
    phy-PriorityIndex-r16               ENUMERATED {p0, p1}
OPTIONAL, -- Need M
    autonomousReTx-r16                  ENUMERATED {enabled}
OPTIONAL -- Cond LCH-BasedPrioritization
    ]]
}
...
-- TAG-CONFIGUREDGRANTCONFIG-STOP
-- ASN1STOP
``` |

| ConfiguredGrantConfig field descriptions |
|---|
| antennaPort |
| Indicates the antenna port(s) to be used for this configuration, and the maximum bitwidth is 5. See TS 38.214 [19], clause 6.1.2, and TS 38.212 [17], clause 7.3.1. |
| autonomousReTx |
| If this field is present, the Configured Grant configuration is configured with autonomous retransmission, see TS 38.321 [3].<br>Editor's Note: The name autonomousReTx needs to be confirmed. |
| cg-DMRS-Configuration |
| DMRS configuration (see TS 38.214 [19], clause 6.1.2.3). |
| cg-nrofPUSCH-InSlot |
| Indicates the number of consecutive PUSCH configured to CG within a slot where the SLIV indicating the first PUSCH and additional PUSCH appended with the same length (see TS 38.214 [19], clause 6.1.2.3). |
| cg-nrofSlots |
| Indicates the number of allocated slots in a configured grant periodicity following the time instance of configured grant offset (see TS 38.214 [19], clause 6.1.2.3). |
| cg-Retransmission Timer |
| Indicates the initial value of the configured retransmission timer (see TS 38.321 [3]) in multiples of periodicity. The value of cg-Retransmission Timer is always less than the value of configuredGrantTimer. This IE is always configured for configured grants on operation with shared spectrum channel access. |
| cg-StartingFullBW-InsideCOT |
| A set of configured grant PUSCH transmission starting offsets which indicates the length of a CP extension of the first symbol that is located before the configured resource when frequency domain resource allocation includes all interlaces in the allocated RB set(s) and the CG PUSCH resource is inside gNB COT (see TS 38.214 [19], clause 6.1.2.3). |
| cg-StartingFullBW-OutsideCOT |
| A set of configured grant PUSCH transmission starting offsets which indicates the length of a CP extension of the first symbol that is located before the configured resource when frequency domain resource allocation includes all interlaces in the allocated RB set(s) and the CG PUSCH resource is outside gNB COT (see TS 38.214 [19], clause 6.1.2.3). |
| cg-StartingPartialBW-InsideCOT |
| A set of configured grant PUSCH transmission starting offsets which indicates the length of a CP extension of the first symbol that is located before the configured resource when frequency domain resource allocation does not include all interlaces in the allocated RB set(s) and the CG PUSCH resource is inside gNB COT (see TS 38.214 [19], clause 6.1.2.3). |
| cg-StartingPartialBW-OutsideCOT |
| A set of configured grant PUSCH transmission starting offsets which indicates the length of a CP extension of the first symbol that is located before the configured resource when frequency domain resource allocation does not include all interlaces in the allocated RB set(s) and the CG PUSCH resource is outside gNB COT (see TS 38.214 [19], clause 6.1.2.3). |
| cg-UCI-Multiplexing |
| When configured, in the case of PUCCH overlapping with CG-PUSCH(s) within a PUCCH group, the CG-UCI and HARQ-ACK are jointly encoded (CG-UCI is treated as the same type as a HARQ-ACK). When not configured, In the case of PUCCH overlapping with CG-PUSCH(s) within a PUCCH group and PUCCH carries HARQ ACK feedback, configured grant PUSCH is skipped (see TS 38.214 [19], clause 6.3.2.1.4). |
| channelAccessPriority |
| Indicates the Channel Access Priority Class that the gNB can assume when sharing the UE initiated COT (see 37.213 [48], clause 4.1.3). |
| configuredGrantConfigIndex |
| Indicates the index of the Configured Grant configurations within the BWP. |
| configuredGrantConfigIndexMAC |
| Indicates the index of the Configured Grant configurations within the MAC entity. |
| configuredGrantTimer |
| Indicates the initial value of the configured grant timer (see TS 38.321 [3]) in multiples of periodicity. When cg-RetransmissonTimer is configured, if HARQ processes are shared among different configured grants on the same BWP, configuredGrantTimer is set to the same value for all of configurations on this BWP. |
| dmrs-SeqInitialization |
| The network configures this field if transformPrecoder is disabled. Otherwise the field is absent. |
| frequencyDomainAllocation |

-continued

| ConfiguredGrantConfig field descriptions |
|---|
| Indicates the frequency domain resource allocation, see TS 38.214 [19], clause 6.1.2, and TS 38.212 [17], clause 7.3.1).<br>frequencyHopping |
| The value intraSlot enables 'Intra-slot frequency hopping' and the value interSlot enables 'Inter-slot frequency hopping'. If the field is absent, frequency hopping is not configured. The field frequencyHopping refers to configured grant for 'pusch-RepTypeA' (see TS 38.214 [19], clause 6.3.1).<br>frequencyHoppingOffset |
| Frequency hopping offset used when frequency hopping is enabled (see TS 38.214 [19], clause 6.1.2 and clause 6.3).<br>frequencyHoppingPUSCH-RepTypeB |
| Indicates the frequency hopping scheme for Type 1 CG when pusch-RepTypeIndicator is set to 'pusch-RepTypeB' (see TS 38.214 [19], clause 6.1). The value interRepetition enables 'Inter-repetition frequency hopping', and the value interSlot enables 'Inter-slot frequency hopping'. If the field is absent, the frequency hopping is not enabled for Type 1 CG.<br>Editor's note: FFS on intraRepetition for frequency hopping for PUSCH repetition type B.<br>Editor's note: FFS on CG Type 2 for frequency hopping indication.<br>harq-ProcID-Offset |
| For operation with shared spectrum channel access, this configures the range of HARQ process IDs which can be used for this configured grant where the UE can select a HARQ process ID within [harq-procID-offset, . . . , (harq-procID-offset + nrofHARQ-Processes − 1)].<br>harq-ProcID-Offset2 |
| Indicates the offset used in deriving the HARQ process IDs, see TS 38.321 [3], clause 5.4.1.<br>mcs-Table |
| Indicates the MCS table the UE shall use for PUSCH without transform precoding. If the field is absent the UE applies the value qam64.<br>mcs-TableTransformPrecoder |
| Indicates the MCS table the UE shall use for PUSCH with transform precoding. If the field is absent the UE applies the value qam64.<br>mcsAndTBS |
| The modulation order, target code rate and TB size (see TS 38.214 [19], clause 6.1.2). The NW does not configure the values 28~31 in this version of the specification.<br>nrofHARQ-Processes |
| The number of HARQ processes configured. It applies for both Type 1 and Type 2. See TS 38.321 [3], clause 5.4.1.<br>p0-PUSCH-Alpha |
| Index of the P0-PUSCH-AlphaSet to be used for this configuration.<br>periodicity |
| Periodicity for UL transmission without UL grant for type 1 and type 2 (see TS 38.321 [3], clause 5.8.2).<br>The following periodicities are supported depending on the configured subcarrier spacing [symbols]:<br>15 kHz: 2, 7, n * 14, where n = {1, 2, 4, 5, 8, 10, 16, 20, 32, 40, 64, 80, 128, 160, 320, 640}<br>30 kHz: 2, 7, n * 14, where n = {1, 2, 4, 5, 8, 10, 16, 20, 32, 40, 64, 80, 128, 160, 256, 320, 640, 1280}<br>60 kHz with normal CP 2, 7, n * 14, where n = {1, 2, 4, 5, 8, 10, 16, 20, 32, 40, 64, 80, 128, 160, 256, 320, 512, 640, 1280, 2560}<br>60 kHz with ECP: 2, 6, n * 12, where n = {1, 2, 4, 5, 8, 10, 16, 20, 32, 40, 64, 80, 128, 160, 256, 320, 512, 640, 1280, 2560}<br>120 kHz: 2, 7, n * 14, where n = {1, 2, 4, 5, 8, 10, 16, 20, 32, 40, 64, 80, 128, 160, 256, 320, 512, 640, 1024, 1280, 2560, 5120}<br>periodicityExt |
| This field is used to calculate the periodicity for UL transmission without UL grant for type 1 and type 2 (see TS 38.321 [3], clause 5,8.2). If this field is present, the field periodicity is ignored.<br>The following periodicites are supported depending on the configured subcarrier spacing [symbols]:<br>15 kHz: periodicityExt * 14, where periodicityExt has a value between 1 and 640.<br>30 kHz: periodicityExt * 14, where periodicityExt has a value between 1 and 1280.<br>60 kHz with normal CP: periodicityExt * 14, where periodicityExt has a value between 1 and 2560. |

ConfiguredGrantConfig field descriptions 60 kHz with ECP: periodicityExt * 12, where periodicityExt has a value between 1 and 2560.
120 kHz: periodicityExt * 14, where periodicityExt has a value between 1 and 5120.

phy-PriorityIndex

Indicates the PHY priority of CG PUSCH at least for PHY-layer collision handling. Value p0 indicates low priority and value p1 indicates high priority.

powerControlLoopToUse

Closed control loop to apply (see TS 38.213 [13], clause 7.1.1).

pusch-RepTypeIndicator

Indicates whether UE follows the behavior for PUSCH repetition type A or the behavior for PUSCH repetition type B for each Type 1 configured grant configuration. The value pusch-RepTypeA enables the 'PUSCH repetition type A' and the value pusch-RepTypeB enables the 'PUSCH repetition type B' (see TS 38.214 [19], clause 6.1.2.3).

rbg-Size

Selection between configuration 1 and configuration 2 for RBG size for PUSCH. The UE does not apply this field if resourceAllocation is set to resourceAllocationType1. Otherwise, the UE applies the value config1 when the field is absent. Note: rbg-Size is used when the transformPrecoder parameter is disabled.

repK-RV

The redundancy version (RV) sequence to use. See TS 38.214 [19], clause 6.1.2. The network configures this field if repetitions are used, i.e., if repK is set to n2, n4 or n8. Otherwise, the field is absent.

repK

The number of repetitions of K.

resourceAllocation

Configuration of resource allocation type 0 and resource allocation type 1. For Type 1 UL data transmission without grant, resourceAllocation should be resourceAllocationType0 or resourceAllocationType1.

rrc-ConfiguredUplinkGrant

Configuration for "configured grant" transmission with fully RRC-configured UL grant (Type1). If this field is absent the UE uses UL grant configured by DCI addressed to CS-RNTI (Type2). Type 1 configured grant may be configured for UL or SUL, but not for both simultaneously.

srs-ResourceIndicator

Indicates the SRS resource to be used.

startingFromRV0

This field is used to determine the initial transmission occasion of a transport block for a given RV sequence, see TS 38.214 [19], clause 6.1.2.3.1.

timeDomainAllocation

Indicates a combination of start symbol and length and PUSCH mapping type, see TS 38.214 [19], clause 6.1.2 and TS 38.212 [17], clause 7.3.1.

timeDomainOffset

Offset related to the reference SFN indicated by timeReferenceSFN, see TS 38.321 [3], clause 5.8.2. If the field timeReferenceSFN is not present, the reference SFN is 0.

timeReferenceSFN

Indicates SFN used for determination of the offset of a resource in time domain. The UE uses the closest SFN with the indicated number preceding the reception of the configured grant configuration, see TS 38.321 [3], clause 5.8.2.

transformPrecoder

Enables or disables transform precoding for type1 and type2. If the field is absent, the UE enables or disables transform precoding in accordance with the field msg3-transformPrecoder in RACH-ConfigCommon, see TS 38.214 [19], clause 6.1.3.

| Conditional Presence | Explanation |
|---|---|
| LCH-BasedPrioritization | This fiels is optionally present, Need R, if Ich-BasedPrioritization is configured in the MAC entity. It is absent otherwise. |
| RepTypeB | The field is optionally present if pusch-RepTypeIndicator is set to pusch-RepTypeB, Need S, and absent otherwise. |

PUSCH-TimeDomainResourceAllocationListNew

The IE PUSCH-TimeDomainResourceAllocationList-New is used to configure a time domain relation between PDCCH and PUSCH for DCI format 01/0-2. PUSCH-TimeDomainResourceAllocationListNew contains one or more of such PUSCH-TimeDomainResourceAllocation-New. The network indicates in the UL grant which of the configured time domain allocations the UE shall apply for that UL grant. The UE determines the bit width of the DCI field based on the number of entries in the PUSCH-TimeDomainResourceAllocationListNew. Value 0 in the DCI field refers to the first element in this list, value 1 in the DCI field refers to the second element in this list, and so on.

PUSCH-TimeDomainResourceAllocationNew information element

```
-- ASN1START
-- TAG-PUSCH-TIMEDOMAINRESOURCEALLOCATIONLISTNEW-START
PUSCH-TimeDomainResourceAllocationListNew-r16 ::= SEQUENCE
(SIZE(1..maxNrofUL-Allocations-r16)) OF PUSCH-
TimeDomainResourceAllocationNew-r16
PUSCH-TimeDomainResourceAllocationNew-r16 ::= SEQUENCE {
  ...
  numberOfRepetitions-r16                ENUMERATED {n1, n2,
n4, n7, n12, n16},
  ...
}
-- TAG-PUSCH-TIMEDOMAINRESOURCEALLOCATIONLISTNEW-STOP
-- ASN1STOP
```

PUSCH-TimeDomainResourceAllocationListNew field descriptions numberOfRepetitions Configure the number of repetitions for DCI format 0_1/0_2 (see TS 38.214 [19], clause 6.1.2.1).
Editor's note: FFS on 3, 6, 8 for numberOfRepetitions.

Uplink transmission procedure is specified in 3GPP TS 38.321 V16.0.0, one or more parts of which are quoted below:
5.4 UL-SCH Data Transfer
5.4.1 UL Grant Reception Uplink grant is either received dynamically on the PDCCH, in a Random Access Response, configured semi-persistently by RRC or determined to be associated with the PUSCH resource of MSGA as specified in clause 5.1.2a. The MAC entity shall have an uplink grant to transmit on the UL-SCH. To perform the requested transmissions, the MAC layer receives HARQ information from lower layers. An uplink grant addressed to CS-RNTI with NDI=0 is considered as a configured uplink grant. An uplink grant addressed to CS-RNTI with NDI=1 is considered as a dynamic uplink grant.

If the MAC entity has a C-RNTI, a Temporary C-RNTI, or CS-RNTI, the MAC entity shall for each PDCCH occasion and for each Serving Cell belonging to a TAG that has a running timeAlignmentTimer and for each grant received for this PDCCH occasion:

. . .
1> else if an uplink grant for this PDCCH occasion has been received for this Serving Cell on the PDCCH for the MAC entity's CS-RNTI:
  2> if the NDI in the received HARQ information is 1:
    3> consider the NDI for the corresponding HARQ process not to have been toggled;
    3> start or restart the configuredGrantTimer for the corresponding HARQ process, if configured;
    3> stop the cg-RetransmissionTimer for the corresponding HARQ process, if running;
    3> deliver the uplink grant and the associated HARQ information to the HARQ entity.
  2> else if the NDI in the received HARQ information is 0:
    3> if PDCCH contents indicate configured grant Type 2 deactivation:
      4> trigger configured uplink grant confirmation.
    3> else if PDCCH contents indicate configured grant Type 2 activation:

4> trigger configured uplink grant confirmation;
4> store the uplink grant for this Serving Cell and the associated HARQ information as configured uplink grant;
4> initialise or re-initialise the configured uplink grant for this Serving Cell to start in the associated PUSCH duration and to recur according to rules in clause 5.8.2;
4> stop the configuredGrantTimer for the corresponding HARQ process, if running;
4> stop the cg-RetransmissionTimer for the corresponding HARQ process, if running For each Serving Cell and each configured uplink grant, if configured and activated, the MAC entity shall:
1> if the MAC entity is configured with lch-basedPrioritization; or
1> if the PUSCH duration of the configured uplink grant does not overlap with the PUSCH duration of an uplink grant received on the PDCCH or in a Random Access Response for this Serving Cell or with a transmission of MSGA payload:
2> set the HARQ Process ID to the HARQ Process ID associated with this PUSCH duration;
2> if, for the corresponding HARQ process, the configuredGrantTimer is not running and cg-RetransmissionTimer is not configured (i.e. new transmission):
3> consider the NDI bit for the corresponding HARQ process to have been toggled;
3> deliver the configured uplink grant and the associated HARQ information to the HARQ entity.
2> else if the cg-RetransmissionTimer for the corresponding HARQ process is configured and not running, then for the corresponding HARQ process:
3> if the configuredGrantTimer is not running, and the HARQ process is not pending (i.e. new transmission):
4> consider the NDI bit to have been toggled;
4> deliver the configured uplink grant and the associated HARQ information to the HARQ entity.
3> else if the previous uplink grant delivered to the HARQ entity for the same HARQ process was a configured uplink grant (i.e. retransmission on configured grant):
4> deliver the configured uplink grant and the associated HARQ information to the HARQ entity.

Editor's Note: It is FFS whether SR/data prioritization can be a separate configurable parameter from data/data prioritization.

For configured uplink grants neither configured with harq-ProcID-Offset2 nor with cg-RetransmissionTimer, the HARQ Process ID associated with the first symbol of a UL transmission is derived from the following equation:

HARQ Process $ID=[floor(CURRENT\_symbol/periodicity)]$ modulo nrofHARQ-Processes For configured uplink grants with harq-ProcID-Offset2, the HARQ Process ID associated with the first symbol of a UL transmission is derived from the following equation:

HARQ Process $ID=[floor(CURRENT\_symbol/periodicity)]$ modulo nrofHARQ-Processes+harq-ProcID-Offset2 where CURRENT_symbol=(SFN×numberOfSlotsPerFrame×numberOfSymbolsPerSlot+slot number in the frame×numberOfSymbolsPerSlot+symbol number in the slot), and numberOfSlotsPerFrame and numberOfSymbolsPerSlot refer to the number of consecutive slots per frame and the number of consecutive symbols per slot, respectively as specified in TS 38.211 [8].

For configured uplink grants configured with cg-RetransmissionTimer, the UE implementation select an HARQ Process ID among the HARQ process IDs available for the configured grant configuration. The UE shall prioritize retransmissions before initial transmissions. The UE shall toggle the NDI in the CG-UCI for new transmissions and not toggle the NDI in the CG-UCI in retransmissions.

NOTE 1: CURRENT_symbol refers to the symbol index of the first transmission occasion of a repetition bundle that takes place.

NOTE 2: A HARQ process is configured for a configured uplink grant where harq-ProcID-Offset2 is not configured, if the configured uplink grant is activated and the associated HARQ process ID is less than nrofHARQ-Processes. A HARQ process is configured for a configured uplink grant where harq-ProcID-Offset2 is configured, if the configured uplink grant is activated and the associated HARQ process ID is greater than or equal to harq-ProcID-Offset2 and less than sum of harq-ProcID-Offset2 and nrofHARQ-Processes for the configured grant configuration.

NOTE 3: If the MAC entity receives a grant in a Random Access Response (i.e. MAC RAR or fallbackRAR) or determines a grant as specified in clause 5.1.2a for MSGA payload and if the MAC entity also receives an overlapping grant for its C-RNTI or CS-RNTI, requiring concurrent transmissions on the SpCell, the MAC entity may choose to continue with either the grant for its RA-RNTI/MSGB-RNTI/the MSGA payload transmission or the grant for its C-RNTI or CS-RNTI.

NOTE 4: In case of unaligned SFN across carriers in a cell group, the SFN of the concerned Serving Cell is used to calculate the HARQ Process ID used for configured uplink grants.

NOTE 5: A HARQ process is not shared between different configured grant configurations.

For the MAC entity configured with lch-basedPrioritization, priority of an uplink grant is determined by the highest priority among priorities of the logical channels with data available that are multiplexed or can be multiplexed in the MAC PDU, according to the mapping restrictions as described in clause 5.4.3.1.2.

Editor's Note: Priority determination considering MAC CE is FFS.

When the MAC entity is configured, with lch-basedPrioritization, for each uplink grant which is not already a de-prioritized uplink grant:
1> if this uplink grant is addressed to CS-RNTI with NDI=1 or C-RNTI:
2> if there is no overlapping PUSCH duration of a configured uplink grant, in the same BWP whose priority is higher than the priority of the uplink grant; and
2> if there is no overlapping PUCCH resource with an SR transmission where the priority of the logical channel that triggered the SR is higher than the priority of the uplink grant:
3> this uplink grant is a prioritized uplink grant;
3> the other overlapping uplink grant(s), if any, is a de-prioritized uplink grant.

1> else if this uplink grant is a configured uplink grant:
  2> if there is no overlapping PUSCH duration of another configured uplink grant, in the same BWP, whose priority is higher than the priority of the uplink grant; and
  2> if there is no overlapping PUSCH duration of an uplink grant addressed to CS-RNTI with NDI=1 or C-RNTI, in the same BWP, whose priority is higher than or equal to the priority of the uplink grant; and
  2> if there is no overlapping PUCCH resource with an SR transmission where the priority of the logical channel that triggered the SR is higher than the priority of the uplink grant:
    3> this uplink grant is a prioritized uplink grant;
    3> the other overlapping uplink grant(s), if any, is a de-prioritized uplink grant.
  NOTE 6: If there is overlapping PUSCH duration of at least two configured uplink grants whose priorities are equal, the prioritized uplink grant is determined by UE implementation.

5.4.2 HARQ Operation
5.4.2.1 HARQ Entity

The MAC entity includes a HARQ entity for each Serving Cell with configured uplink (including the case when it is configured with supplementaryUplink), which maintains a number of parallel HARQ processes.

The number of parallel UL HARQ processes per HARQ entity is specified in TS 38.214 [7].

Each HARQ process supports one TB.

Each HARQ process is associated with a HARQ process identifier. For UL transmission with UL grant in RA Response or for UL transmission for MSGA payload, HARQ process identifier 0 is used.

NOTE: When a single DCI is used to schedule multiple PUSCH, the UE is allowed to map generated TB(s) internally to different HARQ processes in case of LBT failure(s), i.e. UE may transmit a new TB on any HARQ process in the grants that have the same TBS, the same RV and the NDIs indicate new transmission.

The number of transmissions of a TB within a bundle of the dynamic grant or configured grant is given by REPETITION_NUMBER as follows:

For a dynamic grant, REPETITION_NUMBER is set to a value provided by lower layers, as specified in clause 6.1.2.1 of TS 38.214 [7];

For a configured grant, REPETITION_NUMBER is set to a value provided by lower layers, as specified in clause 6.1.2.3 of TS 38.214 [7].

If REPETITION_NUMBER>1, after the initial transmission, REPETITION_NUMBER−1 HARQ retransmissions follow within a bundle. For both dynamic grant and configured uplink grant, bundling operation relies on the HARQ entity for invoking the same HARQ process for each transmission that is part of the same bundle. Within a bundle, HARQ retransmissions are triggered without waiting for feedback from previous transmission according to REPETITION_NUMBER for a dynamic grant or configured uplink grant. Each transmission within a bundle is a separate uplink grant after the initial uplink grant within a bundle is delivered to the HARQ entity.

For each transmission within a bundle of the dynamic grant, the sequence of redundancy versions is determined according to clause 6.1.2.1 of TS 38.214 [7]. For each transmission within a bundle of the configured uplink grant, the sequence of redundancy versions is determined according to clause 6.1.2.3 of TS 38.214 [7].

For configured uplink grants configured with cg-Retransmission Timer, the redundancy version zero is used for initial transmissions and UE implementation selects redundancy version for retransmissions.

For each uplink grant, the HARQ entity shall:
1> identify the HARQ process associated with this grant, and for each identified HARQ process:
  2> if the received grant was not addressed to a Temporary C-RNTI on PDCCH, and the NDI provided in the associated HARQ information has been toggled compared to the value in the previous transmission of this TB of this HARQ process; or
. . .
  2> if the uplink grant is part of a bundle of the configured uplink grant, and may be used for initial transmission according to clause 6.1.2.3 of TS 38.214 [7], and if no MAC PDU has been obtained for this bundle:
    3> if there is a MAC PDU in the MSGA buffer and the uplink grant determined as specified in clause 5.1.2a for the transmission of the MSGA payload was selected:
      4> obtain the MAC PDU to transmit from the MsgA buffer.
    3> else if there is a MAC PDU in the Msg3 buffer and the uplink grant was received in a fallback-RAR:
      4> obtain the MAC PDU to transmit from the Msg3 buffer.
    3> else if there is a MAC PDU in the Msg3 buffer and the uplink grant was received in a MAC RAR; or:
    3> if there is a MAC PDU in the Msg3 buffer and the uplink grant was received on PDCCH for the C-RNTI in ra-Response Window and this PDCCH successfully completed the Random Access procedure initiated for beam failure recovery:
      4> obtain the MAC PDU to transmit from the Msg3 buffer.
      4> if the uplink grant size does not match with size of the obtained MAC PDU; and
      4> if the Random Access procedure was successfully completed upon receiving the uplink grant:
        5> indicate to the Multiplexing and assembly entity to include MAC subPDU(s) carrying MAC SDU from the obtained MAC PDU in the subsequent uplink transmission;
        5> obtain the MAC PDU to transmit from the Multiplexing and assembly entity.
    3> else if this uplink grant is a configured grant which is a prioritized uplink grant; and
    3> if the configured grant is configured with autonomousReTx; and
    3> if the previous configured uplink grant for this HARQ process was de-prioritized; and
    3> if a MAC PDU had already been obtained for this HARQ process; and
    3> if a transmission of the obtained MAC PDU has not been performed:
      4> consider the MAC PDU has been obtained.
    3> else if the MAC entity is not configured with lch-basedPrioritization; or
    3> if this uplink grant is a prioritized uplink grant:
      4> obtain the MAC PDU to transmit from the Multiplexing and assembly entity, if any;

3> if a MAC PDU to transmit has been obtained:
  4> deliver the MAC PDU and the uplink grant and the HARQ information of the TB to the identified HARQ process;
  4> instruct the identified HARQ process to trigger a new transmission;
  4> if the uplink grant is a configured uplink grant:
    5> start or restart the configuredGrantTimer, if configured, for the corresponding HARQ process when the transmission is performed;
    5> start or restart the cg-RetransmissionTimer, if configured, for the corresponding HARQ process when the transmission is performed.
. . .
2> else (i.e. retransmission):
. . .
  3> else:
    4> deliver the uplink grant and the HARQ information (redundancy version) of the TB to the identified HARQ process;
    4> instruct the identified HARQ process to trigger a retransmission;
    4> if the uplink grant is addressed to CS-RNTI; or
    4> if the uplink grant is addressed to C-RNTI, and the identified HARQ process is configured for a configured uplink grant:
      5> start or restart the configuredGrantTimer, if configured, for the corresponding HARQ process when the transmission is performed.
    4> if the uplink grant is a configured uplink grant:
      5> if the identified HARQ process is pending:
        6> start or restart the configuredGrantTimer for the corresponding HARQ process when the transmission is performed;
        5> start or restart the cg-RetransmissionTimer, if configured, for the corresponding HARQ process when the transmission is performed.
    4> if the identified HARQ process is pending and the transmission is performed:
      5> consider the identified HARQ process as not pending.

When determining if NDI has been toggled compared to the value in the previous transmission the MAC entity shall ignore NDI received in all uplink grants on PDCCH for its Temporary C-RNTI.

Editor's Note: How to fix "HARQ buffer is flushed when the autonomous (re)transmission is deprioritized again" is FFS.

5.4.2.2 HARQ Process

Each HARQ process is associated with a HARQ buffer.
. . . When cg-RetransmissionTimer is configured and the HARQ entity obtains a MAC PDU to transmit, the corresponding HARQ process is considered to be pending. A pending HARQ process is pending until a transmission is performed on that HARQ process or until the HARQ process is flushed.

If the HARQ entity requests a new transmission for a TB, the HARQ process shall:
1> store the MAC PDU in the associated HARQ buffer;
1> store the uplink grant received from the HARQ entity;
1> generate a transmission as described below.

If the HARQ entity requests a retransmission for a TB, the HARQ process shall:
1> store the uplink grant received from the HARQ entity;
1> generate a transmission as described below.

To generate a transmission for a TB, the HARQ process shall:
1> if the MAC PDU was obtained from the Msg3 buffer; or
1> if the MAC PDU was obtained from the MSGA buffer; or
1> if there is no measurement gap at the time of the transmission and, in case of retransmission, the retransmission does not collide with a transmission for a MAC PDU obtained from the Msg3 buffer or the MSGA buffer:
. . .
  3> instruct the physical layer to generate a transmission according to the stored uplink grant.

If a HARQ process receives downlink feedback information, the HARQ process shall:
1> stop the cg-RetransmissionTimer, if running;
1> if acknowledgment is indicated:
  2> stop the configuredGrantTimer, if running If the configuredGrantTimer expires for a HARQ process, the HARQ process shall:
1> stop the cg-RetransmissionTimer, if running 5.8.2 Uplink There are three types of transmission without dynamic grant:
configured grant Type 1 where an uplink grant is provided by RRC, and stored as configured uplink grant;
configured grant Type 2 where an uplink grant is provided by PDCCH, and stored or cleared as configured uplink grant based on L1 signaling indicating configured uplink grant activation or deactivation;
retransmissions on a stored configured uplink grant of Type 1 or Type 2 configured with cg-RetransmissionTimer.

Type 1 and Type 2 are configured by RRC per Serving Cell and per BWP. Multiple configurations can be active simultaneously in the same BWP. For Type 2, activation and deactivation are independent among the Serving Cells. For the same BWP, the MAC entity can be configured with both Type 1 and Type 2. RRC configures the following parameters when the configured grant Type 1 is configured:
cs-RNTI: CS-RNTI for retransmission;
periodicity: periodicity of the configured grant Type 1;
timeDomainOffset: Offset of a resource with respect to SFN=timeReferenceSFN in time domain;
timeDomainAllocation: Allocation of configured uplink grant in time domain which contains startSymbolAndLength (i.e. SLIV in TS 38.214 [7]);
nrofHARQ-Processes: the number of HARQ processes for configured grant;
harq-ProcID-Offset: offset of HARQ process for configured grant for operation with shared spectrum channel access;
harq-ProcID-Offset2: offset of HARQ process for configured grant;
timeReferenceSFN: SFN used for determination of the offset of a resource in time domain. The UE uses the closest SFN with the indicated number preceding the reception of the configured grant configuration.

RRC configures the following parameters when the configured grant Type 2 is configured:
cs-RNTI: CS-RNTI for activation, deactivation, and retransmission;
periodicity: periodicity of the configured grant Type 2;
nrofHARQ-Processes: the number of HARQ processes for configured grant;
harq-ProcID-Offset: offset of HARQ process for configured grant for operation with shared spectrum channel access;

harq-ProcID-Offset2: offset of HARQ process for configured grant.

RRC configures the following parameters when retransmissions on configured uplink grant is configured:

cg-RetransmissionTimer: the duration after a configured grant (re)transmission of a HARQ process when the UE shall not autonomously retransmit that HARQ process.

Upon configuration of a configured grant Type 1 for a Serving Cell by upper layers, the MAC entity shall:

1> store the uplink grant provided by upper layers as a configured uplink grant for the indicated Serving Cell;

1> initialise or re-initialise the configured uplink grant to start in the symbol according to timeDomainOffset and S (derived from SLIV as specified in TS 38.214 [7]), and to reoccur with periodicity.

After an uplink grant is configured for a configured grant Type 1, the MAC entity shall consider sequentially that the $N^{th}$ uplink grant occurs in the symbol for which:

[($SFN$×numberOfSlotsPerFrame×numberOfSymbolsPerSlot)+(slot number in the frame×numberOfSymbolsPerSlot)+symbol number in the slot]=(timeReferenceSFN×numberOfSlotsPerFrame×numberOfSymbolsPerSlot+timeDomainOffset×numberOfSymbolsPerSlot+$S$+$N$×periodicity)modulo(1024×numberOfSlotsPerFrame×numberOfSymbolsPerSlot).

Editor's Note: The step of determining the closest N needs to be added.

After an uplink grant is configured for a configured grant Type 2, the MAC entity shall consider sequentially that the $N^{th}$ uplink grant occurs in the symbol for which:

[($SFN$×numberOfSlotsPerFrame×numberOfSymbolsPerSlot)+(slot number in the frame×numberOfSymbolsPerSlot)+symbol number in the slot]=[$SFN_{start\ time}$×numberOfSlotsPerFrame×numberOfSymbolsPerSlot+$slot_{start\ time}$×numberOfSymbolsPerSlot+$symbol_{start\ time}$)+$N$×periodicity]modulo(1024×numberOfSlotsPerFrame×numberOfSymbolsPerSlot).

where $SFN_{start\ time}$, $slot_{start\ time}$, and $symbol_{start\ time}$ are the SFN, slot, and symbol, respectively, of the first transmission opportunity of PUSCH where the configured uplink grant was (re-)initialised.

NOTE: In case of unaligned SFN across carriers in a cell group, the SFN of the concerned Serving Cell is used to calculate the occurrences of configured uplink grants.

When the configured uplink grant is released by upper layers, all the corresponding configurations shall be released and all corresponding uplink grants shall be cleared.

The MAC entity shall:

1> if at least one configured uplink grant confirmation has been triggered and not canceled; and 1> if the MAC entity has UL resources allocated for new transmission:

2> if the MAC entity is configured with configuredGrantConfigList:

3> instruct the Multiplexing and Assembly procedure to generate a Multiple Entry Configured Grant Confirmation MAC CE as defined in clause 6.1.3.31.

2> else:

3> instruct the Multiplexing and Assembly procedure to generate a Configured Grant Confirmation MAC CE as defined in clause 6.1.3.7.

2> cancel the triggered configured uplink grant confirmation.

For a configured grant Type 2, the MAC entity shall clear the configured uplink grant(s) immediately after first transmission of Configured Grant Confirmation MAC CE or Multiple Entry Configured Grant Confirmation MAC CE which confirms the configured uplink grant deactivation.

Retransmissions are done by:
repetition of configured uplink grants; or
receiving uplink grants addressed to CS-RNTI; or
retransmission on configured uplink grants.

A repetition number for a bundle of a configured uplink grant, and one or more possible initial transmission occasions in a bundle of a configured uplink grant indicated by (e.g., decided by) redundancy version (RV) are specified in 3GPP TS 38.214 V16.1.0, one or more parts of which are quoted below:

6.1.2.3 Resource Allocation for Uplink Transmission with Configured Grant

... For PUSCH transmissions with a Type 1 or Type 2 configured grant, the number of (nominal) repetitions K to be applied to the transmitted transport block is provided by the indexed row in the time domain resource allocation table if numberofrepetitions is present in the table; otherwise K is provided by the higher layer configured parameters repK.

...

6.1.2.3.1 Transport Block Repetition for Uplink Transmissions of PUSCH Repetition Type A with a Configured Grant The procedures described in this clause apply to PUSCH transmissions of PUSCH repetition Type A with a Type 1 or Type 2 configured grant.

The higher layer parameter repK-RV defines the redundancy version pattern to be applied to the repetitions. If the parameter repK-RV is not provided in the configuredGrantConfig, the redundancy version for uplink transmissions with a configured grant shall be set to 0. Otherwise, for the nth transmission occasion among K repetitions, n=1, 2, ..., K, it is associated with $(mod(n-1,4)+1)^{th}$ value in the configured RV sequence. If a configured grant configuration is configured with Configuredgrantconfig-StartingfromRV0 set to 'off', the initial transmission of a transport block may only start at the first transmission occasion of the K repetitions. Otherwise, the initial transmission of a transport block may start at the first transmission occasion of the K repetitions if the configured RV sequence is {0,2,3,1}, any of the transmission occasions of the K repetitions that are associated with RV=0 if the configured RV sequence is {0,3,0,3}, any of the transmission occasions of the K repetitions if the configured RV sequence is {0,0,0,0}, except the last transmission occasion when K≥8.

For any RV sequence, the repetitions shall be terminated after transmitting K repetitions, or at the last transmission occasion among the K repetitions within the period P, or from the starting symbol of the repetition that overlaps with a PUSCH with the same HARQ process scheduled by DCI format 0_0, 0_1 or 0_2, whichever is reached first. In addition, the UE shall terminate the repetition of a transport block in a PUSCH transmission if the UE receives a DCI format 0_1 with DFI flag provided and set to '1', and if in this DCI the UE detects ACK for the HARQ process corresponding to that transport block.

The UE is not expected to be configured with the time duration for the transmission of K repetitions larger than the time duration derived by the periodicity P. If the UE determines that, for a transmission occasion, the number of symbols available for the PUSCH transmission in a slot is smaller than transmission duration L, the UE does not transmit the PUSCH in the transmission occasion.

For both Type 1 and Type 2 PUSCH transmissions with a configured grant, when K>1, the UE shall repeat the TB across the K consecutive slots applying the same symbol allocation in each slot, except if the UE is provided with higher layer parameters cg-nrofSlots-r16 and cg-nrof-PUSCH-InSlot-r16, in which case the UE repeats the TB in the repK earliest consecutive transmission occasion candidates within the same configuration. A Type 1 or Type 2 PUSCH transmission with a configured grant in a slot is omitted according to the conditions in Clause 11.1 of [6, TS38.213].

Configurations for discontinuous reception (DRX) operation may be provided by RRC, such as specified in 3GPP TS 38.331 V16.0.0, one or more parts of which are quoted below:

DRX-Config

The IE DRX-Config is used to configure DRX related parameters.

| DRX-Config information element |
|---|
| -- ASN1START |
| -- TAG-DRX-CONFIG-START |
| DRX-Config ::=                    SEQUENCE { |
| ... |
|    drx-HARQ-RTT-TimerUL         INTEGER (0..56), |
|    drx-RetransmissionTimerDL    ENUMERATED { |
|       s10, s11, s12, s14, s16, s18, s116, s124, s133, s140, s164, s180, s196, s1112, s1128, s1160, s1320, spare15, spare14, spare13, spare12, spare11, spare10, spare9, spare8, spare7, spare6, spare5, spare4, spare3, spare2, spare1}, |
|    drx-RetransmissionTimerUL    ENUMERATED { |
|       s10, s11, s12, s14, s16, s18, s116, s124, s133, s140, s164, s180, s196, s1112, s1128, s1160, s1320, spare15, spare14, spare13, spare12, spare11, spare10, spare9, spare8, spare7, spare6, spare5, spare4, spare3, spare2, spare1 }, |
| ... |
| } |
| -- TAG-DRX-CONFIG-STOP |
| -- ASN1STOP |

| DRX-Config field descriptions |
|---|
| drx-HARQ-RTT-TimerUL |
| Value in number of symbols of the BWP where the transport block was transmitted. |
| drx-RetransmissionTimerUL |
| Value in number of slot lengths of the BWP where the transport block was transmitted. s/0 corresponds to 0 slots, s/1 corresponds to 1 slot, s/2 corresponds to 2 slots, and so on. |

DRX operation is specified in 3GPP TS 38.321 V16.0.0, one or more parts of which are quoted below:

5.7 Discontinuous Reception (DRX)

The MAC entity may be configured by RRC with a DRX functionality that controls the UE's PDCCH monitoring activity for the MAC entity's C-RNTI, CI-RNTI, CS-RNTI, INT-RNTI, SFI-RNTI, SP-CSI-RNTI, TPC-PUCCH-RNTI, TPC-PUSCH-RNTI, and TPC-SRS-RNTI. When using DRX operation, the MAC entity shall also monitor PDCCH according to requirements found in other clauses of this specification. When in RRC_CONNECTED, if DRX is configured, for all the activated Serving Cells, the MAC entity may monitor the PDCCH discontinuously using the DRX operation specified in this clause; otherwise the MAC entity shall monitor the PDCCH as specified in TS 38.213 [6].

RRC controls DRX operation by configuring the following parameters:

drx-onDurationTimer: the duration at the beginning of a DRX Cycle;

drx-SlotOffset: the delay before starting the drx-onDurationTimer;

drx-InactivityTimer: the duration after the PDCCH occasion in which a PDCCH indicates a new UL or DL transmission for the MAC entity;

drx-RetransmissionTimerDL (per DL HARQ process except for the broadcast process): the maximum duration until a DL retransmission is received;

drx-RetransmissionTimerUL (per UL HARQ process): the maximum duration until a grant for UL retransmission is received;

drx-LongCycleStartOffset: the Long DRX cycle and drx-StartOffset which defines the subframe where the Long and Short DRX Cycle starts;

drx-ShortCycle (optional): the Short DRX cycle;

drx-ShortCycleTimer (optional): the duration the UE shall follow the Short DRX cycle;

drx-HARQ-RTT-TimerDL (per DL HARQ process except for the broadcast process): the minimum duration before a DL assignment for HARQ retransmission is expected by the MAC entity;

drx-HARQ-RTT-TimerUL (per UL HARQ process): the minimum duration before a UL HARQ retransmission grant is expected by the MAC entity;

. . . When a DRX cycle is configured, the Active Time includes the time while:

drx-onDurationTimer or drx-InactivityTimer or drx-RetransmissionTimerDL or drx-RetransmissionTimerUL or ra-ContentionResolutionTimer (as described in clause 5.1.5) is running; or a Scheduling Request is sent on PUCCH and is pending (as described in clause 5.4.4); or a PDCCH indicating a new transmission addressed to the C-RNTI of the MAC entity has not been received after successful reception of a Random Access Response for the Random Access Preamble not selected by the MAC entity among the contention-based Random Access Preamble (as described in clause 5.1.4).

When DRX is configured, the MAC entity shall:

. . .

1> if a MAC PDU is transmitted in a configured uplink grant:

2> start the drx-HARQ-RTT-TimerUL for the corresponding HARQ process in the first symbol after the end of the first repetition of the corresponding PUSCH transmission;

2> stop the drx-RetransmissionTimerUL for the corresponding HARQ process.
. . .
1> if a drx-HARQ-RTT-TimerUL expires:
  2> start the drx-RetransmissionTimerUL for the corresponding HARQ process in the first symbol after the expiry of drx-HARQ-RTT-TimerUL.
1> if a DRX Command MAC CE or a Long DRX Command MAC CE is received:
  2> stop drx-onDurationTimer;
  2> stop drx-InactivityTimer.
1> if drx-InactivityTimer expires or a DRX Command MAC CE is received:
  2> if the Short DRX cycle is configured:
    3> start or restart drx-ShortCycleTimer in the first symbol after the expiry of drx-InactivityTimer or in the first symbol after the end of DRX Command MAC CE reception;
    3> use the Short DRX Cycle.
  2> else:
    3> use the Long DRX cycle.
1> if drx-ShortCycleTimer expires:
  2> use the Long DRX cycle.
1> if a Long DRX Command MAC CE is received:
  2> stop drx-ShortCycleTimer;
  2> use the Long DRX cycle.
1> if the Short DRX Cycle is used, and [(SFN×10)+subframe number]modulo (drx-ShortCycle)=(drx-StartOffset) modulo (drx-ShortCycle):
  2> start drx-onDurationTimer after drx-SlotOffset from the beginning of the subframe.
1> if the Long DRX Cycle is used, and [(SFN×10)+subframe number]modulo (drx-LongCycle)=drx-StartOffset:
. . .
  2> else:
    3> start drx-onDurationTimer after drx-SlotOffset from the beginning of the subframe.

NOTE 1: In case of unaligned SFN across carriers in a cell group, the SFN of the SpCell is used to calculate the DRX duration.
1> if the MAC entity is in Active Time:
  2> monitor the PDCCH as specified in TS 38.213 [6];
. . .
  2> if the PDCCH indicates a UL transmission:
    3> start the drx-HARQ-RTT-TimerUL for the corresponding HARQ process in the first symbol after the end of the first repetition of the corresponding PUSCH transmission, regardless of LBT failure indication from lower layers;
    3> stop the drx-RetransmissionTimerUL for the corresponding HARQ process.
  2> if the PDCCH indicates a new transmission (DL or UL):
    3> start or restart drx-InactivityTimer in the first symbol after the end of the PDCCH reception.
. . .
Regardless of whether the MAC entity is monitoring PDCCH or not, the MAC entity transmits HARQ feedback, aperiodic CSI on PUSCH, and aperiodic SRS defined in TS 38.214 [7] when such is expected.

The MAC entity needs not to monitor the PDCCH if it is not a complete PDCCH occasion (e.g. the Active Time starts or ends in the middle of a PDCCH occasion).

Configurations for a serving cell including Secondary Cell (SCell) deactivation timer and the Bandwidth part (BWP) inactivity timer may be provided by RRC, such as specified in 3GPP TS 38.331 V16.0.0, one or more parts of which are quoted below:

ServingCellConfig

The IE ServingCellConfig is used to configure (add or modify) the UE with a serving cell, which may be the SpCell or an SCell of an MCG or SCG. The parameters herein are mostly UE specific but partly also cell specific (e.g. in additionally configured bandwidth parts). Reconfiguration between a PUCCH and PUCCHless SCell is only supported using an SCell release and add.

| ServingCellConfig information element |  |
| --- | --- |
| -- ASN1START |  |
| -- TAG-SERVINGCELLCONFIG-START |  |
| ServingCellConfig ::= | SEQUENCE { |
| tdd-UL-DL-ConfigurationDedicated | TDD-UL-DL-ConfigDedicated |
| OPTIONAL, -- Cond TDD |  |
| initialDownlinkBWP | BWP-DownlinkDedicated |
| OPTIONAL, -- Need M |  |
| downlinkBWP-ToReleaseList | SEQUENCE (SIZE |
| (1..maxNrofBWPs)) OF BWP-Id | OPTIONAL, -- Need N |
| downlinkBWP-ToAddModList | SEQUENCE (SIZE |
| (1..maxNrofBWPs)) OF BWP-Downlink | OPTIONAL, -- Need N |
| firstActiveDownlinkBWP-Id | BWP-Id |
| OPTIONAL, -- Cond SyncAndCellAdd |  |
| bwp-InactivityTimer | ENUMERATED {ms2, ms3, ms4, |
| ms5, ms6, ms8, ms10, ms20, ms30, |  |
|  | ms40,ms50, ms60, |
| ms80,ms100, ms200,ms300, ms500, |  |
|  | ms750, ms1280, |
| ms1920, ms2560, spare10, spare9, spare8, |  |
|  | spare7, spare6, |
| spare5, spare4, spare3, spare2, spare1 } | OPTIONAL, --Need R |
| ... |  |
| sCellDeactivationTimer | ENUMERATED {ms20, ms40, ms80, |
| ms160, ms200, ms240, |  |

-continued

| ServingCellConfig information element |
| --- |
| ms480, ms520, ms640, ms720, ms320, ms400, ms840, ms1280, spare2,spare1}      OPTIONAL, -- Cond ServingCellWithoutPUCCH<br>...<br>-- TAG-SERVINGCELLCONFIG-STOP<br>-- ASN1STOP |

| ServingCellConfig field descriptions |
| --- |
| bwp-InactivityTimer |
| The duration in ms after which the UE falls back to the default Bandwidth Part (see TS 38.321 [3], clause 5.15). When the network releases the timer configuration, the UE stops the timer without switching to the default BWP. |
| sCellDeactivation Timer |
| SCell deactivation timer in TS 38.321 [3]. If the field is absent, the UE applies the value infinity. |

Activation and deactivation operation of a SCell is specified in 3GPP TS 38.321 V16.0.0, one or more parts of which are quoted below:
5.9 Activation/Deactivation of SCells
If the MAC entity is configured with one or more SCells, the network may activate and deactivate the configured SCells. Upon configuration of an SCell, the SCell is deactivated unless the parameter sCellState is set to activated for the SCell within RRCReconfiguration message.
   The configured SCell(s) is activated and deactivated by:
   receiving the SCell Activation/Deactivation MAC CE described in clause 6.1.3.10;
   configuring sCellDeactivationTimer timer per configured SCell (except the SCell configured with PUCCH, if any): the associated SCell is deactivated upon its expiry.
The MAC entity shall for each configured SCell:
1> if an SCell is configured with sCellState is set to activated upon SCell configuration, or an SCell Activation/Deactivation MAC CE is received activating the SCell:
  2> if firstActiveDownlinkBWP-Id is not set to dormant BWP:
    3> activate the SCell according to the timing defined in TS 38.213 [6]; i.e. apply normal SCell operation including:
      4> SRS transmissions on the SCell;
      4> CSI reporting for the SCell;
      4> PDCCH monitoring on the SCell;
      4> PDCCH monitoring for the SCell;
      4> PUCCH transmissions on the SCell, if configured.
    3> if the SCell was deactivated prior to receiving this SCell Activation/Deactivation MAC CE:
      4> activate the DL BWP and UL BWP indicated by firstActiveDownlinkBWP-Id and firstActiveUplinkBWP-Id respectively;
    3> start or restart the sCellDeactivationTimer associated with the SCell according to the timing defined in TS 38.213 [6];
    3> (re-)initialize any suspended configured uplink grants of configured grant Type 1 associated with this SCell according to the stored configuration, if any, and to start in the symbol according to rules in clause 5.8.2;
    3> trigger PHR according to clause 5.4.6.
  2> else if firstActiveDownlinkBWP-Id is set to dormant BWP:
    3> stop the bwp-InactivityTimer of this Serving Cell, if running
    3> not monitor the PDCCH on the BWP;
    3> not monitor the PDCCH for the BWP;
    3> not receive DL-SCH on the BWP;
    3> perform CSI measurement for the BWP, if configured;
    3> stop all the UL behavior, i.e. stop any UL transmission, suspend any configured uplink grant Type 1 associated with the SCell, clear any configured uplink grant of configured grant Type 2 associated with the SCell;
    3> if configured, perform beam failure detection and beam failure recovery for the SCell if beam failure is detected;
    3> if the SCell was deactivated prior to receiving this SCell Activation/Deactivation MAC CE:
      4> activate the DL BWP and UL BWP indicated by firstActiveDownlinkBWP-Id and firstActiveUplinkBWP-Id respectively;
    3> else if an SCell is configured with sCellState is set to activated upon SCell configuration:
      4> activate the DL BWP and UL BWP indicated by firstActiveDownlinkBWP-Id and firstActiveUplinkBWP-Id respectively;
    3> start or restart the sCellDeactivationTimer associated with the SCell according to the timing defined in TS 38.213 [6].
1> else if an SCell Activation/Deactivation MAC CE is received deactivating the SCell; or
1> if the sCellDeactivationTimer associated with the activated SCell expires:
  2> deactivate the SCell according to the timing defined in TS 38.213 [6];
  2> stop the sCellDeactivationTimer associated with the SCell;

2> stop the bwp-InactivityTimer associated with the SCell;
2> deactivate any active BWP associated with the SCell;
2> clear any configured downlink assignment and any configured uplink grant Type 2 associated with the SCell respectively;
2> clear any PUSCH resource for semi-persistent CSI reporting associated with the SCell;
2> suspend any configured uplink grant Type 1 associated with the SCell;
2> cancel all the triggered BFRs (see clause 5.17) for this Serving Cell;
2> flush all HARQ buffers associated with the SCell;
2> cancel, if any, triggered consistent LBT failure for the SCell.
1> if PDCCH on the activated SCell indicates an uplink grant or downlink assignment; or
1> if PDCCH on the Serving Cell scheduling the activated SCell indicates an uplink grant or a downlink assignment for the activated SCell; or
1> if a MAC PDU is transmitted in a configured uplink grant or received in a configured downlink assignment:
2> restart the sCellDeactivationTimer associated with the SCell.

Uplink BWP operation is specified in 3GPP TS 38.321 V16.0.0, one or more parts of which are quoted below:
5.15 Bandwidth Part (BWP) Operation
5.15.1 Downlink and Uplink In addition to clause 12 of TS 38.213 [6], this clause specifies requirements on BWP operation.

A Serving Cell may be configured with one or multiple BWPs, and the maximum number of BWP per Serving Cell is specified in TS 38.213 [6].

The BWP switching for a Serving Cell is used to activate an inactive BWP and deactivate an active BWP at a time. The BWP switching is controlled by the PDCCH indicating a downlink assignment or an uplink grant, by the bwp-InactivityTimer, by RRC signaling, or by the MAC entity itself upon initiation of Random Access procedure or upon detection of consistent LBT failure on SpCell. Upon RRC (re-)configuration of firstActiveDownlinkBWP-Id and/or firstActive UplinkBWP-Id for SpCell or activation of an SCell, the DL BWP and/or UL BWP indicated by firstActiveDownlinkBWP-Id and/or firstActiveUplinkBWP-Id respectively (as specified in TS 38.331 [5]) is active without receiving PDCCH indicating a downlink assignment or an uplink grant. The active BWP for a Serving Cell is indicated by either RRC or PDCCH (as specified in TS 38.213 [6]). For unpaired spectrum, a DL BWP is paired with a UL BWP, and BWP switching is common for both UL and DL.

For each activated Serving Cell configured with a BWP, the MAC entity shall:
1> if a BWP is activated and it is not the dormant BWP:
2> transmit on UL-SCH on the BWP;
2> transmit on RACH on the BWP, if PRACH occasions are configured;
2> monitor the PDCCH on the BWP;
2> transmit PUCCH on the BWP, if configured;
2> report CSI for the BWP;
2> transmit SRS on the BWP, if configured;
2> receive DL-SCH on the BWP;
2> (re-)initialize any suspended configured uplink grants of configured grant Type 1 on the active BWP according to the stored configuration, if any, and to start in the symbol according to rules in clause 5.8.2;
2> if consistent LBT failure recovery is configured:
3> stop the lbt-FailureDetectionTimer, if running;
3> set LBT_COUNTER to 0;
3> monitor LBT failure indications from lower layers as specified in clause 5.21.2.
1> if a BWP is activated and it is dormant BWP for an SCell:
2> stop the bwp-InactivityTimer of this Serving Cell, if running
2> not monitor the PDCCH on the BWP;
2> not monitor the PDCCH for the BWP;
2> not receive DL-SCH on the BWP;
2> perform CSI measurement for the BWP, if configured;
2> stop all the UL behavior, i.e. stop any UL transmission, suspend any configured uplink grant Type 1 associated with the SCell, clear any configured uplink grant of configured grant Type 2 associated with the SCell;
2> if configured, perform beam failure detection and beam failure recovery for the SCell if beam failure is detected.
1> if a BWP is deactivated:
2> not transmit on UL-SCH on the BWP;
2> not transmit on RACH on the BWP;
2> not monitor the PDCCH on the BWP;
2> not transmit PUCCH on the BWP;
2> not report CSI for the BWP;
2> not transmit SRS on the BWP;
2> not receive DL-SCH on the BWP;
2> clear any configured downlink assignment and configured uplink grant of configured grant Type 2 on the BWP;
2> suspend any configured uplink grant of configured grant Type 1 on the inactive BWP.

Upon initiation of the Random Access procedure on a Serving Cell, after the selection of carrier for performing Random Access procedure as specified in clause 5.1.1, the MAC entity shall for the selected carrier of this Serving Cell:
. . .
1> stop the bwp-InactivityTimer associated with the active DL BWP of this Serving Cell, if running
1> if the Serving Cell is SCell:
2> stop the bwp-InactivityTimer associated with the active DL BWP of SpCell, if running
1> perform the Random Access procedure on the active DL BWP of SpCell and active UL BWP of this Serving Cell.
. . .
The MAC entity shall for each activated Serving Cell configured with bwp-InactivityTimer:
1> if the defaultDownlinkBWP-Id is configured, and the active DL BWP is not the BWP indicated by the defaultDownlinkBWP-Id, and the active DL BWP is not the BWP indicated by the dormantDownlinkBWP-Id if configured; or
1> if the defaultDownlinkBWP-Id is not configured, and the active DL BWP is not the initialDownlinkBWP, and the active DL BWP is not the BWP indicated by the dormantDownlinkBWP-Id if configured:
2> if a PDCCH addressed to C-RNTI or CS-RNTI indicating downlink assignment or uplink grant is received on the active BWP; or
2> if a PDCCH addressed to C-RNTI or CS-RNTI indicating downlink assignment or uplink grant is received for the active BWP; or 2> if a MAC PDU is transmitted in a configured uplink grant or received in a configured downlink assignment:
   3> if there is no ongoing Random Access procedure associated with this Serving Cell; or
   3> if the ongoing Random Access procedure associated with this Serving Cell is successfully completed upon reception of this PDCCH addressed to C-RNTI (as specified in clauses 5.1.4, 5.1.4a and 5.1.5):
     4> start or restart the bwp-InactivityTimer associated with the active DL BWP.
2> if the bwp-InactivityTimer associated with the active DL BWP expires:
   3> if the defaultDownlinkBWP-Id is configured:
     4> perform BWP switching to a BWP indicated by the defaultDownlinkBWP-Id.
   3> else:
     4> perform BWP switching to the initialDownlinkBWP.
NOTE: If a Random Access procedure is initiated on an SCell, both this SCell and the SpCell are associated with this Random Access procedure.
1> if a PDCCH for BWP switching is received, and the MAC entity switches the active DL BWP:
   2> if the defaultDownlinkBWP-Id is configured, and the MAC entity switches to the DL BWP which is not indicated by the defaultDownlinkBWP-Id and is not indicated by the dormantDownlinkBWP-Id if configured; or
   2> if the defaultDownlinkBWP-Id is not configured, and the MAC entity switches to the DL BWP which is not the initialDownlinkBWP and is not indicated by the dormantDownlinkBWP-Id if configured:
     3> start or restart the bwp-InactivityTimer associated with the active DL BWP.

A network (NW) may semi-persistently configure uplink (UL) grants for a UE (such as discussed in 3GPP TS 38.331 V16.0.0). In some examples, for configured grant Type 1, the UE initializes and/or re-initializes a Type 1 configured uplink grant in response to (and/or upon) receiving a configuration of the Type 1 configured uplink grant, wherein the configuration is a Radio Resource Control (RRC) configuration. The UE may use the Type 1 configured uplink grant in response to (and/or upon) receiving the configuration of the Type 1 configured uplink grant. Alternatively and/or additionally, the UE may use the Type 1 configured uplink grant in response to (and/or upon) initializing (and/or re-initializing) the Type 1 configured uplink grant. The UE may use the Type 1 configured uplink grant with periodicity after receiving the configuration of the Type 1 configured uplink grant. Alternatively and/or additionally, the UE may use the Type 1 configured uplink grant with periodicity after initializing the Type 1 configured uplink grant. Alternatively and/or additionally, for configured grant Type 2, the UE initializes and/or re-initializes a Type 2 configured uplink grant when (and/or after) receiving a signal for activation of the Type 2 configured uplink grant. The UE may use the Type 2 configured uplink grant when (and/or after) the UE receives the signal for activation of the Type 2 configured uplink grant. Alternatively and/or additionally, the UE may use the Type 2 configured uplink grant when (and/or after) the UE initializes and/or re-initializes the Type 2 configured uplink grant. The UE may use the Type 2 configured uplink grant with periodicity after the UE receives the signal for activation of the Type 2 configured uplink grant until the UE receives a signal for deactivation. Alternatively and/or additionally, the UE may use the Type 2 configured uplink grant with periodicity when (and/or after) the UE initializes and/or re-initializes the Type 2 configured uplink grant until the UE receives a signal for deactivation. The signal for activation and/or deactivation of the Type 2 configured uplink grant may be received on a Physical Downlink Control Channel (PDCCH) from the network (such as discussed in 3GPP TS 38.321 V16.0.0). Type 1 and/or Type 2 configured uplink grants may be configured per Serving Cell and/or per Bandwidth part (BWP) of a UE.

For configured grant Type 1, when the UE receives a Type 1 configured uplink grant configuration (and/or in response to the UE receiving the Type 1 configured uplink grant configuration), the UE stores an uplink grant (of the Type 1 configured uplink grant configuration, for example) as a configured uplink grant (e.g., an initial uplink grant). For configured grant Type 2, when the UE receives an uplink grant (on a PDCCH for Configured Scheduling Radio Network Temporary Identifier (CS-RNTI), for example) that indicates activation of a Type 2 configured grant (and/or in response to the UE receiving the uplink grant indicating activation of Type 2 configured grant), the UE stores the uplink grant and associated Hybrid Automatic Repeat Request (HARQ) information (associated with the uplink grant, for example) as a configured uplink grant (e.g., an initial uplink grant). A Medium Access Control (MAC) of the UE (e.g., MAC entity of the UE) may deliver the configured uplink grant (e.g., the uplink grant of the Type 1 configured uplink grant and/or the uplink grant that indicates activation of Type 2 configured grant) to a HARQ entity (of the UE, for example) and/or may perform uplink transmissions at (and/or based on) associated Physical Uplink Shared Channel (PUSCH) durations with configured periodicity (e.g., one or more configured grant periodicities) for the Type 1 configured uplink grants and/or the Type 2 configured uplink grants (wherein the configured uplink grant delivered to the HARQ entity may be an initial uplink grant). Throughout the present disclosure, "Type 1 configured uplink grant" may correspond to, may be supplemented with and/or may be replaced by "configured uplink grant Type 1". Throughout the present disclosure, "Type 2 configured uplink grant" may correspond to, may be supplemented with and/or may be replaced by "configured uplink grant Type 2".

Alternatively and/or additionally, the UE may perform multiple transmissions for the same Transport Block (TB) (and/or MAC Protocol Data Unit (MAC PDU)) in a bundle (e.g., bundled transmission) on the same HARQ process based on a configuration provided by the network (such as discussed in 3GPP TS 38.321 V16.0.0). A number of transmissions of a TB within a bundle of a configured uplink grant may be indicated by (and/or determined based on) a parameter (e.g., numberofrepetitions and/or repK) (such as discussed in 3GPP TS 38.214 V16.1.0) provided by the network (such as discussed in 3GPP TS 38.331 V16.0.0). A number of transmissions for a bundle of a configured uplink grant may be indicative of a number of transmission occasions within the bundle (e.g., the number of transmission occasions within the bundle may be determined based on the number of transmissions for the bundle of the configured uplink grant). In an example, if a number of transmissions of a TB for a bundle of a configured uplink grant is larger than 1 (e.g., 2, 3, 4, etc.), HARQ retransmissions, in the bundle, follow an initial transmission in the bundle (e.g., after performing the initial transmission in the bundle, the HARQ retransmissions may be performed, in the bundle, without waiting for feedback, such as feedback associated with the initial transmission). The term "initial transmission" as used herein may correspond to a transmission that is a new transmission (of the TB and/or the MAC PDU, for example), a transmission that is not a retransmission (of the TB and/or the MAC PDU, for example) and/or a transmission that is a retransmission (of the TB and/or the MAC PDU, for example). The initial transmission may be the first transmission (e.g., sequentially and/or temporally the first transmission, such as an initial and/or earliest transmission) of the bundle (e.g., a bundled transmission). Alternatively and/or additionally, the initial transmission may be the first transmission (e.g., sequentially and/or temporally the first transmission, such as an initial and/or earliest transmission) of a TB (and/or MAC PDU) within the bundle of the configured uplink grant. Alternatively and/or additionally, the initial transmission may correspond to the first transmission occasion (e.g., sequentially and/or temporally the first transmission occasion, such as an initial and/or earliest transmission occasion) of the transmission occasions within the bundle (e.g., the initial transmission may be on the earliest transmission occasion of the transmission occasions). Other transmissions, other than the initial transmission, of the bundled transmission may be the HARQ retransmissions. The HARQ retransmissions may be transmissions of a TB (and/or MAC PDU) within the bundle of the configured uplink grant (e.g., the HARQ retransmissions may be transmissions of a TB and/or MAC PDU of the initial transmission of the bundle). For example, if the UE is configured with repK=4, the UE may perform four transmissions in a bundle, wherein the four transmissions may comprise one initial transmission (of a TB and/or MAC PDU) and up to three retransmissions (of the TB and/or the MAC PDU).

According to 3GPP TS 38.321 V16.0.0, each transmission within the bundle is (and/or may be performed at and/or using) a separate uplink grant after the configured uplink grant (e.g., initial uplink grant) is delivered to the HARQ entity of the UE. The initial transmission may occur at (and/or may be performed at and/or may be performed using) a configured grant (e.g., one configured grant) of configured uplink grants of a bundle if data for transmission is available. Alternatively and/or additionally, the initial transmission may occur at (and/or may be performed at and/or may be performed using) a configured grant (e.g., one configured grant) of configured uplink grants of a bundle if a redundancy version (RV) (of the configured grant, for example) allows an initial transmission (e.g., if the redundancy version indicates that the configured grant supports and/or applies to an initial transmission). Alternatively and/or additionally, retransmissions may be performed (and/or using) subsequent configured uplink grants of a bundle after the initial transmission (e.g., the subsequent configured uplink grants may correspond to configured uplink grants corresponding to transmission occasions that are after the initial transmission).

Alternatively and/or additionally, a network can configure Discontinuous Reception (DRX) functionality for a UE (such as discussed in 3GPP TS 38.331 V16.0.0). If the UE is configured with DRX functionality, the UE may monitor PDCCH discontinuously using DRX operation in RRC_CONNECTED (such as discussed in 3GPP TS 38.321 V16.0.0). DRX timers, such as DRX retransmission timer and/or DRX HARQ Round-Trip Time (RTT) timer, may be used by the UE to determine whether to monitor PDCCH (for retransmission, for example). According to 3GPP TS 38.321 V16.0.0, when a downlink (DL) transmission and/or an uplink transmission occurs (and/or in response to and/or upon occurrence of the downlink transmission and/or the uplink transmission), the UE may stop a DRX retransmission timer (e.g., drx-RetransmissionTimerDL and/or drx-RetransmissionTimerUL) and may start a DRX HARQ RTT timer (e.g., drx-HARQ-RTT-TimerDL and/or drx-HARQ-RTT-TimerUL) for the downlink transmission and/or the uplink transmission for a corresponding HARQ process. In some examples, a duration of the DRX HARQ RTT timer corresponds to (e.g., is equal to and/or based on) a duration of time between a time at which the DRX HARQ RTT timer is started and an earliest expected time of reception of a downlink assignment and/or an uplink grant for retransmission from the network. For example, the duration of the DRX HARQ RTT timer may be the minimum duration of time until the UE receives, from the network, a downlink assignment and/or an uplink grant for retransmission (e.g., a minimum duration of time between a time at which the DRX HARQ RTT timer is started and a time at which the UE receives, from the network, a downlink assignment and/or an uplink grant for retransmission). When the DRX HARQ RTT timer expires (and/or in response to and/or upon expiration (e.g., expiry) of the DRX HARQ RTT timer), the UE may start the DRX retransmission timer for the downlink transmission and/or the uplink transmission. In some examples, a duration of the DRX retransmission timer corresponds to (e.g., is equal to and/or based on) a duration of time between a time at which the DRX retransmission timer is started and a latest expected time of reception of a downlink retransmission and/or a grant for uplink retransmission. For example, the duration of the DRX retransmission timer may be the maximum duration of time until a downlink retransmission and/or a grant for uplink retransmission is received (e.g., a maximum duration of time between a time at which the DRX retransmission timer is started and a time at which the UE receives a downlink retransmission and/or a grant for uplink retransmission). The UE may monitor PDCCH for retransmission of the downlink transmission and/or the uplink transmission when the DRX retransmission timer is running.

An issue may occur if the UE performs bundled transmissions (of a configured uplink grant, for example) with the DRX functionality (e.g., when the UE is configured with and/or uses the DRX functionality). According to the current NR MAC specification (such as discussed in 3GPP TS 38.321 V16.0.0), if a MAC PDU is transmitted in a configured uplink grant, the UE may start the DRX HARQ RTT timer (e.g., drx-HARQ-RTT-TimerUL) in the first symbol (e.g., sequentially and/or temporally the first symbol, such as an initial and/or earliest symbol) after the end of the first repetition (e.g., sequentially and/or temporally the first repetition, such as an initial and/or earliest repetition) of the corresponding PUSCH transmission and the UE may stop the DRX retransmission timer (e.g., drx-RetransmissionTimerUL). Since the network may configure multiple transmissions for a bundle of a configured uplink grant, there may be multiple transmission occasions of a bundle of a configured uplink grant. Accordingly, the UE may perform above behavior (e.g., start the drx-HARQ-RTT-TimerUL and/or stop the drx-RetransmissionTimerUL) in response to each time the MAC PDU is transmitted in a bundle of a configured uplink grant. Thus, the DRX HARQ RTT timer (e.g., drx-HARQ-RTT-TimerUL) may be started after the first repetition of the corresponding PUSCH transmission (but may not be started at other repetitions of the corresponding PUSCH transmission) and the DRX retransmission timer (e.g., drx-RetransmissionTimerUL) may be stopped at each repetition of a bundle of the configured uplink grant.

Figure 5:
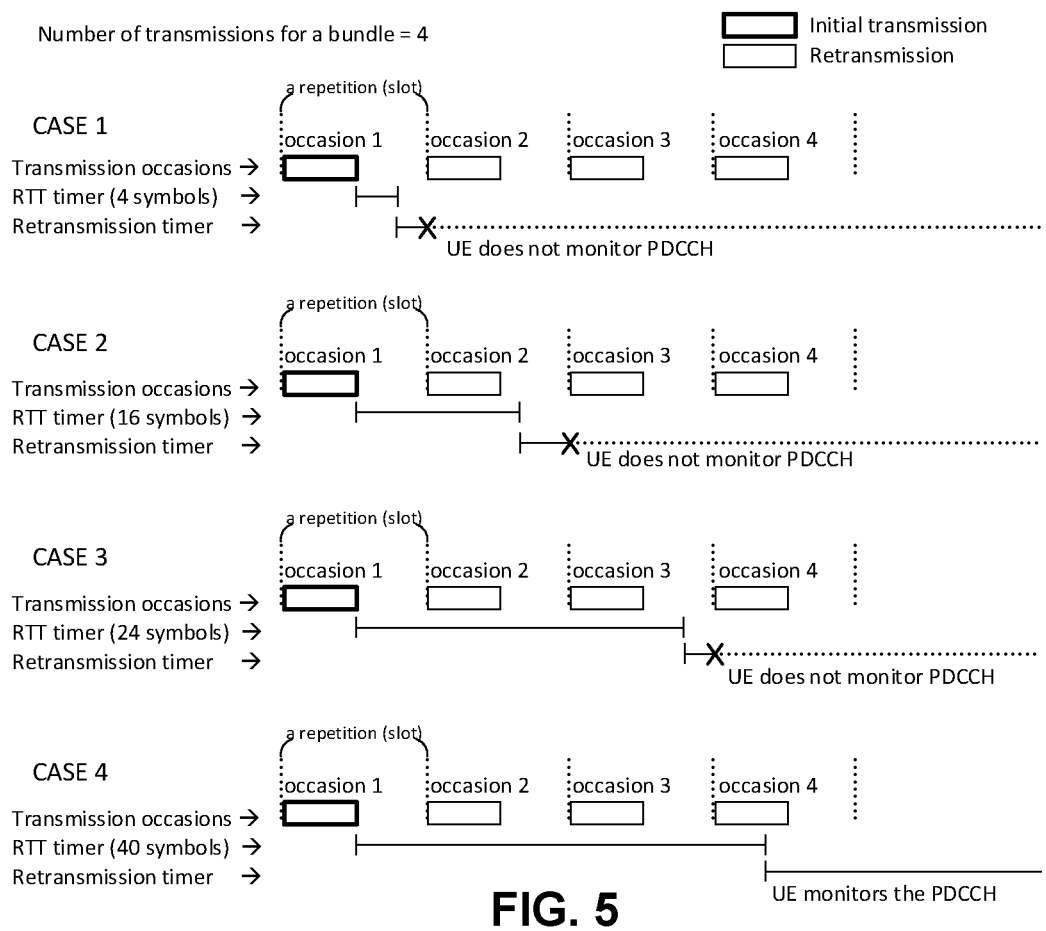
FIG. 5 is a diagram illustrating exemplary cases associated with bundled transmission according to one exemplary embodiment.

An example of the issue is shown in FIG. 5. In the example, a bundle has four transmission occasions comprising occasion 1, occasion 2, occasion 3 and occasion 4. For each case of exemplary cases 1-4 illustrated in FIG. 5, the initial transmission occurs at occasion 1, wherein occasion 1 may be the first transmission occasion (e.g., sequentially and/or temporally the first transmission occasion, such as an initial and/or earliest transmission occasion) of the bundle. Cases 1-3 illustrates problematic scenarios in which the UE does not monitor PDCCH for the bundle, and case 4 illustrates a scenario in which the UE monitors the PDCCH for the bundle.

In each case of cases 1-4, an RTT timer (e.g., DRX HARQ RTT timer, such as drx-HARQ-RTT-TimerUL) may be started after (and/or in response to completion of) the initial transmission (at occasion 1). In each case of cases 1-4, a retransmission timer (e.g., DRX retransmission timer, such as drx-RetransmissionTimerUL) may be started when the RTT timer expires (and/or the retransmission timer may be started upon, after and/or in response to expiration of the RTT timer).

In cases 1-3, the UE starts the RTT timer in the first symbol (e.g., sequentially and/or temporally the first symbol, such as an initial and/or earliest symbol) after the end of the first repetition (e.g., sequentially and/or temporally the first repetition, such as an initial and/or earliest repetition) of the corresponding PUSCH transmission associated with the bundle (e.g., the corresponding PUSCH transmission may be a PUSCH transmission that is transmitted by the initial transmission), where the first repetition may correspond to occasion 1. A duration of the RTT timer is 4 symbols in case 1, 16 symbols in case 2, and 24 symbols in case 3. The RTT timer expires and the retransmission timer starts before a transmission occasion following the first repetition, such as before occasion 2 in case 1, before occasion 3 in case 2 and before occasion 4 in case 3. At one or more transmission occasions following expiration of the RTT timer (where the one or more transmission occasions comprise occasion 2, occasion 3 and occasion 4 in case 1, occasion 3 and occasion 4 in case 2 and occasion 4 in case 3, for example), the UE does not start (and/or restart) the RTT timer. The UE stops the retransmission timer at (and/or before) a transmission occasion following expiration of the RTT timer. For example, the UE stops the retransmission timer at (and/or before) occasion 2 in case 1, at (and/or before) occasion 3 in case 2, and at (and/or before) occasion 4 in case 3. After stopping the retransmission timer, the UE does not monitor the PDCCH for transmission of the bundle. For example, the UE does not monitor the PDCCH when the retransmission timer is not running.

In case 4, the UE starts the RTT timer in the first symbol (e.g., sequentially and/or temporally the first symbol, such as an initial and/or earliest symbol) after the end of the first repetition (e.g., sequentially and/or temporally the first repetition, such as an initial and/or earliest repetition) of the corresponding PUSCH transmission associated with the bundle, where the first repetition may correspond to occasion 1. A duration of the RTT timer is 40 symbols. The RTT timer expires and the retransmission timer starts after the beginning of occasion 4 (e.g., the retransmission timer may start in response to (and/or upon) expiration of the RTT timer). The UE monitors the PDCCH for transmission of the bundle. For example, the UE monitors the PDCCH for transmission of the bundle when the retransmission timer is running.

Accordingly, as shown in the example of FIG. 5, if the RTT timer (e.g., DRX HARQ RTT timer, such as drx-HARQ-RTT-TimerUL) is started and expires (and the retransmission timer starts, for example) before the last transmission occasion of a bundle of a configured uplink grant, the retransmission timer (e.g., DRX retransmission timer, such as drx-RetransmissionTimerUL) may be stopped by the configured uplink grant within a bundle. The UE cannot monitor and/or receive uplink grant for retransmission on PDCCH (such as due to the retransmission timer not running). In an example in which the initial transmission occurs at a subsequent transmission occasion after the first transmission occasion (e.g., sequentially and/or temporally the first transmission occasion, such as an initial and/or earliest transmission occasion) of the bundle (e.g., in FIG. 5, the subsequent transmission occasion may correspond to occasion 2, occasion 3 and/or occasion 4), the same issue may occur (e.g., the UE may not monitor and/or receive uplink grant for retransmission on PDCCH). If the RTT timer is started and expires (and the retransmission timer starts, for example) before the last transmission occasion of a bundle of a configured uplink grant, the retransmission timer would be stopped by the configured uplink grant within the bundle. The UE may not monitor and/or receive uplink grant for retransmission on PDCCH. In some examples, transmission occasions of a bundle may be at most a maximum number of transmission occasions, such as 16 (such as discussed in 3GPP TS 38.331 V16.0.0). The more repetitions in the bundle, the higher the possibility of the issue arising (such as due to a higher probability that the RTT timer expires and/or the retransmission timer starts before the last transmission occasion (e.g., repetition) of the bundle).

One or more techniques and/or devices are provided herein to solve one or more of the aforementioned issues (such as the UE not monitoring PDCCH for transmission of a bundle of a configured uplink grant).

In an example, if a MAC PDU is transmitted in a configured uplink grant, the UE may stop the retransmission timer (e.g., DRX retransmission timer, such as drx-RetransmissionTimerUL) for the initial transmission in a bundle. Alternatively and/or additionally, if a MAC PDU is transmitted in a configured uplink grant, the UE may not stop the retransmission timer for one or more other transmissions, other than the initial transmission, in a bundle (e.g., the one or more other transmissions may correspond to one or more retransmissions of the initial transmission). The initial transmission may be the first transmission (e.g., sequentially and/or temporally the first transmission, such as an initial and/or earliest transmission) within the bundle. For example, the initial transmission may be before the one or more other transmissions of the bundle, such as all transmissions, other than the initial transmission, of the bundle. The one or more retransmissions of the initial transmission may be the one or more other transmissions within the bundle.

Figure 6:
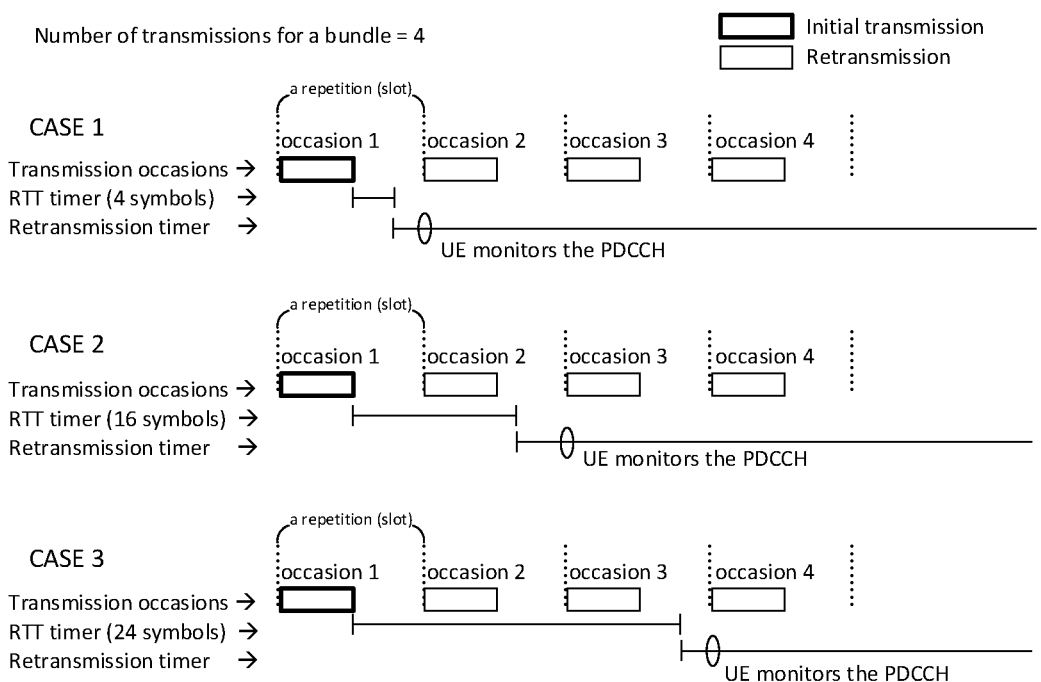
FIG. 6 is a diagram illustrating exemplary cases associated with bundled transmission according to one exemplary embodiment.

FIG. 6 illustrates exemplary cases associated with bundled transmission in accordance with one or more embodiments. In the exemplary cases of FIG. 6, a bundle has four transmission occasions comprising occasion 1, occasion 2, occasion 3 and occasion 4. For each case of exemplary cases 1-3 illustrated in FIG. 6, the initial transmission occurs at occasion 1, wherein occasion 1 may be the first transmission occasion (e.g., sequentially and/or temporally the first transmission occasion, such as an initial and/or earliest transmission occasion) of the bundle.

In each case of cases 1-3, an RTT timer (e.g., DRX HARQ RTT timer, such as drx-HARQ-RTT-TimerUL) may be started after (and/or in response to completion of) the initial transmission (at occasion 1). In each case of cases 1-3, a retransmission timer (e.g., DRX retransmission timer, such as drx-RetransmissionTimerUL) may be started when the RTT timer expires (and/or the retransmission timer may be started upon, after and/or in response to expiration of the RTT timer).

In cases 1-3, the UE starts the RTT timer in the first symbol (e.g., sequentially and/or temporally the first symbol, such as an initial and/or earliest symbol) after the end of the first repetition (e.g., sequentially and/or temporally the first repetition, such as an initial and/or earliest repetition) of the corresponding PUSCH transmission associated with the bundle (e.g., the corresponding PUSCH transmission may be a PUSCH transmission that is transmitted by the initial transmission), where the first repetition may correspond to occasion 1. A duration of the RTT timer is 4 symbols in case 1, 16 symbols in case 2, and 24 symbols in case 3. The RTT timer expires before a transmission occasion following occasion 1, such as before occasion 2 in case 1, before occasion 3 in case 2 and before occasion 4 in case 3. At transmission occasions following expiration of the RTT timer (e.g., occasion 2, occasion 3 and/or occasion 4), the UE does not start (and/or restart) the RTT timer. A retransmission timer (e.g., DRX retransmission timer, such as drx-RetransmissionTimerUL) may be started when the RTT timer expires (and/or the retransmission timer may be started upon, after and/or in response to expiration of the RTT timer). The UE does not stop the retransmission timer before and/or during transmission occasions of the bundle (and/or the UE does not stop the retransmission timer before the transmission occasions of the bundle end). For example, the UE monitors PDCCH when the retransmission timer is running and/or the UE may monitor the PDCCH for the transmission of the bundle.

With respect to FIG. 6, for a bundle of a configured uplink grant, regardless of the duration of the RTT timer (e.g., DRX HARQ RTT timer, such as drx-HARQ-RTT-TimerUL), the retransmission timer (e.g., DRX retransmission timer, such as drx-RetransmissionTimerUL) may not be stopped by transmissions of the bundle (e.g., retransmissions of the bundle) other than an initial transmission. Accordingly, the retransmission timer runs after the expiration of the RTT timer (started by the initial transmission, for example). Thus, the UE may monitor and/or receive an uplink grant for retransmission of the bundled transmission on PDCCH. For example, since the UE does not stop the retransmission timer based on retransmissions of the bundled transmission, the retransmission timer may continue running and/or the UE may monitor the PDCCH when the retransmission timer is running and be able to monitor and/or receive the uplink grant for retransmission indication (e.g., an indication to retransmit the transmission of the bundle) via the PDCCH. In an example in which the initial transmission occurs at a subsequent transmission occasion after the first transmission occasion (e.g., sequentially and/or temporally the first transmission occasion, such as an initial and/or earliest transmission occasion) of the bundle, the retransmission timer may not be stopped by transmissions of the bundle (e.g., retransmissions of the bundle) other than the initial transmission of the bundle (regardless of the duration of the RTT timer, for example), and thus, the UE may monitor and/or receive an uplink grant for retransmission of the bundled transmission on the PDCCH (e.g., the initial transmission occasion may correspond to occasion 1 and/or the subsequent transmission occasion may correspond to occasion 2, occasion 3 or occasion 4 in FIG. 6). The retransmission timer may be running after the expiration of RTT timer started based on (e.g., upon, after and/or in response to) the initial transmission. Accordingly, the UE may monitor and/or receive, on PDCCH, an uplink grant for retransmission indication of the bundled transmission.

In some examples, the UE may stop the retransmission timer (e.g., DRX retransmission timer, such as drx-RetransmissionTimerUL) based on (e.g., upon, after and/or in response to) a MAC PDU being transmitted in a configured uplink grant if the configured uplink grant is used for initial transmission (of the MAC PDU, for example), such as where the initial transmission is not a retransmission of the MAC PDU, and/or where the initial transmission is the first transmission (e.g., sequentially and/or temporally the first transmission, such as an initial and/or earliest transmission) of the MAC PDU. The UE may not stop the retransmission timer based on (e.g., upon, after and/or in response to) a MAC PDU being transmitted in a configured uplink grant if the uplink grant is not used for initial transmission (of the MAC PDU, for example), such as where the configured uplink grant is used for retransmission of the initial transmission (of the MAC PDU, for example) and/or where the initial transmission is the first transmission (e.g., sequentially and/or temporally the first transmission, such as an initial and/or earliest transmission) of the MAC PDU. The initial transmission may occur (e.g., may be performed) if the MAC PDU is available (e.g., the MAC PDU is available for transmission) and the redundancy version of the configured uplink grant allows initial transmission (e.g., if the redundancy version indicates that the configured uplink grant supports and/or applies to an initial transmission). One or more retransmissions of the initial transmission may occur (e.g., may be performed), after the initial transmission, in one or more subsequent configured uplink grants of the bundle (e.g., the one or more subsequent configured uplink grants may correspond to one or more configured uplink grants that follow and/or are subsequent to the configured uplink grant used for the initial transmission). In some examples, the configured uplink grant may be a Type 1 configured uplink grant. Alternatively and/or additionally, the configured uplink grant may be a Type 2 configured uplink grant.

In some examples, the UE may stop the retransmission timer (e.g., DRX retransmission timer, such as drx-RetransmissionTimerUL) based on (e.g., upon, after and/or in response to) a MAC PDU being transmitted via a transmission in a configured uplink grant if the transmission of the MAC PDU is the first time that the MAC PDU is transmitted in a bundle of the configured uplink grant. The UE may not stop the retransmission timer based on (e.g., upon, after and/or in response to) a MAC PDU being transmitted via a transmission in a configured uplink grant if the transmission of the MAC PDU is not the first time that the MAC PDU is transmitted in the bundle (such as where the transmission of the MAC PDU is one of the second time, third time, etc. that the MAC PDU is transmitted in the bundle). In some examples, the MAC PDU may be transmitted for the first time in a configured uplink grant if the MAC PDU is available (e.g., the MAC PDU is available for transmission) and a redundancy version of the configured uplink grant allows initial transmission (e.g., if the redundancy version indicates that the configured uplink grant supports and/or applies to an initial transmission). One or more retransmissions of the MAC PDU may occur (e.g., may be performed), after the initial transmission of the MAC PDU in the bundle, in one or more subsequent configured uplink grants of the bundle (e.g., the one or more subsequent configured uplink grants may correspond to one or more configured uplink grants that follow the configured uplink grant used for the initial transmission of the MAC PDU). In some examples, the configured uplink grant may be a Type 1 configured uplink grant. Alternatively and/or additionally, the configured uplink grant may be a Type 2 configured uplink grant.

In some examples, the UE may stop the retransmission timer (e.g., DRX retransmission timer, such as drx-RetransmissionTimerUL) based on (e.g., upon, after and/or in response to) a MAC PDU being transmitted via a transmission in a configured uplink grant if the transmission of the MAC PDU is the first repetition (e.g., sequentially and/or temporally the first repetition, such as an initial and/or earliest repetition) of the corresponding PUSCH transmission (e.g., the corresponding PUSCH transmission may be a PUSCH transmission that is transmitted via the initial repetition and/or one or more other repetitions in a bundle of the configured uplink grant). The first repetition may correspond to the first transmission (e.g., sequentially and/or temporally the first transmission, such as an initial and/or earliest transmission) of the corresponding PUSCH transmission. The UE may not stop the retransmission timer based on (e.g., upon, after and/or in response to) a MAC PDU being transmitted via a transmission in a configured uplink grant if the transmission of the MAC PDU is not the first repetition (e.g., the first transmission) of the corresponding PUSCH transmission, such as where the transmission of the MAC PDU is after the first repetition (e.g., the first transmission) of the corresponding PUSCH transmission. In some examples, the MAC PDU transmission may be the first repetition (e.g., the first transmission) of the corresponding PUSCH transmission if the MAC PDU is available (e.g., the MAC PDU is available for transmission) and a redundancy version of a configured uplink grant corresponding to the MAC PDU transmission allows initial transmission (e.g., if the redundancy version indicates that the configured uplink grant supports and/or applies to an initial transmission). One or more repetitions (e.g., transmissions) of the corresponding PUSCH transmission, other than the first repetition of the corresponding PUSCH transmission, may be after the first repetition (e.g., the first transmission) of the corresponding PUSCH transmission. In some examples, the configured uplink grant may be a Type 1 configured uplink grant. Alternatively and/or additionally, the configured uplink grant may be a Type 2 configured uplink grant.

In some examples, if a MAC PDU is transmitted via a PUSCH transmission in a configured uplink grant, the UE may stop the retransmission timer (e.g., DRX retransmission timer, such as drx-RetransmissionTimerUL) in the first symbol (e.g., sequentially and/or temporally the first symbol, such as an initial and/or earliest symbol) of the first repetition (e.g., sequentially and/or temporally the first repetition, such as an initial and/or earliest repetition) of the PUSCH transmission. The UE may not stop the retransmission timer in symbols of repetitions of the PUSCH transmission that are not the first repetition of the PUSCH transmission. The PUSCH transmission may be the first repetition of the configured uplink grant if the MAC PDU is available (e.g., the MAC PDU is available for transmission) and the redundancy version of the configured uplink grant allows initial transmission (e.g., if the redundancy version indicates that the configured uplink grant supports and/or applies to an initial transmission). In some examples, the configured uplink grant may be a Type 1 configured uplink grant. Alternatively and/or additionally, the configured uplink grant may be a Type 2 configured uplink grant.

In some examples, if a MAC PDU is transmitted via a PUSCH transmission in a configured uplink grant, the UE may stop the retransmission timer (e.g., DRX retransmission timer, such as drx-RetransmissionTimerUL) at the first repetition (e.g., sequentially and/or temporally the first symbol, such as an initial and/or earliest symbol) of the PUSCH transmission. The first repetition may correspond to the first transmission (e.g., sequentially and/or temporally the first transmission, such as an initial and/or earliest transmission) of the PUSCH transmission. The UE may not stop the retransmission timer at repetitions of the PUSCH transmission that are not the first repetition of the corresponding PUSCH transmission. The PUSCH transmission may be the first repetition (e.g., the first transmission) of the configured uplink grant if the MAC PDU is available (e.g., the MAC PDU is available for transmission) and the redundancy version of the configured uplink grant allows initial transmission (e.g., if the redundancy version indicates that the configured uplink grant supports and/or applies to an initial transmission). In some examples, the configured uplink grant may be a Type 1 configured uplink grant. Alternatively and/or additionally, the configured uplink grant may be a Type 2 configured uplink grant.

In some examples, a duration of the retransmission timer (e.g., DRX retransmission timer, such as drx-RetransmissionTimerUL) corresponds to (e.g., is equal to and/or based on) a duration of time between a time at which the retransmission timer is started and a latest expected time of reception of a grant for uplink retransmission. For example, the duration of the retransmission timer may be the maximum duration of time until a grant for uplink retransmission is received and/or expected (e.g., a maximum duration of time between a time at which the retransmission timer is started and a time at which the UE receives and/or expects a grant for uplink retransmission). In some examples, the retransmission timer is started when a RTT timer (e.g., DRX HARQ RTT timer, such as drx-HARQ-RTT-TimerUL) expires (and/or the DRX retransmission timer is started upon, after and/or in response to expiration of the HARQ RTT timer). In some examples, a duration of the RTT timer corresponds to (e.g., is equal to and/or based on) a duration of time between a time at which the RTT timer is started and an earliest expected time of reception of an uplink grant for retransmission and/or an uplink HARQ retransmission grant from the network. For example, the duration of the RTT timer may be the minimum duration of time until the UE receives (and/or expects), from the network, an uplink grant for retransmission and/or an uplink HARQ retransmission grant (e.g., a minimum duration of time between a time at which the RTT timer is started and a time at which the UE expects and/or receives, from the network, an uplink grant for retransmission and/or an uplink HARQ retransmission grant). The UE monitors PDCCH for retransmission when the retransmission timer is running.

The UE may receive one or more configurations related to configured uplink grant (e.g., ConfiguredGrantConfig), wherein the one or more configurations are provided by the network. The UE may receive one or more configurations related to bundled transmission (e.g., repK and/or numberOfRepetition), wherein the one or more configurations are provided by the network. For example, the UE may be configured with bundled transmission if the value of configured repK or numberOfRepetition is larger than 1. The UE may receive one or more configurations related to DRX operation (e.g., DRX-Config), wherein the one or more configurations are provided by the network.

The term "UE" may refer to the UE and/or a MAC entity of the UE.

The UE may be a NR device. The UE may be a NR-light device (such as discussed in RP-193238). The UE may be a reduced capability device (such as discussed in RP-193238). The UE may be a mobile phone. The UE may be a wearable device. The UE may be a sensor. The UE may be a stationary device.

The network may be a network node. The network may be a base station. The network may be an access point. The network may be an eNB. The network may be a gNB.

To enhance 3GPP MAC specification for wireless communication in accordance with some embodiments herein, Enhancements 1-11 are provided herein. Enhancements 1-11 are reflective of implementation in accordance with some embodiments herein, and comprise additions to an original version comprising one or more portions of 3GPP TS 38.321 V16.0.0 and/or Change Request (CR) in R2-2003875. The original version, without any additions of Enhancements 1-11, is quoted below:

5.7 Discontinuous Reception (DRX)
...
When DRX is configured, the MAC entity shall:
1> if a MAC PDU is received in a configured downlink assignment:
2> start the drx-HARQ-RTT-TimerDL for the corresponding HARQ process in the first symbol after the end of the corresponding transmission carrying the DL HARQ feedback;
2> stop the drx-RetransmissionTimerDL for the corresponding HARQ process.
1> if a MAC PDU is transmitted in a configured uplink grant and LBT failure indication is not received from lower layers:
2> start the drx-HARQ-RTT-TimerUL for the corresponding HARQ process in the first symbol after the end of the first repetition of the corresponding PUSCH transmission;
2> stop the drx-RetransmissionTimerUL for the corresponding HARQ process.
[ ... ]

In Enhancement 1, addition 1 is made to the original version in accordance with some embodiments of the present disclosure. The addition 1 of Enhancement 1 is in bold, and is preceded by the term "ADDITION 1 STARTS:" and followed by the term "ADDITION 1 ENDS" to distinguish the addition 1 from what is originally included in the original version.

Enhancement 1:
5.7 Discontinuous Reception (DRX)
[ ... ]
When DRX is configured, the MAC entity shall:
1> if a MAC PDU is received in a configured downlink assignment:
2> start the drx-HARQ-RTT-TimerDL for the corresponding HARQ process in the first symbol after the end of the corresponding transmission carrying the DL HARQ feedback;
2> stop the drx-RetransmissionTimerDL for the corresponding HARQ process.
1> if a MAC PDU is transmitted in a configured uplink grant ADDITION 1 STARTS: , the configured uplink grant is used for initial transmission, ADDITION 1 ENDS and LBT failure indication is not received from lower layers:
2> start the drx-HARQ-RTT-TimerUL for the corresponding HARQ process in the first symbol after the end of the first repetition of the corresponding PUSCH transmission;
2> stop the drx-RetransmissionTimerUL for the corresponding HARQ process.
[ ... ]

In Enhancement 2, addition 2 is made to the original version in accordance with some embodiments of the present disclosure. The addition 2 of Enhancement 2 is in bold, and is preceded by the term "ADDITION 2 STARTS:" and followed by the term "ADDITION 2 ENDS" to distinguish the addition 2 from what is originally included in the original version.

Enhancement 2:
5.7 Discontinuous Reception (DRX)
[ ... ]
When DRX is configured, the MAC entity shall:
1> if a MAC PDU is received in a configured downlink assignment:
2> start the drx-HARQ-RTT-TimerDL for the corresponding HARQ process in the first symbol after the end of the corresponding transmission carrying the DL HARQ feedback;
2> stop the drx-RetransmissionTimerDL for the corresponding HARQ process.
1> if a MAC PDU is transmitted in a configured uplink grant and LBT failure indication is not received from lower layers:
2> start the drx-HARQ-RTT-TimerUL for the corresponding HARQ process in the first symbol after the end of the first repetition of the corresponding PUSCH transmission;
2> ADDITION 2 STARTS: if the configured uplink grant is used for initial transmission:
3> ADDITION 2 ENDS stop the drx-RetransmissionTimerUL for the corresponding HARQ process.
[ ... ]

In Enhancement 3, addition 3 is made to the original version in accordance with some embodiments of the present disclosure. The addition 3 of Enhancement 2 is in bold, and is preceded by the term "ADDITION 3 STARTS:" and followed by the term "ADDITION 3 ENDS" to distinguish the addition 3 from what is originally included in the original version.

Enhancement 3:
5.7 Discontinuous Reception (DRX)
[ ... ]
When DRX is configured, the MAC entity shall:
1> if a MAC PDU is received in a configured downlink assignment:
2> start the drx-HARQ-RTT-TimerDL for the corresponding HARQ process in the first symbol after the end of the corresponding transmission carrying the DL HARQ feedback;
2> stop the drx-RetransmissionTimerDL for the corresponding HARQ process.
1> if a MAC PDU is transmitted in a configured uplink grant ADDITION 3 STARTS: , the MAC PDU transmission is the first transmission of a bundle of a configured uplink grant, ADDITION 3 ENDS and LBT failure indication is not received from lower layers:
2> start the drx-HARQ-RTT-TimerUL for the corresponding HARQ process in the first symbol after the end of the first repetition of the corresponding PUSCH transmission;
2> stop the drx-RetransmissionTimerUL for the corresponding HARQ process.
[ ... ]

In Enhancement 4, addition 4 is made to the original version in accordance with some embodiments of the present disclosure. The addition 4 of Enhancement 4 is in bold, and is preceded by the term "ADDITION 4 STARTS:" and followed by the term "ADDITION 4 ENDS" to distinguish the addition 4 from what is originally included in the original version.

Enhancement 4:
5.7 Discontinuous Reception (DRX)
[ . . . ]
    When DRX is configured, the MAC entity shall:
        1> if a MAC PDU is received in a configured downlink assignment:
            2> start the drx-HARQ-RTT-TimerDL for the corresponding HARQ process in the first symbol after the end of the corresponding transmission carrying the DL HARQ feedback;
            2> stop the drx-RetransmissionTimerDL for the corresponding HARQ process.
        1> if a MAC PDU is transmitted in a configured uplink grant and LBT failure indication is not received from lower layers:
            2> start the drx-HARQ-RTT-TimerUL for the corresponding HARQ process in the first symbol after the end of the first repetition of the corresponding PUSCH transmission;
            2> ADDITION 4 STARTS: if the MAC PDU transmission is the first transmission of a bundle of a configured uplink grant:
                3> ADDITION 4 ENDS stop the drx-RetransmissionTimerUL for the corresponding HARQ process.
[ . . . ]

In Enhancement 5, addition 5 is made to the original version in accordance with some embodiments of the present disclosure. The addition 5 of Enhancement 5 is in bold, and is preceded by the term "ADDITION 5 STARTS:" and followed by the term "ADDITION 5 ENDS" to distinguish the addition 5 from what is originally included in the original version.

Enhancement 5:
5.7 Discontinuous Reception (DRX)
[ . . . ]
    When DRX is configured, the MAC entity shall:
        1> if a MAC PDU is received in a configured downlink assignment:
            2> start the drx-HARQ-RTT-TimerDL for the corresponding HARQ process in the first symbol after the end of the corresponding transmission carrying the DL HARQ feedback;
            2> stop the drx-RetransmissionTimerDL for the corresponding HARQ process.
        1> if a MAC PDU is transmitted in a configured uplink grant ADDITION 5 STARTS: , the MAC PDU transmission is the first repetition of the corresponding PUSCH transmission, ADDITION 5 ENDS and LBT failure indication is not received from lower layers:
            2> start the drx-HARQ-RTT-TimerUL for the corresponding HARQ process in the first symbol after the end of the first repetition of the corresponding PUSCH transmission;
            2> stop the drx-RetransmissionTimerUL for the corresponding HARQ process.
[ . . . ]

In Enhancement 6, addition 6 is made to the original version in accordance with some embodiments of the present disclosure. The addition 6 of Enhancement 6 is in bold, and is preceded by the term "ADDITION 6 STARTS:" and followed by the term "ADDITION 6 ENDS" to distinguish the addition 6 from what is originally included in the original version.

Enhancement 6:
5.7 Discontinuous Reception (DRX)
[ . . . ]
    When DRX is configured, the MAC entity shall:
        1> if a MAC PDU is received in a configured downlink assignment:
            2> start the drx-HARQ-RTT-TimerDL for the corresponding HARQ process in the first symbol after the end of the corresponding transmission carrying the DL HARQ feedback;
            2> stop the drx-RetransmissionTimerDL for the corresponding HARQ process.
        1> if a MAC PDU is transmitted in a configured uplink grant and LBT failure indication is not received from lower layers:
            2> start the drx-HARQ-RTT-TimerUL for the corresponding HARQ process in the first symbol after the end of the first repetition of the corresponding PUSCH transmission;
            2> ADDITION 6 STARTS: if the MAC PDU transmission is the first repetition of the corresponding PUSCH transmission:
                3> ADDITION 6 ENDS stop the drx-RetransmissionTimerUL for the corresponding HARQ process.
[ . . . ]

In Enhancement 7, addition 7 is made to the original version in accordance with some embodiments of the present disclosure. The addition 7 of Enhancement 7 is in bold, and is preceded by the term "ADDITION 7 STARTS:" and followed by the term "ADDITION 7 ENDS" to distinguish the addition 7 from what is originally included in the original version.

Enhancement 7:
5.7 Discontinuous Reception (DRX)
[ . . . ]
    When DRX is configured, the MAC entity shall:
        1> if a MAC PDU is received in a configured downlink assignment:
            2> start the drx-HARQ-RTT-TimerDL for the corresponding HARQ process in the first symbol after the end of the corresponding transmission carrying the DL HARQ feedback;
            2> stop the drx-RetransmissionTimerDL for the corresponding HARQ process.
        1> if a MAC PDU is transmitted in a configured uplink grant and LBT failure indication is not received from lower layers:
            2> start the drx-HARQ-RTT-TimerUL for the corresponding HARQ process in the first symbol after the end of the first repetition of the corresponding PUSCH transmission;
            2> stop the drx-RetransmissionTimerUL for the corresponding HARQ process ADDITION 7 STARTS: in the first symbol of the first repetition of the corresponding PUSCH transmission ADDITION 7 ENDS.
[ . . . ]

In Enhancement 8, addition 8 is made to the original version in accordance with some embodiments of the present disclosure. The addition 8 of Enhancement 8 is in bold, and is preceded by the term "ADDITION 8 STARTS:" and followed by the term "ADDITION 8 ENDS" to distinguish the addition 8 from what is originally included in the original version.

Enhancement 8:

5.7 Discontinuous Reception (DRX)

[ ... ]

When DRX is configured, the MAC entity shall:
1> if a MAC PDU is received in a configured downlink assignment:
2> start the drx-HARQ-RTT-TimerDL for the corresponding HARQ process in the first symbol after the end of the corresponding transmission carrying the DL HARQ feedback;
2> stop the drx-RetransmissionTimerDL for the corresponding HARQ process.
1> if a MAC PDU is transmitted in a configured uplink grant and LBT failure indication is not received from lower layers:
2> start the drx-HARQ-RTT-TimerUL for the corresponding HARQ process in the first symbol after the end of the first repetition of the corresponding PUSCH transmission;
2> stop the drx-RetransmissionTimerUL for the corresponding HARQ process ADDITION 8 STARTS: at the first repetition of the corresponding PUSCH transmission ADDITION 8 ENDS.

[ ... ]

A number of transmissions for a bundle of a configured uplink grant may be indicative of the number of transmission occasions for the bundle (e.g., the number of transmission occasions for the bundle may be determined based on the number of transmissions for the bundle of the configured uplink grant). An initial transmission may occur at the first transmission occasion (e.g., sequentially and/or temporally the first transmission occasion, such as an initial and/or earliest transmission occasion) (e.g., the first transmission occasion for the configured uplink grant) and/or at one or more other (e.g., subsequent) transmission occasions (e.g., for part of a bundle of the configured uplink grant). If data for transmission is available (e.g., available for transmission) at the first transmission occasion for the configured uplink grant, the initial transmission may occur at the first transmission occasion for the configured uplink grant. If data for transmission is not available at the first transmission occasion for the configured uplink grant, and data for transmission is available (e.g., available for transmission) at the one or more other transmission occasions for an uplink grant (different than the configured uplink grant) within the bundle of the configured uplink grant, the initial transmission may occur in part of a bundle of the configured uplink grant (when the redundancy version allows the initial transmission, for example), wherein, in some examples, the redundancy version that allows the initial transmission may be associated with the part of the bundle of the configured uplink grant in which the initial transmission occurs.

In some examples, the bundle of the configured uplink grant may be (and/or comprise) uplink grants in the middle of a second bundle of a second configured uplink grant (e.g., the uplink grants may follow and/or be after one or more uplink grants of the second bundle and/or may precede and/or be before one or more uplink grants of the second bundle), wherein the second configured uplink grant is the same as or different than the configured uplink grant. Alternatively and/or additionally, the bundle of the configured uplink grant may be part of a second bundle of a second configured uplink grant, wherein the second configured uplink grant is the same as or different than the configured uplink grant. Alternatively and/or additionally, the bundle of the configured uplink grant may be part of multiple uplink grants, of a second bundle, after an initial uplink grant (e.g., a second configured uplink grant that is the same as or different than the configured uplink grant) delivered to the HARQ entity (of the UE), wherein the second bundle is the same as or different than the bundle. The bundle of the configured uplink grant may not include the initial uplink grant (e.g., the second configured uplink grant that is the same as or different than the configured uplink grant) delivered to the HARQ entity. The bundle of the configured uplink grant may not include a second configured uplink grant for the first repetition of the bundle, wherein the second configured uplink grant is the same as or different than the configured uplink grant.

An issue may occur if the UE performs bundled transmissions (of a configured uplink grant, for example), wherein an initial transmission occurs in part of the bundle (e.g., in the middle of the bundle).

According to the current NR MAC specification (such as discussed in 3GPP TS 38.321 V16.0.0), the UE may stop the retransmission timer (e.g., DRX retransmission timer, such as drx-RetransmissionTimerUL) if a MAC PDU is transmitted in a configured uplink grant, and the UE may start the RTT timer (e.g., DRX HARQ RTT timer, such as drx-HARQ-RTT-TimerUL) in the first symbol (e.g., sequentially and/or temporally the first symbol, such as an initial and/or earliest symbol) after the end of the first repetition (e.g., sequentially and/or temporally the first repetition, such as an initial and/or earliest repetition) of the corresponding PUSCH transmission. For example, the corresponding PUSCH transmission may be a PUSCH transmission that is transmitted via the initial transmission and/or one or more other transmissions in a bundle of the configured uplink grant. Accordingly, as shown in case 2 of FIG. 7 (discussed below), the UE may not start the RTT timer when the MAC PDU is transmitted within a bundle of a configured uplink grant. Alternatively and/or additionally, the RTT timer may not be started at an uplink grant within the bundle of the configured uplink grant. Accordingly, the retransmission timer may not be started and the UE may not be able to monitor and/or receive an uplink grant for retransmission on PDCCH (such as due to the DRX retransmission timer not running). Alternatively and/or additionally, if the initial transmission occurs in part of the bundle of the configured uplink grant, the retransmission timer may not be stopped. For example, the UE may consume (e.g., waste) power monitoring the PDCCH for retransmission of the last transmission over a time period during which the network does not (and/or is not expected and/or configured to) indicate a retransmission.

Figure 7:
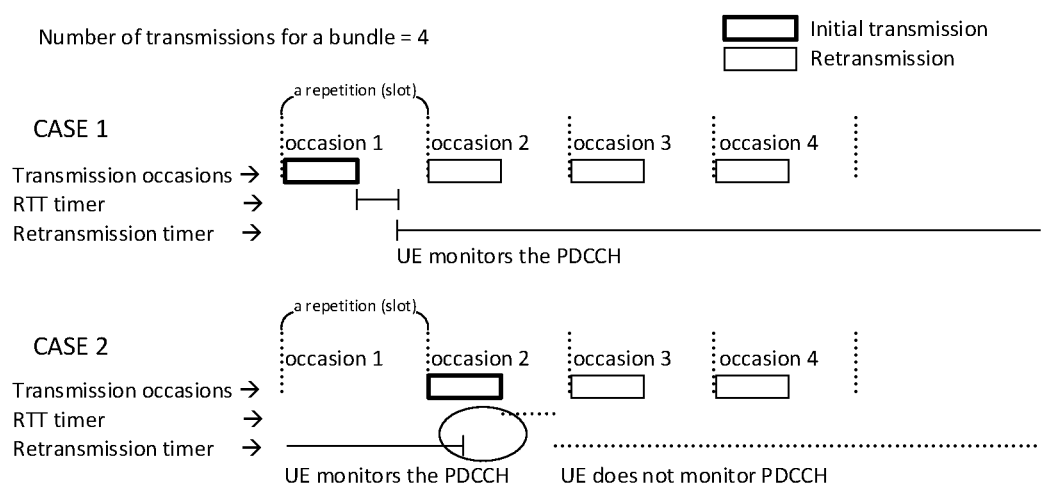
FIG. 7 is a diagram illustrating exemplary cases associated with bundled transmission according to one exemplary embodiment.

An example is shown in FIG. 7. In the example, a bundle has four transmission occasions comprising occasion 1, occasion 2, occasion 3 and occasion 4. Case 1 of FIG. 7 illustrates a scenario in which the initial transmission occurs at the first transmission occasion (e.g., sequentially and/or temporally the first transmission occasion, such as an initial and/or earliest transmission occasion) of a bundle and/or case 2 illustrates a problematic scenario in which the initial transmission occurs at a transmission occasion other than the first transmission occasion.

In an example, in case 1 of FIG. 7, data is available (e.g., available for transmission) at the first transmission occasion for the configured uplink grant (e.g., the first transmission occasion corresponds to occasion 1). The initial transmission occurs at the first transmission occasion (e.g., occasion 1). For example, the UE obtains the data and/or performs the initial transmission at the first transmission occasion. The retransmissions follow at the second transmission occasion (e.g., occasion 2), the third transmission occasion (e.g., occasion 3) and/or the fourth transmission occasion (e.g., occasion 4). In some examples, a retransmission timer (e.g., DRX retransmission timer, such as drx-RetransmissionTimerUL) may be stopped at the initial transmission (e.g., at occasion 1), such as at the beginning of the initial transmission and/or the beginning of the first transmission occasion (e.g., occasion 1). An RTT timer (e.g., DRX HARQ RTT timer, such as drx-HARQ-RTT-TimerUL) may be started after (and/or in response to completion of) the initial transmission (at occasion 1). Alternatively and/or additionally, at (and/or upon, after and/or in response to) the initial transmission, the UE may stop the retransmission timer and/or start the RTT timer. After stopping the transmission timer and/or starting the RTT timer, the retransmission timer may be started when the RTT timer expires (and/or the retransmission timer may be started upon, after and/or in response to expiration of the RTT timer). The UE may monitor PDCCH when the retransmission timer is running.

In case 2 of FIG. 7, data is not available (e.g., available for transmission) at the first transmission occasion (e.g., occasion 1). Data is available (e.g., available for transmission) at the second transmission occasion (e.g., occasion 2) for the uplink grant (within the bundle of the configured uplink grant, for example) and a redundancy version associated with the second transmission occasion allows initial transmission. The initial transmission occurs at the second transmission occasion. For example, the UE obtains the data and/or performs the initial transmission at the second transmission occasion. In some examples, retransmissions (of the initial transmission) follow at the third transmission occasion (e.g., occasion 3) and the fourth transmission occasion (e.g., occasion 4). In some examples, in case 2, the retransmission timer (e.g., DRX retransmission timer, such as drx-RetransmissionTimerUL) is not stopped at the second transmission occasion. Alternatively and/or additionally, the RTT timer (e.g., DRX HARQ RTT timer, such as drx-HARQ-RTT-TimerUL) may not be started (within a time period comprising the transmission occasions of the bundle, for example) after (and/or in response to completion of) the initial transmission (at occasion 2). For example, the retransmission timer may not be started since the RTT timer does not start and/or the RTT timer does not expire (within the time period comprising the transmission occasions of the bundle, for example). For example, the retransmission timer may not be started after the retransmission timer expires due to the UE being configured to start the retransmission timer based on (e.g., upon, after and/or in response to) expiration of the RTT timer. The UE may not monitor PDCCH when the retransmission timer is not running (e.g., the UE may not monitor PDCCH after the retransmission timer expires since the retransmission timer is not started after the retransmission timer expires).

One or more techniques and/or devices are provided herein to solve one or more of the aforementioned issues (such as the UE not monitoring PDCCH for transmission of a bundle of a configured uplink grant).

In an example, the UE may start the RTT timer (e.g., DRX HARQ RTT timer, such as drx-HARQ-RTT-TimerUL) if a MAC PDU is transmitted in an uplink grant within a bundle of a configured uplink grant. Alternatively and/or additionally, the UE may stop the retransmission timer (e.g., DRX retransmission timer, such as drx-RetransmissionTimerUL) if a MAC PDU is transmitted in an uplink grant within a bundle of a configured uplink grant. Alternatively and/or additionally, the retransmission timer (e.g., DRX retransmission timer, such as drx-RetransmissionTimerUL) may be started based on (e.g., upon, after and/or in response to) expiration of the RTT timer, and the UE may monitor PDCCH (e.g., monitor PDCCH for one or more uplink grants) when the retransmission timer (e.g., DRX retransmission timer, such as drx-RetransmissionTimerUL) is running.

In some examples, the UE may start the RTT timer (e.g., DRX HARQ RTT timer, such as drx-HARQ-RTT-TimerUL) based on (e.g., upon, after and/or in response to) a MAC PDU being transmitted in an uplink grant within a bundle of a configured uplink grant if the uplink grant is used for initial transmission (of the MAC PDU, for example). The UE may stop the retransmission timer (e.g., DRX retransmission timer, such as drx-RetransmissionTimerUL) based on (e.g., upon, after and/or in response to) a MAC PDU being transmitted in an uplink grant within a bundle of a configured uplink grant if the uplink grant is used for initial transmission (of the MAC PDU, for example). In some examples, the initial transmission may occur (e.g., may be performed) at the uplink grant within the bundle of the configured uplink grant if (and/or when) the MAC PDU is not available (for transmission, for example) at the configured uplink grant, and the MAC PDU is available (for transmission, for example) at the uplink grant (and/or one or more other uplink grants) within the bundle of the configured uplink grant. Alternatively and/or additionally, the initial transmission may occur (e.g., may be performed) at the uplink grant within the bundle of the configured uplink grant if the redundancy version of the uplink grant within the bundle of the configured uplink grant allows initial transmission (e.g., if the redundancy version indicates that the uplink grant supports and/or applies to an initial transmission). In some examples, the configured uplink grant may be a Type 1 configured uplink grant. Alternatively and/or additionally, the configured uplink grant may be a Type 2 configured uplink grant. The bundle of the configured uplink grant may follow (and/or be after) an initial uplink grant (e.g., a second configured uplink grant that is the same as or different than the configured uplink grant) delivered to the HARQ entity (e.g., the bundle of the configured uplink grant may be after the initial uplink grant is delivered to the HARQ entity).

In some examples, the UE may start the RTT timer (e.g., DRX HARQ RTT timer, such as drx-HARQ-RTT-TimerUL) based on (e.g., upon, after and/or in response to) a MAC PDU being transmitted via a transmission in an uplink grant within a bundle of a configured uplink grant if the transmission of the MAC PDU is the first time that the MAC PDU (of the bundle of the configured uplink grant) is transmitted. The UE may stop the retransmission timer (e.g., DRX retransmission timer, such as drx-RetransmissionTimerUL) based on (e.g., upon, after and/or in response to) a MAC PDU being transmitted via a transmission in an uplink grant within a bundle of a configured uplink grant, if the transmission of the MAC PDU is the first time that the MAC PDU (of the bundle of the configured uplink grant) is transmitted. In some examples, the MAC PDU of the bundle of the configured uplink grant may be transmitted for the first time in the uplink grant within the bundle of the configured uplink grant if (and/or when) the MAC PDU is not available (for transmission, for example) at the configured uplink grant, and the MAC PDU is available (for transmission, for example) at the uplink grant (and/or one or more other uplink grants) within the bundle of the configured uplink grant. Alternatively and/or additionally, the MAC PDU of the bundle of the configured uplink grant may be transmitted for the first time in the uplink grant within the bundle of the configured uplink grant if the redundancy version of the uplink grant within the bundle of the configured uplink grant allows initial transmission (e.g., if the redundancy version indicates that the uplink grant supports and/or applies to an initial transmission). In some examples, the configured uplink grant may be a Type 1 configured uplink grant. Alternatively and/or additionally, the configured uplink grant may be a Type 2 configured uplink grant. The bundle of the configured uplink grant may follow (and/or be after) an initial uplink grant (e.g., a second configured uplink grant that is the same as or different than the configured uplink grant) delivered to the HARQ entity (e.g., the bundle of the configured uplink grant may be after the initial uplink grant is delivered to the HARQ entity).

In Enhancement 9, addition 9 is made to the original version (comprising one or more portions of 3GPP TS 38.321 V16.0.0 and/or Change Request (CR) in R2-2003875) in accordance with some embodiments of the present disclosure. The addition 9 of Enhancement 9 is in bold, and is preceded by the term "ADDITION 9 STARTS:" and followed by the term "ADDITION 9 ENDS" to distinguish the addition 9 from what is originally included in the original version.

Enhancement 9:
5.7 Discontinuous Reception (DRX)
[ . . . ]
    When DRX is configured, the MAC entity shall:
        1> if a MAC PDU is received in a configured downlink assignment:
            2> start the drx-HARQ-RTT-TimerDL for the corresponding HARQ process in the first symbol after the end of the corresponding transmission carrying the DL HARQ feedback;
            2> stop the drx-RetransmissionTimerDL for the corresponding HARQ process.
        1> if a MAC PDU is transmitted in a configured uplink grant and LBT failure indication is not received from lower layers ADDITION 9 STARTS: or
        1> if a MAC PDU is transmitted in part of a bundle of a configured uplink grant, the uplink grant is used for initial transmission, and LBT failure indication is not received from lower layers:_ADDITION 9 ENDS
            2> start the drx-HARQ-RTT-TimerUL for the corresponding HARQ process in the first symbol after the end of the first repetition of the corresponding PUSCH transmission;
            2> stop the drx-RetransmissionTimerUL for the corresponding HARQ process.
[ . . . ]

In Enhancement 10, additions 10-12 are made to the original version in accordance with some embodiments of the present disclosure. The addition 10 of Enhancement 10 is in bold, and is preceded by the term "ADDITION 10 STARTS:" and followed by the term "ADDITION 10 ENDS" to distinguish the addition 10 from what is originally included in the original version. The addition 11 of Enhancement 10 is in bold, and is preceded by the term "ADDITION 11 STARTS:" and followed by the term "ADDITION 11 ENDS" to distinguish the addition 11 from what is originally included in the original version. The addition 12 of Enhancement 10 is in bold, and is preceded by the term "ADDITION 12 STARTS:" and followed by the term "ADDITION 12 ENDS" to distinguish the addition 12 from what is originally included in the original version.

Enhancement 10:
5.7 Discontinuous Reception (DRX)
    When DRX is configured, the MAC entity shall:
        1> if a MAC PDU is received in a configured downlink assignment:
            2> start the drx-HARQ-RTT-TimerDL for the corresponding HARQ process in the first symbol after the end of the corresponding transmission carrying the DL HARQ feedback;
            2> stop the drx-RetransmissionTimerDL for the corresponding HARQ process.
        1> if a MAC PDU is transmitted in a configured uplink grant ADDITION 10 STARTS: or in part of a bundle of a configured uplink grant; ADDITION 10 ENDS and ADDITION 11 STARTS:
        1> ADDITION 11 ENDS LBT failure indication is not received from lower layers ADDITION 12 STARTS: and
        1> if the MAC PDU is transmitted the first time for the bundle: ADDITION 12 ENDS
            2> start the drx-HARQ-RTT-TimerUL for the corresponding HARQ process in the first symbol after the end of the first repetition of the corresponding PUSCH transmission;
            2> stop the drx-RetransmissionTimerUL for the corresponding HARQ process.
[ . . . ]

For clarity, a version of Enhancement 10 is provided without indications of the beginnings and endings of additions 10-12:

5.7 Discontinuous Reception (DRX)
    When DRX is configured, the MAC entity shall:
        1> if a MAC PDU is received in a configured downlink assignment:
            2> start the drx-HARQ-RTT-TimerDL for the corresponding HARQ process in the first symbol after the end of the corresponding transmission carrying the DL HARQ feedback;
            2> stop the drx-RetransmissionTimerDL for the corresponding HARQ process.
        1> if a MAC PDU is transmitted in a configured uplink grant or in part of a bundle of a configured uplink grant; and
        1> LBT failure indication is not received from lower layers; and
        1> if the MAC PDU is transmitted the first time for the bundle:
            2> start the drx-HARQ-RTT-TimerUL for the corresponding HARQ process in the first symbol after the end of the first repetition of the corresponding PUSCH transmission;
            2> stop the drx-RetransmissionTimerUL for the corresponding HARQ process.
[ . . . ]

In Enhancement 11, additions 13-15 are made to the original version in accordance with some embodiments of the present disclosure. The addition 13 of Enhancement 11 is in bold, and is preceded by the term "ADDITION 13 STARTS:" and followed by the term "ADDITION 13 ENDS" to distinguish the addition 13 from what is originally included in the original version. The addition 14 of Enhancement 11 is in bold, and is preceded by the term "ADDITION 14 STARTS:" and followed by the term "ADDITION 14 ENDS" to distinguish the addition 14 from what is originally included in the original version. The addition 15 of Enhancement 11 is in bold, and is preceded by the term "ADDITION 15 STARTS:" and followed by the term "ADDITION 15

ENDS" to distinguish the addition 15 from what is originally included in the original version.

Enhancement 11:

5.7 Discontinuous Reception (DRX)

[ . . . ]

When DRX is configured, the MAC entity shall:
1> if a MAC PDU is received in a configured downlink assignment:
2> start the drx-HARQ-RTT-TimerDL for the corresponding HARQ process in the first symbol after the end of the corresponding transmission carrying the DL HARQ feedback;
2> stop the drx-RetransmissionTimerDL for the corresponding HARQ process.
1> if a MAC PDU is transmitted in a configured uplink grant ADDITION 13 STARTS: or in part of a bundle of a configured uplink grant; ADDITION 13 ENDS and ADDITION 14 STARTS:
1> ADDITION 14 ENDS LBT failure indication is not received from lower layers ADDITION 15 STARTS: and
1> if the MAC PDU has not been transmitted for the bundle before: ADDITION 15 ENDS
2> start the drx-HARQ-RTT-TimerUL for the corresponding HARQ process in the first symbol after the end of the first repetition of the corresponding PUSCH transmission;
2> stop the drx-RetransmissionTimerUL for the corresponding HARQ process.

[ . . . ]

For clarity, a version of Enhancement 11 is provided without indications of the beginnings and endings of additions 13-15:

5.7 Discontinuous Reception (DRX)

[ . . . ]

When DRX is configured, the MAC entity shall:
1> if a MAC PDU is received in a configured downlink assignment:
2> start the drx-HARQ-RTT-TimerDL for the corresponding HARQ process in the first symbol after the end of the corresponding transmission carrying the DL HARQ feedback;
2> stop the drx-RetransmissionTimerDL for the corresponding HARQ process.
1> if a MAC PDU is transmitted in a configured uplink grant or in part of a bundle of a configured uplink grant; and
1> LBT failure indication is not received from lower layers; and
1> if the MAC PDU has not been transmitted for the bundle before:
2> start the drx-HARQ-RTT-TimerUL for the corresponding HARQ process in the first symbol after the end of the first repetition of the corresponding PUSCH transmission;
2> stop the drx-RetransmissionTimerUL for the corresponding HARQ process.

[ . . . ]

In some examples, a network may configure one or more Secondary Cells (SCells) to a UE (e.g., the network may configure the UE with one or more SCells). The UE may activate and/or deactivate the one or more SCells by receiving a MAC CE from the network (e.g., the UE may activate and/or deactivate the one or more SCells based on the MAC CE received from the network). The network may configure (without Physical Uplink Control Channel (PUCCH), for example) a SCell deactivation timer (e.g., sCellDeactivationTimer) to (and/or for) each SCell of the one or more SCells. The UE deactivates a SCell in response to (and/or upon) expiration of the associated sCellDeactivationTimer (e.g., the associated sCellDeactivationTimer may correspond to a sCellDeactivationTimer that is configured to and/or for the SCell). In some examples, the SCell is not scheduled (and/or there is no scheduling on the SCell) for a period of time (e.g., the period of time may correspond to a time during which the SCell is deactivated, wherein a duration of the period of time may be equal to and/or based on a duration of the sCellDeactivationTimer). In some examples, a duration of the sCellDeactivationTimer corresponds to (e.g., is equal to and/or based on) a duration of time between a time at which the sCellDeactivationTimer is started and a latest expected time that a transmission occurs on a SCell (e.g., the SCell associated with the sCellDeactivationTimer). For example, the duration of the first timer may be the maximum duration until a transmission occurs on a SCell (e.g., the duration of the sCellDeactivationTimer may be the maximum duration of time between a time at which the sCellDeactivationTimer starts and a time at which a transmission occurs on a SCell). In some examples, the UE starts and/or restarts the sCellDeactivationTimer in response to (and/or upon) activation of the SCell (associated with the sCellDeactivationTimer). Alternatively and/or additionally, the UE may start and/or restart the sCellDeactivationTimer if there is a (e.g., any) transmission (on the SCell, for example). Alternatively and/or additionally, the UE may start and/or restart the sCellDeactivationTimer when PDCCH indicates an uplink grant and/or a downlink assignment on the SCell. Alternatively and/or additionally, the UE may start and/or restart the sCellDeactivationTimer in response to (and/or upon) the PDCCH indicating an uplink grant and/or a downlink assignment on the SCell. Alternatively and/or additionally, the UE may start and/or restart the sCellDeactivationTimer when the PDCCH indicates an uplink grant and/or a downlink assignment on the Serving Cell scheduling the SCell. Alternatively and/or additionally, the UE may start and/or restart the sCellDeactivationTimer in response to (and/or upon) the PDCCH indicating an uplink grant and/or a downlink assignment on the Serving Cell scheduling the SCell. Alternatively and/or additionally, the UE may start and/or restart the sCellDeactivationTimer when a MAC PDU is transmitted in a configured uplink grant and/or received in a configured downlink assignment on the SCell. Alternatively and/or additionally, the UE may start and/or restart the sCellDeactivationTimer in response to (and/or upon) a MAC PDU being transmitted in a configured uplink grant and/or being received in a configured downlink assignment on the SCell.

An issue may occur if the UE performs bundled transmissions (of a configured uplink grant, for example), wherein an initial transmission occurs in part of the bundle (e.g., in the middle of the bundle).

According to the current NR MAC specification (such as discussed in 3GPP TS 38.321 V16.0.0), if a MAC PDU is transmitted in a configured uplink grant, the UE may restart the sCellDeactivationTimer. However, the UE may not restart the sCellDeactivationTimer when the MAC PDU is transmitted in part of a bundle of the configured uplink grant. If data (e.g., the MAC PDU) for transmission is not available (for transmission, for example) at the configured uplink grant and the data for transmission is available (for transmission, for example) at an uplink grant within the bundle of the configured uplink grant, the initial transmission of the data (e.g., the MAC PDU) may occur in part of a bundle of the configured uplink grant (when the redundancy version allows the initial transmission, for example), wherein, in some examples, the redundancy version that allows the initial transmission may be associated with the part of the bundle of the configured uplink grant in which the initial transmission occurs. Accordingly, the sCellDeactivationTimer may not be restarted at a (e.g., any) transmission within the part of the bundle of the configured uplink grant, and may expire during the transmission of the bundle of the configured uplink grant (such as shown in case 2 of FIG. 8, discussed below). The SCell may be deactivated (in response to expiration of the sCellDeactivationTimer, for example) even if there are transmissions (e.g., scheduled transmissions) on the SCell. In some examples, when the UE deactivates a SCell (and/or in response to the UE deactivating the SCell), the UE clears configured uplink grant Type 2, suspends configured uplink grant Type 1 and/or flushes the HARQ buffers (e.g., all HARQ buffers) associated with the SCell. In some examples, if a SCell is deactivated, the UE does not transmit on the SCell and does not monitor the PDCCH on and/or for the SCell.

Figure 8:
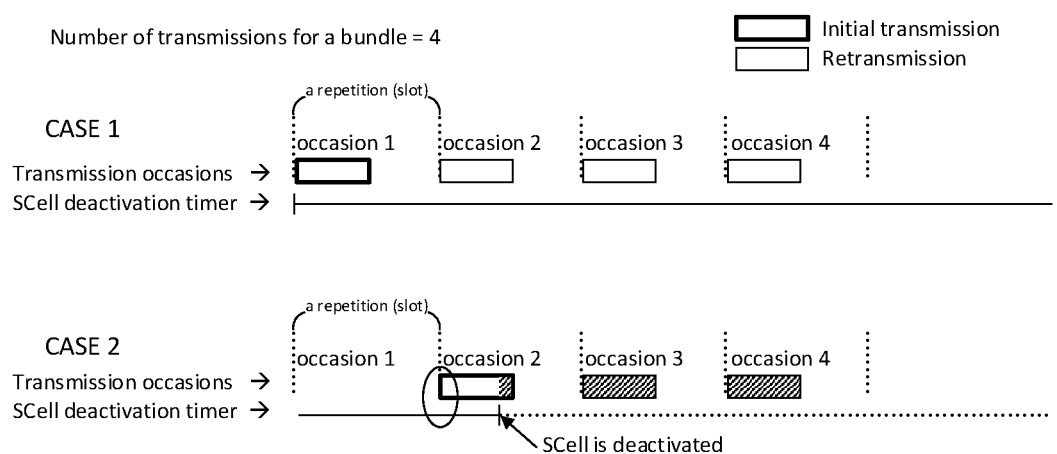
FIG. 8 is a diagram illustrating exemplary cases associated with bundled transmission according to one exemplary embodiment.

An example is shown in FIG. 8. In the example, a bundle has four transmission occasions comprising occasion 1, occasion 2, occasion 3 and occasion 4. Case 1 of FIG. 8 illustrates a scenario in which the initial transmission occurs at the first transmission occasion (e.g., sequentially and/or temporally the first transmission occasion, such as an initial and/or earliest transmission occasion) of a bundle and/or case 2 illustrates a problematic scenario in which the initial transmission occurs at a transmission occasion other than the first transmission occasion.

In an example, in case 1 of FIG. 8, the initial transmission occurs at the first transmission occasion (e.g., occasion 1) for the configured uplink grant, and the UE starts and/or restarts the SCell deactivation timer (e.g., sCellDeactivationTimer) at the first transmission occasion (e.g., at the beginning of the first transmission occasion). The UE does not deactivate the SCell during uplink transmissions of the bundle when the SCell deactivation timer (e.g., sCellDeactivationTimer) is running.

In case 2 of FIG. 8, the initial transmission occurs at the second transmission occasion (e.g., occasion 2) for the uplink grant within the bundle of the configured uplink grant. The UE does not restart the SCell deactivation timer (e.g., sCellDeactivationTimer) at the first transmission occasion (e.g., occasion 1) and/or transmission occasions following the first transmission occasion. The UE deactivates the SCell when the SCell deactivation timer (e.g., sCellDeactivationTimer) expires. For example, the UE may deactivate the SCell in response to (and/or upon) expiration of the SCell deactivation timer (e.g., sCellDeactivationTimer). For example, the SCell may be deactivated during a portion of the second transmission occasion (e.g., occasion 2) and during the third transmission occasion (e.g., occasion 3) and the fourth transmission occasion (e.g., occasion 4). In some examples, when the SCell is deactivated, the UE does not transmit on the SCell and does not monitor PDCCH on and/or for the SCell.

One or more techniques and/or devices are provided herein to solve one or more of the aforementioned issues (such as the UE deactivating a SCell and/or the UE not monitoring PDCCH on and/or for the SCell during a period of time comprising one or more transmission occasions of a bundle).

In an example, the UE may restart the SCell deactivation timer (e.g., sCellDeactivationTimer) if a MAC PDU is transmitted in an uplink grant within a bundle of a configured uplink grant.

In some examples, the UE may restart the SCell deactivation timer (e.g., sCellDeactivationTimer) based on (e.g., upon, after and/or in response to) a MAC PDU being transmitted in an uplink grant within a bundle of a configured uplink grant if the uplink grant is used for initial transmission (of the MAC PDU, for example). In some examples, the initial transmission may occur (e.g., may be performed) at the uplink grant within the bundle of a configured uplink grant if (and/or when) the MAC PDU is not available (for transmission, for example) at the configured uplink grant, and the MAC PDU is available (for transmission, for example) at the bundle of the configured uplink grant. Alternatively and/or additionally, the initial transmission may occur (e.g., may be performed) at the uplink grant within the bundle of a configured uplink grant if the redundancy version of the uplink grant within the bundle of the configured uplink grant allows initial transmission (e.g., if the redundancy version indicates that the uplink grant supports and/or applies to an initial transmission). In some examples, the configured uplink grant may be a Type 1 configured uplink grant. Alternatively and/or additionally, the configured uplink grant may be a Type 2 configured uplink grant. The bundle of the configured uplink grant may follow (and/or be after) an initial uplink grant (e.g., a second configured uplink grant that is the same as or different than the configured uplink grant) delivered to the HARQ entity (e.g., the bundle of the configured uplink grant may be after the initial uplink grant is delivered to the HARQ entity).

In some examples, the UE may restart the SCell deactivation timer (e.g., sCellDeactivationTimer) based on (e.g., upon, after and/or in response to) a MAC PDU being transmitted via a transmission in an uplink grant within a bundle of a configured uplink grant if the transmission of the MAC PDU is the first time that the MAC PDU (of the bundle of a configured uplink grant) is transmitted. In some examples, the MAC PDU of the bundle of a configured uplink grant may be transmitted for the first time in the uplink grant within the bundle of the configured uplink grant if (and/or when) the MAC PDU is not available (for transmission, for example) at the configured uplink grant, and the MAC PDU is available (for transmission, for example) at the bundle of the configured uplink grant. Alternatively and/or additionally, the MAC PDU of the bundle of a configured uplink grant may be transmitted for the first time in the uplink grant within the bundle of a configured uplink grant if the redundancy version of the uplink grant within the bundle of the configured uplink grant allows initial transmission (e.g., if the redundancy version indicates that the uplink grant supports and/or applies to an initial transmission). In some examples, the configured uplink grant may be a Type 1 configured uplink grant. Alternatively and/or additionally, the configured uplink grant may be a Type 2 configured uplink grant. The bundle of the configured uplink grant may follow (and/or be after) an initial uplink grant (e.g., a second configured uplink grant that is the same as or different than the configured uplink grant) delivered to the HARQ entity (e.g., the bundle of the configured uplink grant may be after the initial uplink grant is delivered to the HARQ entity).

The UE may receive one or more configurations related to configured uplink grant, wherein the one or more configurations are provided by the network. The UE may receive one or more configurations related to one or more Serving Cell configurations, wherein the one or more configurations are provided by the network.

The UE may start a timer if the timer is not running. The UE may restart a timer if the timer is already running.

To enhance 3GPP MAC specification for wireless communication in accordance with some embodiments herein, Enhancements 12-14 are provided herein. Enhancements 12-14 are reflective of implementation in accordance with some embodiments herein, and comprise additions to an original version comprising one or more portions of 3GPP TS 38.321 V16.0.0. The original version, without any additions of Enhancements 12-14, is quoted below:
5.9 Activation/Deactivation of SCells
[ . . . ]
   The MAC entity shall for each configured SCell:
   [ . . . ]
   1> if a MAC PDU is transmitted in a configured uplink grant or received in a configured downlink assignment:
     2> restart the sCellDeactivationTimer associated with the SCell
[ . . . ]

In Enhancement 12, additions 16-17 are made to the original version in accordance with some embodiments of the present disclosure. The addition 16 of Enhancement 12 is in bold, and is preceded by the term "ADDITION 16 STARTS:" and followed by the term "ADDITION 16 ENDS" to distinguish the addition 16 from what is originally included in the original version. The addition 17 of Enhancement 12 is in bold, and is preceded by the term "ADDITION 17 STARTS:" and followed by the term "ADDITION 17 ENDS" to distinguish the addition 17 from what is originally included in the original version.
Enhancement 12:
5.9 Activation/Deactivation of SCells
[ . . . ]
   The MAC entity shall for each configured SCell:
   [ . . . ]
   1> if a MAC PDU is transmitted in a configured uplink grant ADDITION 16 STARTS: ADDITION 16 ENDS or
   ADDITION 17 STARTS:
   1> if a MAC PDU is transmitted in part of a bundle of a configured uplink grant, and the uplink grant is used for initial transmission; or
   1> if a MAC PDU is ADDITION 17 ENDS received in a configured downlink assignment:
     2> restart the sCellDeactivationTimer associated with the SCell
[ . . . ]

For clarity, a version of Enhancement 12 is provided without indications of the beginnings and endings of additions 16-17:
5.9 Activation/Deactivation of SCells
[ . . . ]
   The MAC entity shall for each configured SCell:
   [ . . . ]
   1> if a MAC PDU is transmitted in a configured uplink grant; or
   1> if a MAC PDU is transmitted in part of a bundle of a configured uplink grant, and the uplink grant is used for initial transmission; or
   1> if a MAC PDU is received in a configured downlink assignment:
     2> restart the sCellDeactivationTimer associated with the SCell In Enhancement 13, additions 18-19 are made to the original version in accordance with some embodiments of the present disclosure. The addition 18 of Enhancement 13 is in bold, and is preceded by the term "ADDITION 18 STARTS:" and followed by the term "ADDITION 18 ENDS" to distinguish the addition 18 from what is originally included in the original version. The addition 19 of Enhancement 13 is in bold, and is preceded by the term "ADDITION 19 STARTS:" and followed by the term "ADDITION 19 ENDS" to distinguish the addition 19 from what is originally included in the original version.
Enhancement 13:
5.9 Activation/Deactivation of SCells
[ . . . ]
   The MAC entity shall for each configured SCell:
   [ . . . ]
   1> if a MAC PDU is transmitted in a configured uplink grant ADDITION 18 STARTS: ADDITION 18 ENDS or
   ADDITION 19 STARTS:
   1> if a MAC PDU is transmitted in part of a bundle of a configured uplink grant and the MAC PDU is transmitted the first time in the bundle; or
   1> if a MAC PDU is ADDITION 19 ENDS received in a configured downlink assignment:
     2> restart the sCellDeactivationTimer associated with the SCell
[ . . . ]

For clarity, a version of Enhancement 13 is provided without indications of the beginnings and endings of additions 18-19:
5.9 Activation/Deactivation of SCells
[ . . . ]
   The MAC entity shall for each configured SCell:
   [ . . . ]
   1> if a MAC PDU is transmitted in a configured uplink grant; or
   1> if a MAC PDU is transmitted in part of a bundle of a configured uplink grant and the MAC PDU is transmitted the first time in the bundle; or
   1> if a MAC PDU is received in a configured downlink assignment:
     2> restart the sCellDeactivationTimer associated with the SCell
[ . . . ]

In Enhancement 14, additions 20-21 are made to the original version in accordance with some embodiments of the present disclosure. The addition 20 of Enhancement 14 is in bold, and is preceded by the term "ADDITION 20 STARTS:" and followed by the term "ADDITION 20 ENDS" to distinguish the addition 20 from what is originally included in the original version. The addition 21 of Enhancement 14 is in bold, and is preceded by the term "ADDITION 21 STARTS:" and followed by the term "ADDITION 21 ENDS" to distinguish the addition 21 from what is originally included in the original version.
Enhancement 14:
5.9 Activation/Deactivation of SCells
[ . . . ]
   The MAC entity shall for each configured SCell:
   [ . . . ]
   1> if a MAC PDU is transmitted in a configured uplink grant ADDITION 20 STARTS: ADDITION 20 ENDS or
   ADDITION 21 STARTS:
   1> if a MAC PDU is transmitted in part of a bundle of a configured uplink grant and the MAC PDU has not been transmitted for the bundle before; or 1> if a MAC PDU is ADDITION 21 ENDS received in a configured downlink assignment:
2> restart the sCellDeactivationTimer associated with the SCell
[ . . . ]

For clarity, a version of Enhancement 14 is provided without indications of the beginnings and endings of additions 20-21:

5.9 Activation/Deactivation of SCells
[ . . . ]
The MAC entity shall for each configured SCell:
[ . . . ]
1> if a MAC PDU is transmitted in a configured uplink grant; or
1> if a MAC PDU is transmitted in part of a bundle of a configured uplink grant and the MAC PDU has not been transmitted for the bundle before; or
1> if a MAC PDU is received in a configured downlink assignment:
2> restart the sCellDeactivationTimer associated with the SCell
[ . . . ]

In some examples, a network may configure one or more BWPs to a Serving cell of a UE (e.g., the network may configure the Serving cell of the UE with one or more BWPs). When BWP switching (e.g., switching a BWP), the UE may deactivate an active BWP and activate an inactive BWP. The BWP switching is controlled by (e.g., performed based on) one or more network signals, a BWP inactivity timer (e.g., bwp-InactivityTimer), and/or Random Access procedure. In some examples, a BWP is activated and the BWP is not a dormant BWP, the UE performs transmission and monitors a PDCCH. Alternatively and/or additionally, if a BWP is deactivated, the UE may not perform transmission and may not monitor the PDCCH. In some examples, in response to a BWP being deactivated (and/or if the BWP is deactivated), the UE clears configured uplink grant Type 2 and suspends configured uplink grant Type 1.

In some examples, when there is no data transmission on a current BWP for a period of time (e.g., the duration of bwp-InactivityTimer), the UE switches to a default BWP and/or an initial BWP (to save power, for example). In some examples, a duration of the bwp-InactivityTimer corresponds to (e.g., is equal to and/or based on) a duration of time between a time at which the bwp-InactivityTimer is started and a latest expected time that a transmission occurs on a BWP. For example, the duration of the bwp-InactivityTimer may be the maximum duration until a transmission occurs on a BWP (e.g., the duration of the bwp-InactivityTimer may be the maximum duration of time between a time at which the bwp-InactivityTimer starts and a time at which a transmission occurs on a BWP). In some examples, the UE starts and/or restarts the bwp-InactivityTimer when receiving a PDCCH and switching to a BWP that is not a default, initial and/or dormant BWP. Alternatively and/or additionally, the UE may start and/or restart the bwp-InactivityTimer in response to (and/or upon) receiving a PDCCH and switching to a BWP that is not a default, initial and/or dormant BWP. Alternatively and/or additionally, the UE may start and/or restart the bwp-InactivityTimer when (and/or in response to and/or upon) receiving a PDCCH indicating an uplink grant and/or a downlink assignment on and/or for an active BWP. Alternatively and/or additionally, the UE may start and/or restart the bwp-InactivityTimer when a MAC PDU is transmitted in a configured uplink grant and/or received in a configured downlink assignment. Alternatively and/or additionally, the UE may start and/or restart the bwp-InactivityTimer in response to (and/or upon) a MAC PDU being transmitted in a configured uplink grant and/or being received in a configured downlink assignment.

An issue may occur if the UE performs bundled transmissions (of a configured uplink grant, for example), wherein an initial transmission occurs in part of the bundle (e.g., in the middle of the bundle).

According to the current NR MAC specification (such as discussed in 3GPP TS 38.321 V16.0.0), if a MAC PDU is transmitted in a configured uplink grant, the UE may restart the bwp-InactivityTimer. However, the UE may not restart the bwp-InactivityTimer when the MAC PDU is transmitted in part of a bundle of the configured uplink grant. If data (e.g., the MAC PDU) for transmission is not available (for transmission, for example) at the configured uplink grant and the data for transmission is available (for transmission, for example) at an uplink grant within the bundle of the configured uplink grant, the initial transmission of the data (e.g., the MAC PDU) may occur in part of a bundle of the configured uplink grant (when the redundancy version allows the initial transmission, for example), wherein, in some examples, the redundancy version that allows the initial transmission may be associated with the part of the bundle of the configured uplink grant in which the initial transmission occurs. Accordingly, the bwp-InactivityTimer may not be restarted at a (e.g., any) transmission within the part of the bundle of the configured uplink grant, and may expire during the transmission of the bundle of the configured uplink grant (such as shown in case 2 of FIG. 9, discussed below). The UE may switch the active BWP to a default BWP and/or initial BWP (such as in response to expiration of the bwp-InactivityTimer). The active BWP may be deactivated (in response to expiration of the bwp-InactivityTimer, for example) even if there are ongoing transmission on the active BWP. Accordingly, the UE may not be able to receive and/or transmit data using the active BWP (e.g., data missing may occur).

Figure 9:
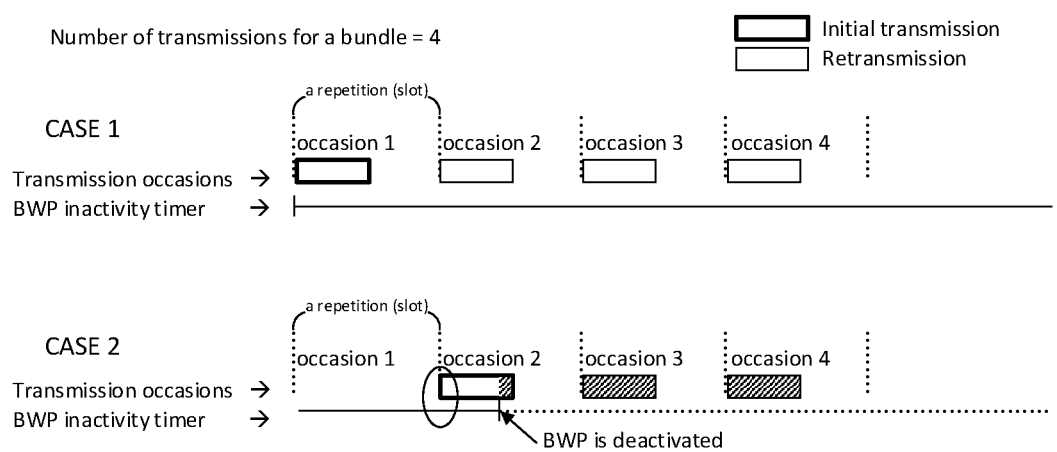
FIG. 9 is a diagram illustrating exemplary cases associated with bundled transmission according to one exemplary embodiment.

An example is shown in FIG. 9. In the example, a bundle has four transmission occasions comprising occasion 1, occasion 2, occasion 3 and occasion 4. Case 1 of FIG. 9 illustrates a scenario in which the initial transmission occurs at the first transmission occasion (e.g., sequentially and/or temporally the first transmission occasion, such as an initial and/or earliest transmission occasion) of a bundle and/or case 2 illustrates a problematic scenario in which the initial transmission occurs at a transmission occasion other than the first transmission occasion.

In an example, in case 1 of FIG. 9, the initial transmission occurs at the first transmission occasion (e.g., occasion 1) for the configured uplink grant, and the UE starts and/or restarts the BWP inactivity timer (e.g., bwp-InactivityTimer) at the first transmission occasion (e.g., at the beginning of the first transmission occasion). The UE does not deactivate the BWP during uplink transmissions of the bundle when the BWP inactivity timer (e.g., bwp-InactivityTimer) is running.

In case 2 of FIG. 9, the initial transmission occurs at the second transmission occasion (e.g., occasion 2) for the uplink grant within the bundle of the configured uplink grant. The UE does not restart the BWP inactivity timer (e.g., bwp-InactivityTimer) at the first transmission occasion (e.g., occasion 1) and/or transmission occasions following the first transmission occasion. The UE deactivates the BWP when the BWP inactivity timer (e.g., bwp-InactivityTimer) expires. For example, the UE may deactivate the BWP in response to (and/or upon) expiration of the BWP inactivity timer (e.g., bwp-InactivityTimer). For example, the BWP is deactivated during a portion of the second transmission occasion (e.g., occasion 2) and during the third transmission occasion (e.g., occasion 3) and the fourth transmission occasion (e.g., occasion 4). In some examples, when the BWP is deactivated, the UE may not perform transmission and may not monitor the PDCCH.

One or more techniques and/or devices are provided herein to solve one or more of the aforementioned issues (such as the UE deactivating a BWP and/or the UE not monitoring PDCCH during a period of time comprising one or more transmission occasions of a bundle).

In an example, the UE may restart the BWP inactivity timer (e.g., bwp-InactivityTimer) if a MAC PDU is transmitted in an uplink grant within a bundle of a configured uplink grant.

In some examples, the UE may restart the BWP inactivity timer (e.g., bwp-InactivityTimer) based on (e.g., upon, after and/or in response to) a MAC PDU being transmitted in an uplink grant within a bundle of a configured uplink grant if the uplink grant is used for initial transmission (of the MAC PDU, for example). In some examples, the initial transmission may occur (e.g., may be performed) at the uplink grant within the bundle of a configured uplink grant if (and/or when) the MAC PDU is not available (for transmission, for example) at the configured uplink grant, and the MAC PDU is available (for transmission, for example) at the bundle of the configured uplink grant. Alternatively and/or additionally, the initial transmission may occur (e.g., may be performed) at the uplink grant within the bundle of a configured uplink grant if the redundancy version of the uplink grant within the bundle of the configured uplink grant allows initial transmission (e.g., if the redundancy version indicates that the uplink grant supports and/or applies to an initial transmission). In some examples, the configured uplink grant may be a Type 1 configured uplink grant. Alternatively and/or additionally, the configured uplink grant may be a Type 2 configured uplink grant. The bundle of the configured uplink grant may follow (and/or be after) an initial uplink grant (e.g., a second configured uplink grant that is the same as or different than the configured uplink grant) delivered to the HARQ entity (e.g., the bundle of the configured uplink grant may be after the initial uplink grant is delivered to the HARQ entity).

In some examples, the UE may restart the BWP inactivity timer (e.g., bwp-InactivityTimer) based on (e.g., upon, after and/or in response to) a MAC PDU being transmitted via a transmission in an uplink grant within a bundle of a configured uplink grant, if the transmission of the MAC PDU is the first time that the MAC PDU (of the bundle of a configured uplink grant) is transmitted. In some examples, the MAC PDU of the bundle of a configured uplink grant may be transmitted for the first time in the uplink grant within the bundle of the configured uplink grant if (and/or when) the MAC PDU is not available (for transmission, for example) at the configured uplink grant, and the MAC PDU is available (for transmission, for example) at the bundle of the configured uplink grant. Alternatively and/or additionally, the MAC PDU of the bundle of a configured uplink grant may be transmitted for the first time in the uplink grant within the bundle of a configured uplink grant if the redundancy version of the uplink grant within the bundle of the configured uplink grant allows initial transmission (e.g., if the redundancy version indicates that the uplink grant supports an initial transmission). In some examples, the configured uplink grant may be a Type 1 configured uplink grant. Alternatively and/or additionally, the configured uplink grant may be a Type 2 configured uplink grant. The bundle of the configured uplink grant may follow (and/or be after) an initial uplink grant (e.g., a second configured uplink grant that is the same as or different than the configured uplink grant) delivered to the HARQ entity (e.g., the bundle of the configured uplink grant may be after the initial uplink grant is delivered to the HARQ entity).

The UE may receive one or more configurations related to configured uplink grant, wherein the one or more configurations are provided by the network. The UE may receive one or more configurations related to one or more BWP configurations, wherein the one or more configurations are provided by the network.

To enhance 3GPP MAC specification for wireless communication in accordance with some embodiments herein, Enhancements 15-17 are provided herein. Enhancements 15-17 are reflective of implementation in accordance with some embodiments herein, and comprise additions to an original version comprising one or more portions of 3GPP TS 38.321 V16.0.0. The original version, without any additions of Enhancements 15-17, is quoted below:

5.15.1 Downlink and Uplink

The MAC entity shall for each activated Serving Cell configured with bwp-InactivityTimer:

[ . . . ]

1> if the defaultDownlinkBWP-Id is configured, and the active DL BWP is not the BWP indicated by the defaultDownlinkBWP-Id; or 1> if the defaultDownlinkBWP-Id is not configured, and the active DL BWP is not the initialDownlinkBWP:

2> if a PDCCH addressed to C-RNTI or CS-RNTI indicating downlink assignment or uplink grant is received on the active BWP; or 2> if a PDCCH addressed to C-RNTI or CS-RNTI indicating downlink assignment or uplink grant is received for the active BWP; or 2> if a MAC PDU is transmitted in a configured uplink grant or received in a configured downlink assignment:

3> if there is no ongoing Random Access procedure associated with this Serving Cell; or 3> if the ongoing Random Access procedure associated with this Serving Cell is successfully completed upon reception of this PDCCH addressed to C-RNTI (as specified in clauses 5.1.4 and 5.1.5):

4> start or restart the bwp-InactivityTimer associated with the active DL BWP.

In Enhancement 15, additions 22-23 are made to the original version in accordance with some embodiments of the present disclosure. The addition 22 of Enhancement 15 is in bold, and is preceded by the term "ADDITION 22 STARTS:" and followed by the term "ADDITION 22 ENDS" to distinguish the addition 22 from what is originally included in the original version. The addition 23 of Enhancement 15 is in bold, and is preceded by the term "ADDITION 23 STARTS:" and followed by the term "ADDITION 23 ENDS" to distinguish the addition 23 from what is originally included in the original version.

Enhancement 15:

5.15.1 Downlink and Uplink

The MAC entity shall for each activated Serving Cell configured with bwp-InactivityTimer:

[ . . . ]

1> if the defaultDownlinkBWP-Id is configured, and the active DL BWP is not the BWP indicated by the defaultDownlinkBWP-Id; or 1> if the defaultDownlinkBWP-Id is not configured, and the active DL BWP is not the initialDownlinkBWP:

2> if a PDCCH addressed to C-RNTI or CS-RNTI indicating downlink assignment or uplink grant is received on the active BWP; or
2> if a PDCCH addressed to C-RNTI or CS-RNTI indicating downlink assignment or uplink grant is received for the active BWP; or
2> if a MAC PDU is transmitted in a configured uplink grant ADDITION 22 STARTS: ADDITION 22 ENDS or
ADDITION 23 STARTS:
2> if a MAC PDU is transmitted in part of a bundle of a configured uplink grant, and the uplink grant is used for initial transmission; or
2> if a MAC PDU is ADDITION 23 ENDS received in a configured downlink assignment:
3> if there is no ongoing Random Access procedure associated with this Serving Cell; or
3> if the ongoing Random Access procedure associated with this Serving Cell is successfully completed upon reception of this PDCCH addressed to C-RNTI (as specified in clauses 5.1.4 and 5.1.5):
4> start or restart the bwp-InactivityTimer associated with the active DL BWP.
[ . . . ]

For clarity, a version of Enhancement 15 is provided without indications of the beginnings and endings of additions 22-23:
5.15.1 Downlink and Uplink
The MAC entity shall for each activated Serving Cell configured with bwp-InactivityTimer:
[ . . . ]
1> if the defaultDownlinkBWP-Id is configured, and the active DL BWP is not the BWP indicated by the defaultDownlinkBWP-Id; or
1> if the defaultDownlinkBWP-Id is not configured, and the active DL BWP is not the initialDownlinkBWP:
2> if a PDCCH addressed to C-RNTI or CS-RNTI indicating downlink assignment or uplink grant is received on the active BWP; or
2> if a PDCCH addressed to C-RNTI or CS-RNTI indicating downlink assignment or uplink grant is received for the active BWP; or
2> if a MAC PDU is transmitted in a configured uplink grant; or
2> if a MAC PDU is transmitted in part of a bundle of a configured uplink grant, and the uplink grant is used for initial transmission; or
2> if a MAC PDU is received in a configured downlink assignment:
3> if there is no ongoing Random Access procedure associated with this Serving Cell; or
3> if the ongoing Random Access procedure associated with this Serving Cell is successfully completed upon reception of this PDCCH addressed to C-RNTI (as specified in clauses 5.1.4 and 5.1.5):
4> start or restart the bwp-InactivityTimer associated with the active DL BWP.
[ . . . ]

In Enhancement 16, additions 24-25 are made to the original version in accordance with some embodiments of the present disclosure. The addition 24 of Enhancement 16 is in bold, and is preceded by the term "ADDITION 24 STARTS:" and followed by the term "ADDITION 24 ENDS" to distinguish the addition 24 from what is originally included in the original version. The addition 25 of Enhancement 16 is in bold, and is preceded by the term "ADDITION 25 STARTS:" and followed by the term "ADDITION 25 ENDS" to distinguish the addition 25 from what is originally included in the original version.

Enhancement 16:
5.15.1 Downlink and Uplink
[ . . . ]
The MAC entity shall for each activated Serving Cell configured with bwp-InactivityTimer:
[ . . . ]
1> if the defaultDownlinkBWP-Id is configured, and the active DL BWP is not the BWP indicated by the defaultDownlinkBWP-Id; or
1> if the defaultDownlinkBWP-Id is not configured, and the active DL BWP is not the initialDownlinkBWP:
2> if a PDCCH addressed to C-RNTI or CS-RNTI indicating downlink assignment or uplink grant is received on the active BWP; or
2> if a PDCCH addressed to C-RNTI or CS-RNTI indicating downlink assignment or uplink grant is received for the active BWP; or
2> if a MAC PDU is transmitted in a configured uplink grant ADDITION 24 STARTS: ADDITION 24 ends or
ADDITION 25 STARTS:
2> if a MAC PDU is transmitted in part of a bundle of a configured uplink grant and the MAC PDU is transmitted the first time in the bundle; or
2> if a MAC PDU is ADDITION 25 ENDS received in a configured downlink assignment:
3> if there is no ongoing Random Access procedure associated with this Serving Cell; or
3> if the ongoing Random Access procedure associated with this Serving Cell is successfully completed upon reception of this PDCCH addressed to C-RNTI (as specified in clauses 5.1.4 and 5.1.5):
4> start or restart the bwp-InactivityTimer associated with the active DL BWP.
[ . . . ]

For clarity, a version of Enhancement 16 is provided without indications of the beginnings and endings of additions 24-25:
5.15.1 Downlink and Uplink
The MAC entity shall for each activated Serving Cell configured with bwp-InactivityTimer:
[ . . . ]
1> if the defaultDownlinkBWP-Id is configured, and the active DL BWP is not the BWP indicated by the defaultDownlinkBWP-Id; or
1> if the defaultDownlinkBWP-Id is not configured, and the active DL BWP is not the initialDownlinkBWP:
2> if a PDCCH addressed to C-RNTI or CS-RNTI indicating downlink assignment or uplink grant is received on the active BWP; or
2> if a PDCCH addressed to C-RNTI or CS-RNTI indicating downlink assignment or uplink grant is received for the active BWP; or
2> if a MAC PDU is transmitted in a configured uplink grant; or
2> if a MAC PDU is transmitted in part of a bundle of a configured uplink grant and the MAC PDU is transmitted the first time in the bundle; or
2> if a MAC PDU is received in a configured downlink assignment:
3> if there is no ongoing Random Access procedure associated with this Serving Cell; or
3> if the ongoing Random Access procedure associated with this Serving Cell is successfully completed upon reception of this PDCCH addressed to C-RNTI (as specified in clauses 5.1.4 and 5.1.5):
    4> start or restart the bwp-InactivityTimer associated with the active DL BWP.

In Enhancement 17, additions 26-27 are made to the original version in accordance with some embodiments of the present disclosure. The addition 26 of Enhancement 17 is in bold, and is preceded by the term "ADDITION 26 STARTS:" and followed by the term "ADDITION 26 ENDS" to distinguish the addition 26 from what is originally included in the original version. The addition 27 of Enhancement 17 is in bold, and is preceded by the term "ADDITION 27 STARTS:" and followed by the term "ADDITION 27 ENDS" to distinguish the addition 27 from what is originally included in the original version.

Enhancement 17:

5.15.1 Downlink and Uplink

[ . . . ]

The MAC entity shall for each activated Serving Cell configured with bwp-InactivityTimer:

[ . . . ]

1> if the defaultDownlinkBWP-Id is configured, and the active DL BWP is not the BWP indicated by the defaultDownlinkBWP-Id; or 1> if the defaultDownlinkBWP-Id is not configured, and the active DL BWP is not the initialDownlinkBWP:

2> if a PDCCH addressed to C-RNTI or CS-RNTI indicating downlink assignment or uplink grant is received on the active BWP; or 2> if a PDCCH addressed to C-RNTI or CS-RNTI indicating downlink assignment or uplink grant is received for the active BWP; or 2> if a MAC PDU is transmitted in a configured uplink grant ADDITION 26 STARTS: ADDITION 26 ENDS or

ADDITION 27 STARTS:

2> if a MAC PDU is transmitted in part of a bundle of a configured uplink grant and the MAC PDU has not been transmitted for the bundle before; or 2> if a MAC PDU is ADDITION 27 ENDS_received in a configured downlink assignment:

3> if there is no ongoing Random Access procedure associated with this Serving Cell; or 3> if the ongoing Random Access procedure associated with this Serving Cell is successfully completed upon reception of this PDCCH addressed to C-RNTI (as specified in clauses 5.1.4 and 5.1.5):

4> start or restart the bwp-InactivityTimer associated with the active DL BWP.

[ . . . ]

For clarity, a version of Enhancement 17 is provided without indications of the beginnings and endings of additions 26-27:

5.15.1 Downlink and Uplink

The MAC entity shall for each activated Serving Cell configured with bwp-InactivityTimer:

[ . . . ]

1> if the defaultDownlinkBWP-Id is configured, and the active DL BWP is not the BWP indicated by the defaultDownlinkBWP-Id; or 1> if the defaultDownlinkBWP-Id is not configured, and the active DL BWP is not the initialDownlinkBWP:

2> if a PDCCH addressed to C-RNTI or CS-RNTI indicating downlink assignment or uplink grant is received on the active BWP; or 2> if a PDCCH addressed to C-RNTI or CS-RNTI indicating downlink assignment or uplink grant is received for the active BWP; or 2> if a MAC PDU is transmitted in a configured uplink grant; or 2> if a MAC PDU is transmitted in part of a bundle of a configured uplink grant and the MAC PDU has not been transmitted for the bundle before; or 2> if a MAC PDU is received in a configured downlink assignment:

3> if there is no ongoing Random Access procedure associated with this Serving Cell; or 3> if the ongoing Random Access procedure associated with this Serving Cell is successfully completed upon reception of this PDCCH addressed to C-RNTI (as specified in clauses 5.1.4 and 5.1.5):

4> start or restart the bwp-InactivityTimer associated with the active DL BWP.

[ . . . ]

According to some embodiments, one, some and/or all of Enhancements 1-17 and/or a portion of one, some and/or all of Enhancements 1-17 may be implemented.

One, some and/or all of the foregoing techniques and/or embodiments can be formed to a new embodiment.

In some examples, embodiments disclosed herein may be implemented independently and/or separately. Alternatively and/or additionally, a combination of embodiments described herein may be implemented. Alternatively and/or additionally, a combination of embodiments described herein may be implemented concurrently and/or simultaneously.

Various techniques of the present disclosure may be performed independently and/or separately from one another. Alternatively and/or additionally, various techniques of the present disclosure may be combined and/or implemented using a single system. Alternatively and/or additionally, various techniques of the present disclosure may be implemented concurrently and/or simultaneously.

Figure 10:
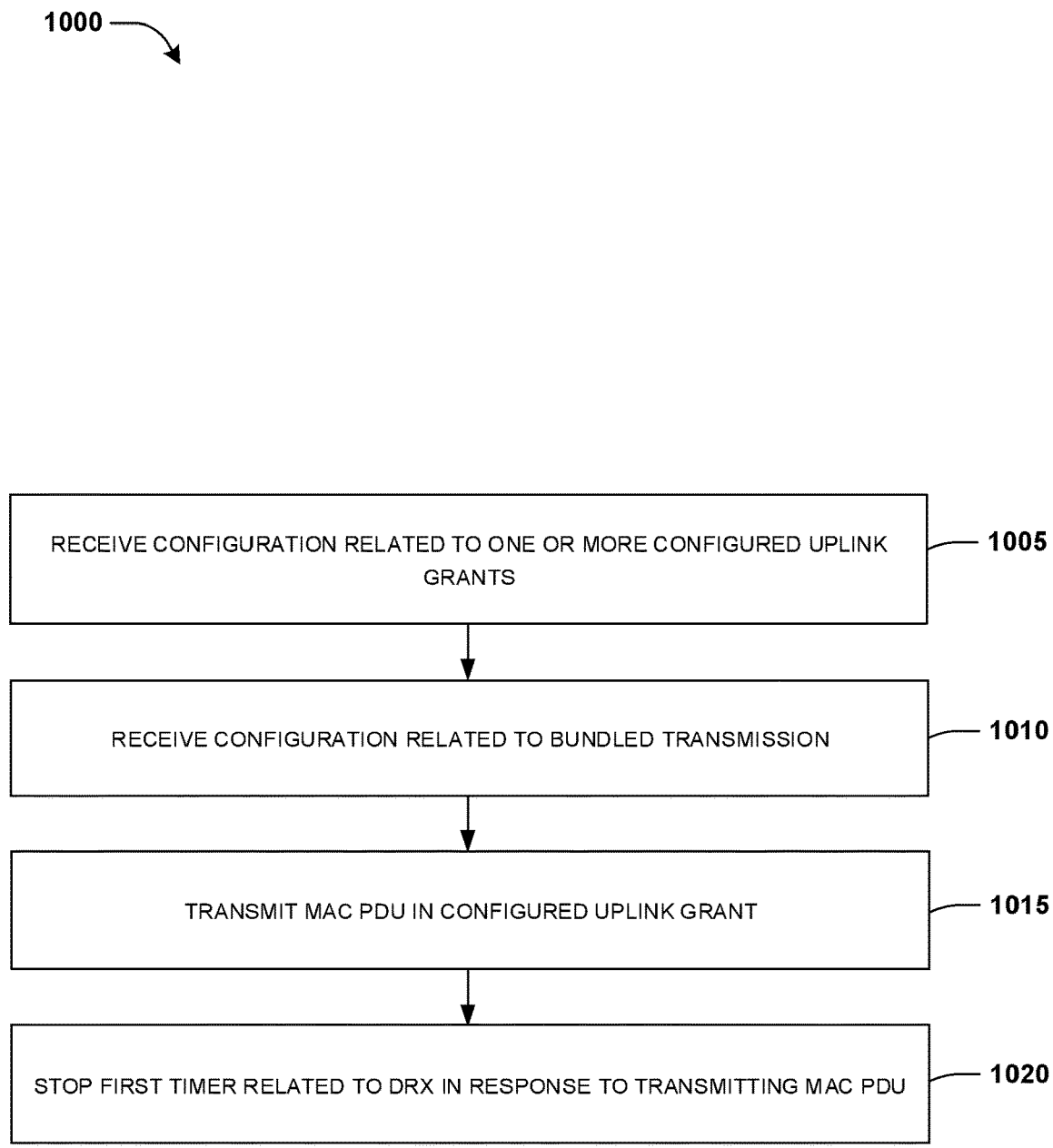
FIG. 10 is a flow chart according to one exemplary embodiment.

FIG. 10 is a flow chart 1000 according to one exemplary embodiment from the perspective of a UE. In step 1005, the UE receives a configuration related to one or more configured uplink grants. In step 1010, the UE receives a configuration related to bundled transmission. In step 1015, the UE transmits a MAC PDU in a configured uplink grant. In step 1020, the UE stops a first timer related to DRX in response to transmitting the MAC PDU.

In one embodiment, the UE stops the first timer in response to transmitting the MAC PDU if the configured uplink grant is used for initial transmission (of the MAC PDU, for example).

In one embodiment, the UE stops the first timer in response to transmitting the MAC PDU if the MAC PDU transmission is the first repetition (e.g., sequentially and/or temporally the first repetition, such as an initial and/or earliest repetition) of a PUSCH transmission (e.g., the first repetition of the PUSCH transmission in a bundle).

In one embodiment, the UE stops the first timer at the first repetition (e.g., sequentially and/or temporally the first repetition, such as an initial and/or earliest repetition) of a PUSCH transmission.

In one embodiment, the UE does not stop the first timer (in response to transmitting the MAC PDU, for example) if the configured uplink grant is not used for an initial transmission, such as if an initial transmission (that is not a retransmission, for example) is not performed using the configured uplink grant.

In one embodiment, the UE does not stop the first timer (in response to transmitting the MAC PDU, for example) if the MAC PDU transmission is not the first repetition (e.g., sequentially and/or temporally the first repetition, such as an initial and/or earliest repetition) of a PUSCH transmission.

In one embodiment, the UE does not stop the first timer (in response to transmitting the MAC PDU, for example) at a repetition other than (e.g., after) the first repetition (e.g., sequentially and/or temporally the first repetition, such as an initial and/or earliest repetition) of a PUSCH transmission.

In one embodiment, the UE starts a second timer in response to transmitting the MAC PDU.

In one embodiment, a duration of the second timer corresponds to (e.g., is equal to and/or based on) a duration of time between a time at which the second timer is started and an earliest expected time of reception of an uplink HARQ retransmission grant (e.g., the duration of the second timer may be the minimum duration of time until an uplink HARQ retransmission grant is expected).

In one embodiment, the second timer is a DRX HARQ RTT timer (e.g., drx-HARQ-RTT-TimerUL).

In one embodiment, the UE starts the second timer (in response to transmitting the MAC PDU, for example) if the configured uplink grant is used for initial transmission (e.g., initial transmission of the MAC PDU).

In one embodiment, the UE starts the second timer (in response to transmitting the MAC PDU, for example) if the MAC PDU transmission is the first repetition (e.g., sequentially and/or temporally the first repetition, such as an initial and/or earliest repetition) of a PUSCH transmission.

In one embodiment, the UE starts the second timer at the first repetition (e.g., sequentially and/or temporally the first repetition, such as an initial and/or earliest repetition) of a PUSCH transmission.

In one embodiment, the UE does not start the second timer (in response to transmitting the MAC PDU, for example) if the configured uplink grant is not used for initial transmission (e.g., initial transmission of the MAC PDU), such as if the configured uplink grant is used for retransmissions of the MAC PDU.

In one embodiment, the UE does not start the second timer (in response to transmitting the MAC PDU, for example) if the MAC PDU transmission is not the first repetition (e.g., sequentially and/or temporally the first repetition, such as an initial and/or earliest repetition) of a PUSCH transmission.

In one embodiment, the UE does not start the second timer at a repetition other than the first repetition (e.g., sequentially and/or temporally the first repetition, such as an initial and/or earliest repetition) of a PUSCH transmission (such as at a repetition of the PUSCH transmission that is after the first repetition of the PUSCH transmission).

In one embodiment, the MAC PDU transmission is the first transmission (e.g., sequentially and/or temporally the first transmission, such as an initial and/or earliest transmission) of a bundle of a configured uplink grant.

In one embodiment, the MAC PDU transmission is the first transmission (e.g., sequentially and/or temporally the first transmission, such as an initial and/or earliest transmission) of a PUSCH transmission of a configured uplink grant.

In one embodiment, the configured uplink grant is used for initial transmission if (and/or when) the MAC PDU is available (for transmission, for example).

In one embodiment, the configured uplink grant is used for initial transmission when a redundancy version of the configured uplink grant allows initial transmission (e.g., if the redundancy version indicates that the configured uplink grant supports and/or applies to an initial transmission).

In one embodiment, when the first timer is running, the UE monitors PDCCH (e.g., the UE monitors on the PDCCH).

In one embodiment, when the first timer is running, the UE receives a dynamic uplink grant on the PDCCH.

In one embodiment, the UE retransmits the MAC PDU based on the dynamic uplink grant (received on the PDCCH).

In one embodiment, the configured uplink grant is part of a bundle of a second configured uplink grant.

In one embodiment, there are one or more second configured uplink grants in a bundle of a second configured uplink grant.

In one embodiment, the transmission number of a bundle is indicated by (and/or determined based on) a parameter (e.g., numberofrepetitions and/or repK) from the network.

In one embodiment, the configured uplink grant is a Type 1 configured uplink grant.

In one embodiment, the Type 1 configured uplink grant is configured by the network (via the configuration related to the one or more configured uplink grants, for example).

In one embodiment, the UE uses the Type 1 configured uplink grant after receiving the configuration (related to the one or more configured uplink grants, for example).

In one embodiment, the configured uplink grant is a Type 2 configured uplink grant.

In one embodiment, the Type 2 configured uplink grant is configured by the network (via the configuration related to the one or more configured uplink grants, for example).

In one embodiment, the UE uses the Type 2 configured uplink grant when (and/or after) receiving a signal for activation (of the Type 2 configured uplink grant, for example) and/or the UE uses the Type 2 configured uplink grant until the UE receives a signal for deactivation (of the Type 2 configured uplink grant, for example).

In one embodiment, a duration of the first timer corresponds to (e.g., is equal to and/or based on) a duration of time between a time at which the first timer is started and a latest expected time of reception of a grant for uplink retransmission (e.g., the duration of the first timer may be the maximum duration of time until a grant for uplink retransmission is received).

In one embodiment, the first timer is a DRX retransmission timer (e.g., drx-RetransmissionTimerUL)

In one embodiment, the configuration related to one or more configured uplink grants comprises ConfiguredGrantConfig (such as discussed in 3GPP TS 38.331 V16.0.0).

In one embodiment, the configuration related to bundled transmission comprises repK (such as discussed in 3GPP TS 38.331 V16.0.0).

In one embodiment, the configuration related to bundled transmission comprises numberOfRepetitions (such as discussed in 3GPP TS 38.331 V16.0.0).

Referring back to FIGS. 3 and 4, in one exemplary embodiment of a UE, the device 300 includes a program code 312 stored in the memory 310. The CPU 308 may execute program code 312 to enable the UE (i) to receive a configuration related to one or more configured uplink grants, (ii) to receive a configuration related to bundled transmission, (iii) to transmit a MAC PDU in a configured uplink grant, and (iv) to stop a first timer related to DRX in response to transmitting the MAC PDU. Furthermore, the CPU 308 can execute the program code 312 to perform one, some and/or all of the above-described actions and steps and/or others described herein.

Figure 11:
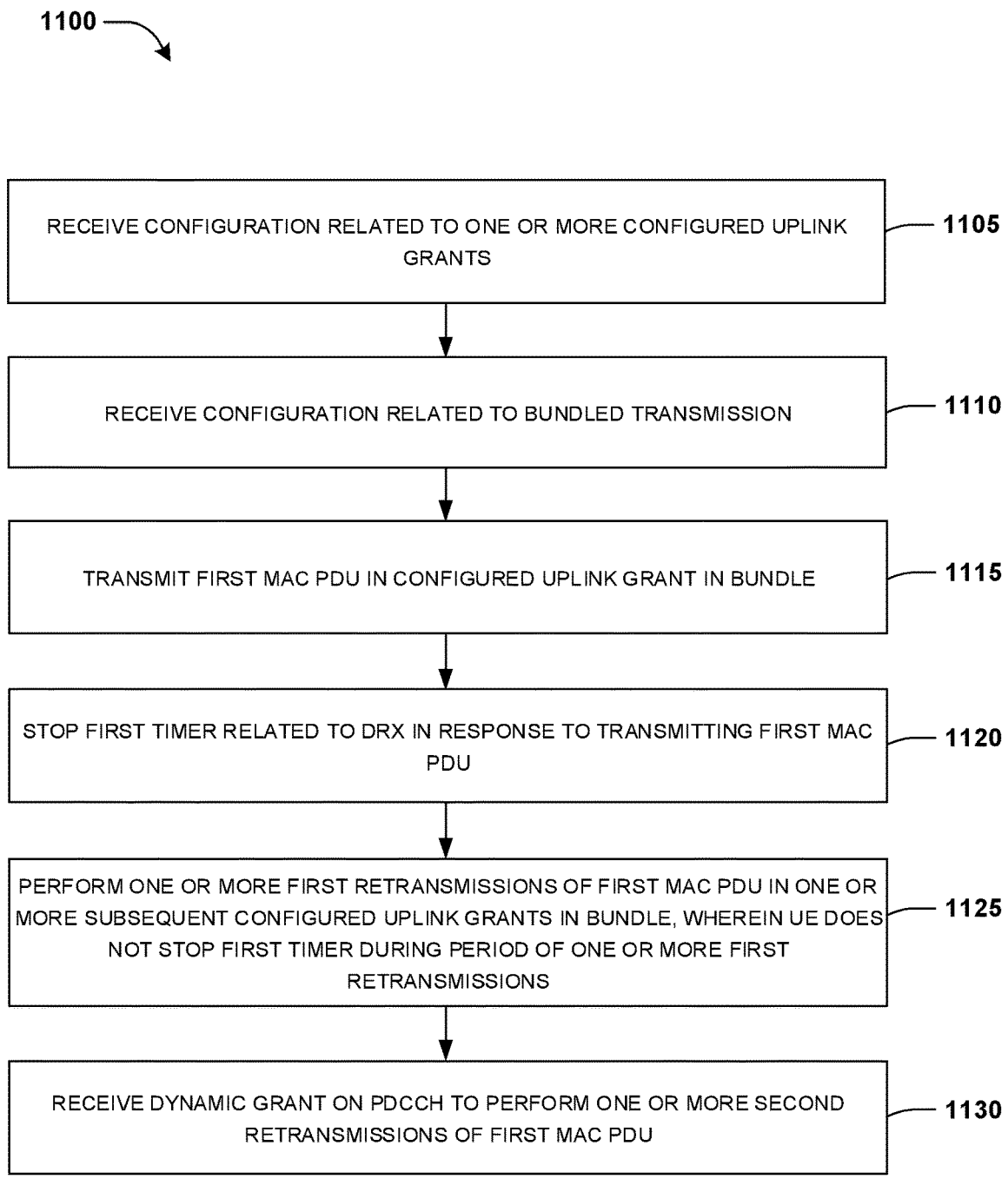
FIG. 11 is a flow chart according to one exemplary embodiment.

FIG. 11 is a flow chart 1100 according to one exemplary embodiment from the perspective of a UE. In step 1105, the UE receives a configuration related to one or more configured uplink grants. In step 1110, the UE receives a configuration related to bundled transmission. In step 1115, the UE transmits a first MAC PDU in a configured uplink grant in a bundle. In step 1120, the UE stops a first timer related to DRX in response to transmitting the first MAC PDU. In step 1125, the UE performs one or more first retransmissions of the first MAC PDU in one or more subsequent configured uplink grants in the bundle, wherein the UE does not stop the first timer during a period of the one or more first retransmissions (e.g., a period of time comprising the one or more first retransmissions). For example, the one or more first retransmissions of the first MAC PDU may be performed after transmitting the first MAC PDU in the configured uplink grant and/or the one or more subsequent configured uplink grants may be subsequent to the configured uplink grant. In step 1130, the UE receives a dynamic grant on PDCCH to perform one or more second retransmissions of the first MAC PDU (e.g., the dynamic grant may be used to perform one or more second retransmissions of the first MAC PDU). For example, the UE may receive the dynamic grant on the PDCCH by monitoring the PDCCH while the first timer is running.

Referring back to FIGS. 3 and 4, in one exemplary embodiment of a UE, the device 300 includes a program code 312 stored in the memory 310. The CPU 308 may execute program code 312 to enable the UE (i) to receive a configuration related to one or more configured uplink grants, (ii) to receive a configuration related to bundled transmission, (iii) to transmit a first MAC PDU in a configured uplink grant in a bundle, (iv) to stop a first timer related to DRX in response to transmitting the first MAC PDU, (v) to perform one or more first retransmissions of the first MAC PDU in one or more subsequent configured uplink grants in the bundle, wherein the UE does not stop the first timer during a period of the one or more first retransmissions (e.g., a period of time comprising the one or more retransmissions), and (vi) to receive a dynamic grant on PDCCH to perform one or more second retransmissions of the first MAC PDU. Furthermore, the CPU 308 can execute the program code 312 to perform one, some and/or all of the above-described actions and steps and/or others described herein.

Figure 12:
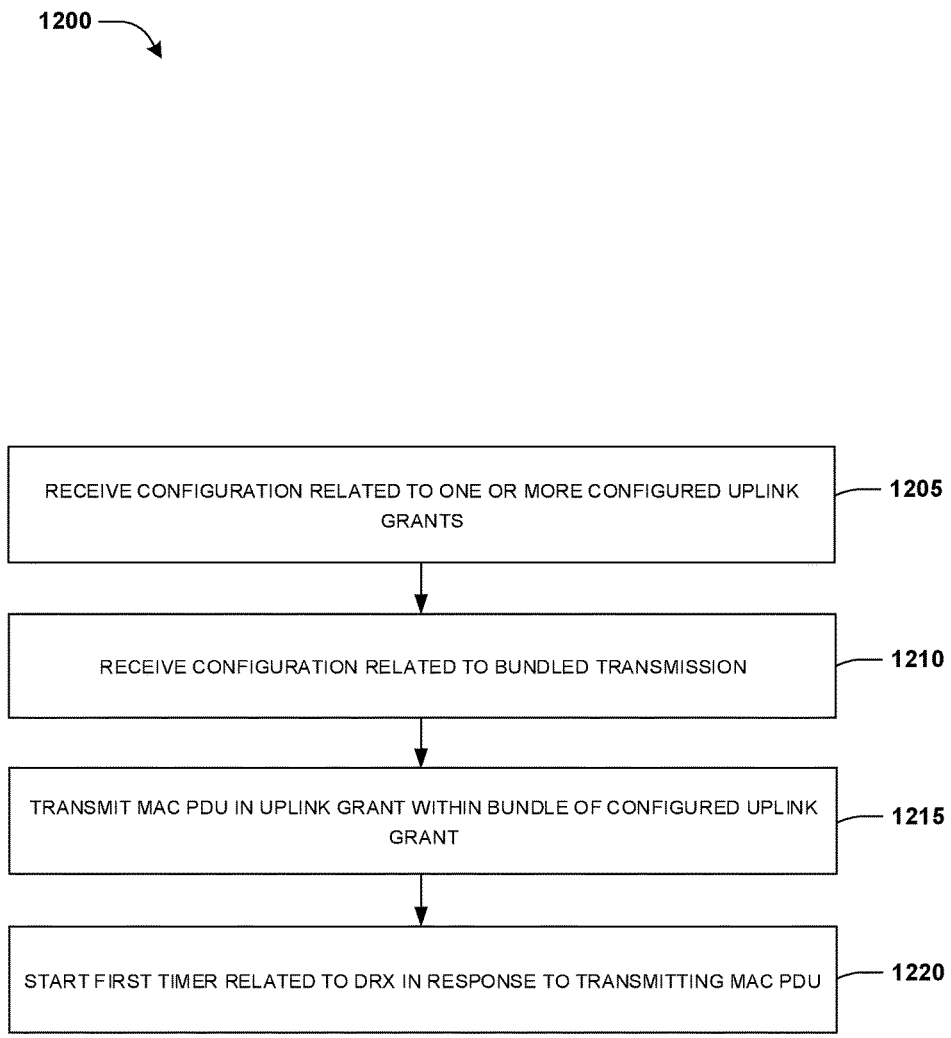
FIG. 12 is a flow chart according to one exemplary embodiment.

FIG. 12 is a flow chart 1200 according to one exemplary embodiment from the perspective of a UE. In step 1205, the UE receives a configuration related to one or more configured uplink grants. In step 1210, the UE receives a configuration related to bundled transmission. In step 1215, the UE transmits a MAC PDU in an uplink grant within a bundle of a configured uplink grant. In step 1220, the UE starts a first timer related to DRX in response to transmitting the MAC PDU.

In one embodiment, the UE stops a second timer related to DRX in response to transmitting the MAC PDU.

In one embodiment, the configuration related to one or more configured uplink grants comprises ConfiguredGrantConfig (such as discussed in 3GPP TS 38.331 V16.0.0).

In one embodiment, the configuration related to bundled transmission comprises repK (such as discussed in 3GPP TS 38.331 V16.0.0).

In one embodiment, the configuration related to bundled transmission comprises numberOfRepetitions (such as discussed in 3GPP TS 38.331 V16.0.0).

Referring back to FIGS. 3 and 4, in one exemplary embodiment of a UE, the device 300 includes a program code 312 stored in the memory 310. The CPU 308 may execute program code 312 to enable the UE (i) to receive a configuration related to one or more configured uplink grants, (ii) to receive a configuration related to bundled transmission, (iii) to transmit a MAC PDU in an uplink grant within a bundle of a configured uplink grant, and (iv) to start a first timer related to DRX in response to transmitting the MAC PDU. Furthermore, the CPU 308 can execute the program code 312 to perform one, some and/or all of the above-described actions and steps and/or others described herein.

Figure 13:
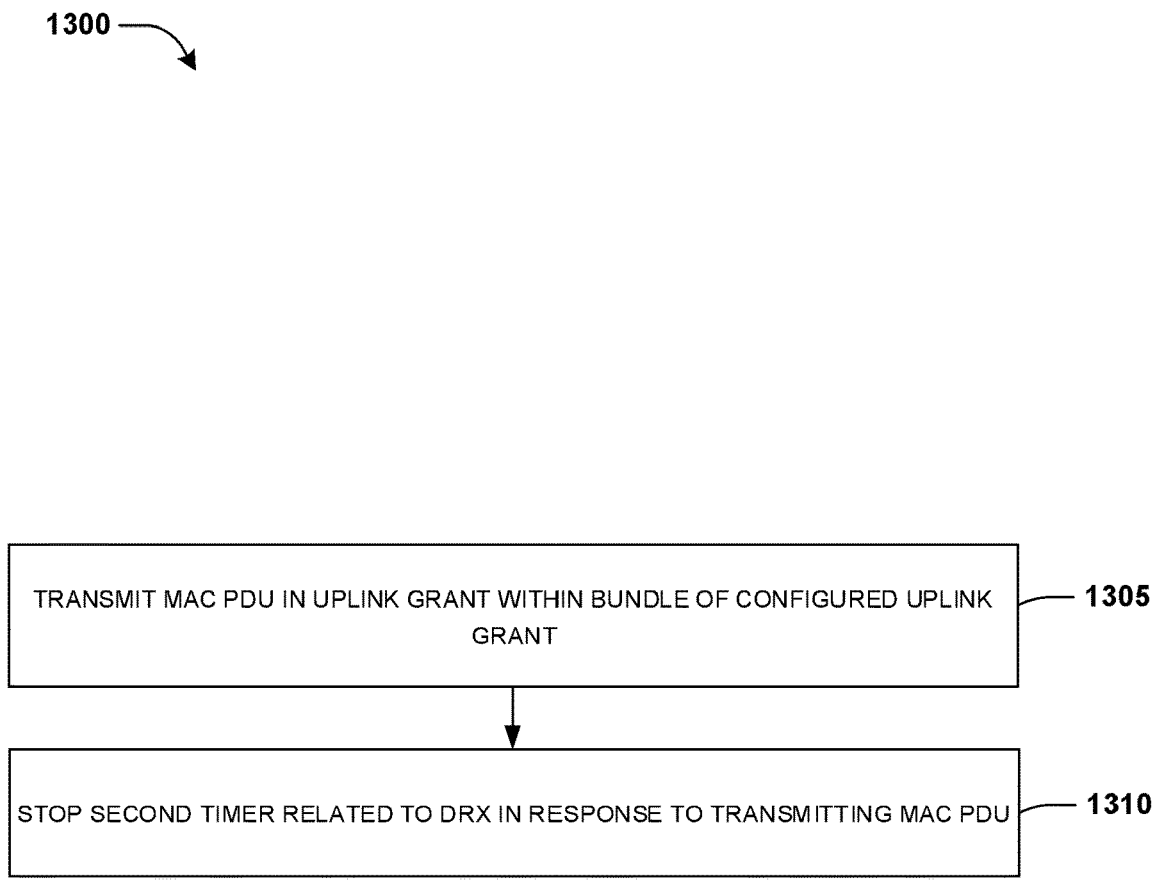
FIG. 13 is a flow chart according to one exemplary embodiment.

FIG. 13 is a flow chart 1300 according to one exemplary embodiment from the perspective of a UE. In step 1305, the UE transmits a MAC PDU in an uplink grant within a bundle of a configured uplink grant. In step 1310, the UE stops a second timer related to DRX in response to transmitting the MAC PDU.

In one embodiment, the UE starts a first timer related to DRX in response to transmitting the MAC PDU Referring back to FIGS. 3 and 4, in one exemplary embodiment of a UE, the device 300 includes a program code 312 stored in the memory 310. The CPU 308 may execute program code 312 to enable the UE (i) to transmit a MAC PDU in an uplink grant within a bundle of a configured uplink grant, and (ii) to stop a second timer related to DRX in response to transmitting the MAC PDU. Furthermore, the CPU 308 can execute the program code 312 to perform one, some and/or all of the above-described actions and steps and/or others described herein.

With respect to FIGS. 12-13, in one embodiment, the uplink grant is used for initial transmission of the bundle of the configured uplink grant.

In one embodiment, the MAC PDU of the bundle of the configured uplink grant is transmitted for the first time. For example, the transmission of the MAC PDU in the uplink grant within the bundle of the configured uplink grant may be the first time that the MAC PDU is transmitted by the UE (and/or the transmission may be an initial transmission of the MAC PDU).

In one embodiment, the MAC PDU is not available at the first transmission occasion of the bundle.

In one embodiment, the MAC PDU is not available when an initial uplink grant is delivered to a HARQ entity (of the UE, for example).

In one embodiment, the MAC PDU is available for the uplink grant within the bundle of the configured uplink grant.

In one embodiment, the uplink grant within the bundle of the configured uplink grant is in the middle of a second bundle of a second configured uplink grant (e.g., the uplink grant follows and/or is after one or more uplink grants of the second bundle and precedes and/or is before one or more uplink grants of the second bundle), wherein the second bundle is the same as or different than the bundle and the second configured uplink grant is the same as or different than the configured uplink grant.

In one embodiment, the uplink grant within the bundle of the configured uplink grant is part of a second bundle of a second configured uplink grant, wherein the second bundle is the same as or different than the bundle and the second configured uplink grant is the same as or different than the configured uplink grant.

In one embodiment, the uplink grant within the bundle of the configured uplink grant is part of multiple uplink grants, in a second bundle, that follow and/or are after an initial uplink grant is delivered to a HARQ entity (of the UE, for example), wherein the second bundle is the same as or different than the bundle. For example, the multiple uplink grants comprise the uplink grant within the bundle of the configured uplink grant.

In one embodiment, the uplink grant within the bundle of the configured uplink grant does not comprise an initial uplink grant delivered to a HARQ entity (of the UE, for example).

In one embodiment, the initial uplink grant is a second configured uplink grant.

In one embodiment, the transmission number of a bundle is indicated by (and/or determined based on) a parameter (e.g., numberofrepetitions and/or repK) from the network (e.g., the UE may receive the parameter from the network).

In one embodiment, the configured uplink grant is a Type 1 configured uplink grant.

In one embodiment, the Type 1 configured uplink grant is configured by the network (via the configuration related to the one or more configured uplink grants, for example).

In one embodiment, the UE uses the Type 1 configured uplink grant after receiving the configuration (related to the one or more configured uplink grants, for example).

In one embodiment, the configured uplink grant is a Type 2 configured uplink grant.

In one embodiment, the Type 2 configured uplink grant is configured by the network (via the configuration related to the one or more configured uplink grants, for example).

In one embodiment, the UE uses the Type 2 configured uplink grant when (and/or after) receiving a signal for activation (of the Type 2 configured uplink grant, for example) and/or the UE uses the Type 2 configured uplink grant until the UE receives a signal for deactivation (of the Type 2 configured uplink grant, for example).

In one embodiment, a duration of the first timer corresponds to (e.g., is equal to and/or based on) a duration of time between a time at which the first timer is started and an earliest expected time of reception of an uplink HARQ retransmission grant (e.g., the duration of the first timer may be the minimum duration of time until an uplink HARQ retransmission grant is expected).

In one embodiment, the first timer is a DRX HARQ RTT timer (e.g., drx-HARQ-RTT-TimerUL).

In one embodiment, a duration of the second timer corresponds to (e.g., is equal to and/or based on) a duration of time between a time at which the second timer is started and a latest expected time of reception of a grant for uplink retransmission (e.g., the duration of the second timer may be the maximum duration of time until a grant for uplink retransmission is received).

In one embodiment, the second timer is a DRX retransmission timer (e.g., drx-RetransmissionTimerUL).

In one embodiment, when the second timer is running, the UE monitors PDCCH (e.g., the UE monitors on the PDCCH).

In one embodiment, when the second timer is running, the UE receives a dynamic uplink grant on the PDCCH.

In one embodiment, the UE retransmits the MAC PDU based on the dynamic uplink grant (received on the PDCCH).

Figure 14:
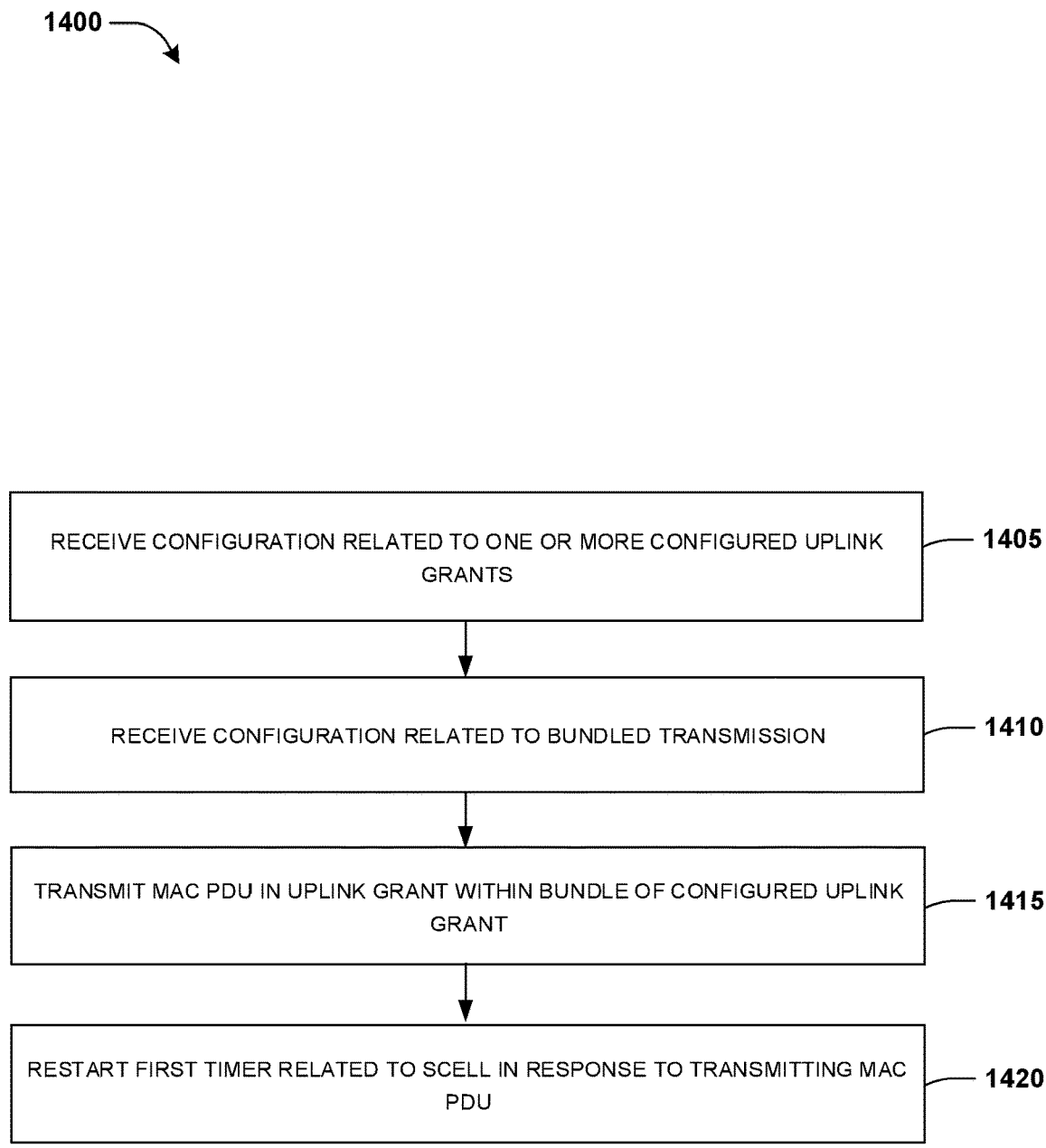
FIG. 14 is a flow chart according to one exemplary embodiment.

FIG. 14 is a flow chart 1400 according to one exemplary embodiment from the perspective of a UE. In step 1405, the UE receives a configuration related to one or more configured uplink grants. In step 1410, the UE receives a configuration related to bundled transmission. In step 1415, the UE transmits a MAC PDU in an uplink grant within a bundle of a configured uplink grant. In step 1420, the UE restarts a first timer related to SCell in response to transmitting the MAC PDU.

In one embodiment, the uplink grant is used for initial transmission of the bundle of the configured uplink grant.

In one embodiment, the MAC PDU of the bundle of the configured uplink grant is transmitted for the first time. For example, the transmission of the MAC PDU in the uplink grant within the bundle of the configured uplink grant may be the first time that the MAC PDU is transmitted by the UE (and/or the transmission may be an initial transmission of the MAC PDU).

In one embodiment, the MAC PDU is not available at the first transmission occasion of the bundle.

In one embodiment, the MAC PDU is not available when an initial uplink grant is delivered to a HARQ entity (of the UE, for example).

In one embodiment, the MAC PDU is available for the uplink grant within the bundle of the configured uplink grant.

In one embodiment, the uplink grant within the bundle of the configured uplink grant is in the middle of a second bundle of a second configured uplink grant (e.g., the uplink grant follows and/or is after one or more uplink grants of the second bundle and precedes and/or is before one or more uplink grants of the second bundle), wherein the second bundle is the same as or different than the bundle and the second configured uplink grant is the same as or different than the configured uplink grant.

In one embodiment, the uplink grant within the bundle of the configured uplink grant is part of a second bundle of a second configured uplink grant, wherein the second bundle is the same as or different than the bundle and the second configured uplink grant is the same as or different than the configured uplink grant.

In one embodiment, the uplink grant within the bundle of the configured uplink grant is part of multiple uplink grants, in a second bundle, that follow and/or are after an initial uplink grant is delivered to a HARQ entity (of the UE, for example), wherein the second bundle is the same as or different than the bundle. For example, the multiple uplink grants comprise the uplink grant within the bundle of the configured uplink grant.

In one embodiment, the uplink grant within the bundle of the configured uplink grant does not comprise an initial uplink grant delivered to a HARQ entity (of the UE, for example).

In one embodiment, the initial uplink grant is a second configured uplink grant.

In one embodiment, the transmission number of a bundle is indicated by (and/or determined based on) a parameter (e.g., numberofrepetitions and/or repK) from the network (e.g., the UE may receive the parameter from the network).

In one embodiment, the configured uplink grant is a Type 1 configured uplink grant.

In one embodiment, the Type 1 configured uplink grant is configured by the network (via the configuration related to the one or more configured uplink grants, for example).

In one embodiment, the UE uses the Type 1 configured uplink grant after receiving the configuration (related to the one or more configured uplink grants, for example).

In one embodiment, the configured uplink grant is a Type 2 configured uplink grant.

In one embodiment, the Type 2 configured uplink grant is configured by the network (via the configuration related to the one or more configured uplink grants, for example).

In one embodiment, the UE uses the Type 2 configured uplink grant when (and/or after) receiving a signal for activation (of the Type 2 configured uplink grant, for example) and/or the UE uses the Type 2 configured uplink grant until the UE receives a signal for deactivation (of the Type 2 configured uplink grant, for example).

In one embodiment, a duration of the first timer corresponds to (e.g., is equal to and/or based on) a duration of time between a time at which the first timer is started and a latest expected time that a transmission occurs on a SCell (e.g., the duration of the first timer may be the maximum duration until a transmission occurs on a SCell).

In one embodiment, the first timer is a SCell deactivation timer (e.g., sCellDeactivationTimer).

In one embodiment, the configuration related to one or more configured uplink grants comprises ConfiguredGrantConfig (such as discussed in 3GPP TS 38.331 V16.0.0).

In one embodiment, the configuration related to bundled transmission comprises repK (such as discussed in 3GPP TS 38.331 V16.0.0).

In one embodiment, the configuration related to bundled transmission comprises numberOfRepetitions (such as discussed in 3GPP TS 38.331 V16.0.0).

Referring back to FIGS. 3 and 4, in one exemplary embodiment of a UE, the device 300 includes a program code 312 stored in the memory 310. The CPU 308 may execute program code 312 to enable the UE (i) to receive a configuration related to one or more configured uplink grants, (ii) to receive a configuration related to bundled transmission, (iii) to transmit a MAC PDU in an uplink grant within a bundle of a configured uplink grant, and (iv) to restart a first timer related to SCell in response to transmitting the MAC PDU. Furthermore, the CPU 308 can execute the program code 312 to perform one, some and/or all of the above-described actions and steps and/or others described herein.

Figure 15:
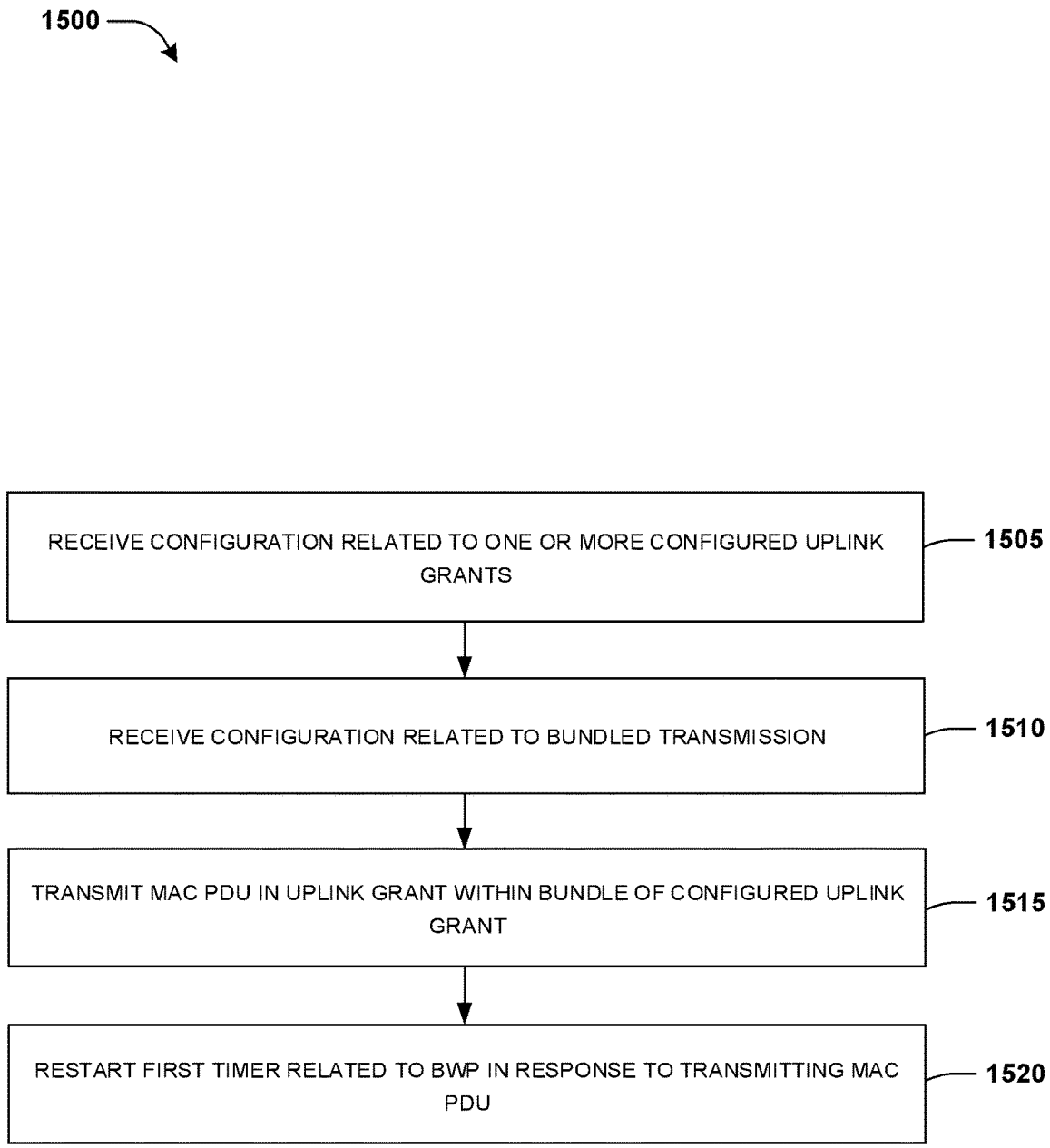
FIG. 15 is a flow chart according to one exemplary embodiment.

FIG. 15 is a flow chart 1500 according to one exemplary embodiment from the perspective of a UE. In step 1505, the UE receives a configuration related to one or more configured uplink grants. In step 1510, the UE receives a configuration related to bundled transmission. In step 1515, the UE transmits a MAC PDU in an uplink grant within a bundle of a configured uplink grant. In step 1520, the UE restarts a first timer related to BWP in response to transmitting the MAC PDU.

In one embodiment, the uplink grant is used for initial transmission of the bundle of the configured uplink grant.

In one embodiment, the MAC PDU of the bundle of the configured uplink grant is transmitted for the first time. For example, the transmission of the MAC PDU in the uplink grant within the bundle of the configured uplink grant may be the first time that the MAC PDU is transmitted by the UE (and/or the transmission may be an initial transmission of the MAC PDU).

In one embodiment, the MAC PDU is not available at the first transmission occasion of the bundle.

In one embodiment, the MAC PDU is not available when an initial uplink grant is delivered to a HARQ entity (of the UE, for example).

In one embodiment, the MAC PDU is available for the uplink grant within the bundle of the configured uplink grant.

In one embodiment, the uplink grant within the bundle of the configured uplink grant is in the middle of a second bundle of a second configured uplink grant (e.g., the uplink grant follows and/or is after one or more uplink grants of the second bundle and precedes and/or is before one or more uplink grants of the second bundle), wherein the second bundle is the same as or different than the bundle and the second configured uplink grant is the same as or different than the configured uplink grant.

In one embodiment, the uplink grant within the bundle of the configured uplink grant is part of a second bundle of a second configured uplink grant, wherein the second bundle is the same as or different than the bundle and the second configured uplink grant is the same as or different than the configured uplink grant.

In one embodiment, the uplink grant within the bundle of the configured uplink grant is part of multiple uplink grants, in a second bundle, that follow and/or are after an initial uplink grant is delivered to a HARQ entity (of the UE, for example), wherein the second bundle is the same as or different than the bundle. For example, the multiple uplink grants comprise the uplink grant within the bundle of the configured uplink grant.

In one embodiment, the uplink grant within the bundle of the configured uplink grant does not comprise an initial uplink grant delivered to a HARQ entity (of the UE, for example).

In one embodiment, the initial uplink grant is a second configured uplink grant.

In one embodiment, the transmission number of a bundle is indicated by (and/or determined based on) a parameter (e.g., numberofrepetitions and/or repK) from the network (e.g., the UE may receive the parameter from the network).

In one embodiment, the configured uplink grant is a Type 1 configured uplink grant.

In one embodiment, the Type 1 configured uplink grant is configured by the network (via the configuration related to the one or more configured uplink grants, for example).

In one embodiment, the UE uses the Type 1 configured uplink grant after receiving the configuration (related to the one or more configured uplink grants, for example).

In one embodiment, the configured uplink grant is a Type 2 configured uplink grant.

In one embodiment, the Type 2 configured uplink grant is configured by the network (via the configuration related to the one or more configured uplink grants, for example).

In one embodiment, the UE uses the Type 2 configured uplink grant when (and/or after) receiving a signal for activation (of the Type 2 configured uplink grant, for example) and/or the UE uses the Type 2 configured uplink grant until the UE receives a signal for deactivation (of the Type 2 configured uplink grant, for example).

In one embodiment, a duration of the first timer corresponds to (e.g., is equal to and/or based on) a duration of time between a time at which the first timer is started and a latest expected time that a transmission occurs on a BWP (e.g., the duration of the first timer may be the maximum duration until a transmission occurs on a BWP).

In one embodiment, the first timer is a BWP inactivity timer (e.g., bwp-InactivityTimer).

In one embodiment, the configuration related to one or more configured uplink grants comprises ConfiguredGrantConfig (such as discussed in 3GPP TS 38.331 V16.0.0).

In one embodiment, the configuration related to bundled transmission comprises repK (such as discussed in 3GPP TS 38.331 V16.0.0).

In one embodiment, the configuration related to bundled transmission comprises numberOfRepetitions (such as discussed in 3GPP TS 38.331 V16.0.0).

Referring back to FIGS. 3 and 4, in one exemplary embodiment of a UE, the device 300 includes a program code 312 stored in the memory 310. The CPU 308 may execute program code 312 to enable the UE (i) to receive a configuration related to one or more configured uplink grants, (ii) to receive a configuration related to bundled transmission, (iii) to transmit a MAC PDU in an uplink grant within a bundle of a configured uplink grant, and (iv) to restart a first timer related to BWP in response to transmitting the MAC PDU. Furthermore, the CPU 308 can execute the program code 312 to perform one, some and/or all of the above-described actions and steps and/or others described herein.

Figure 16:
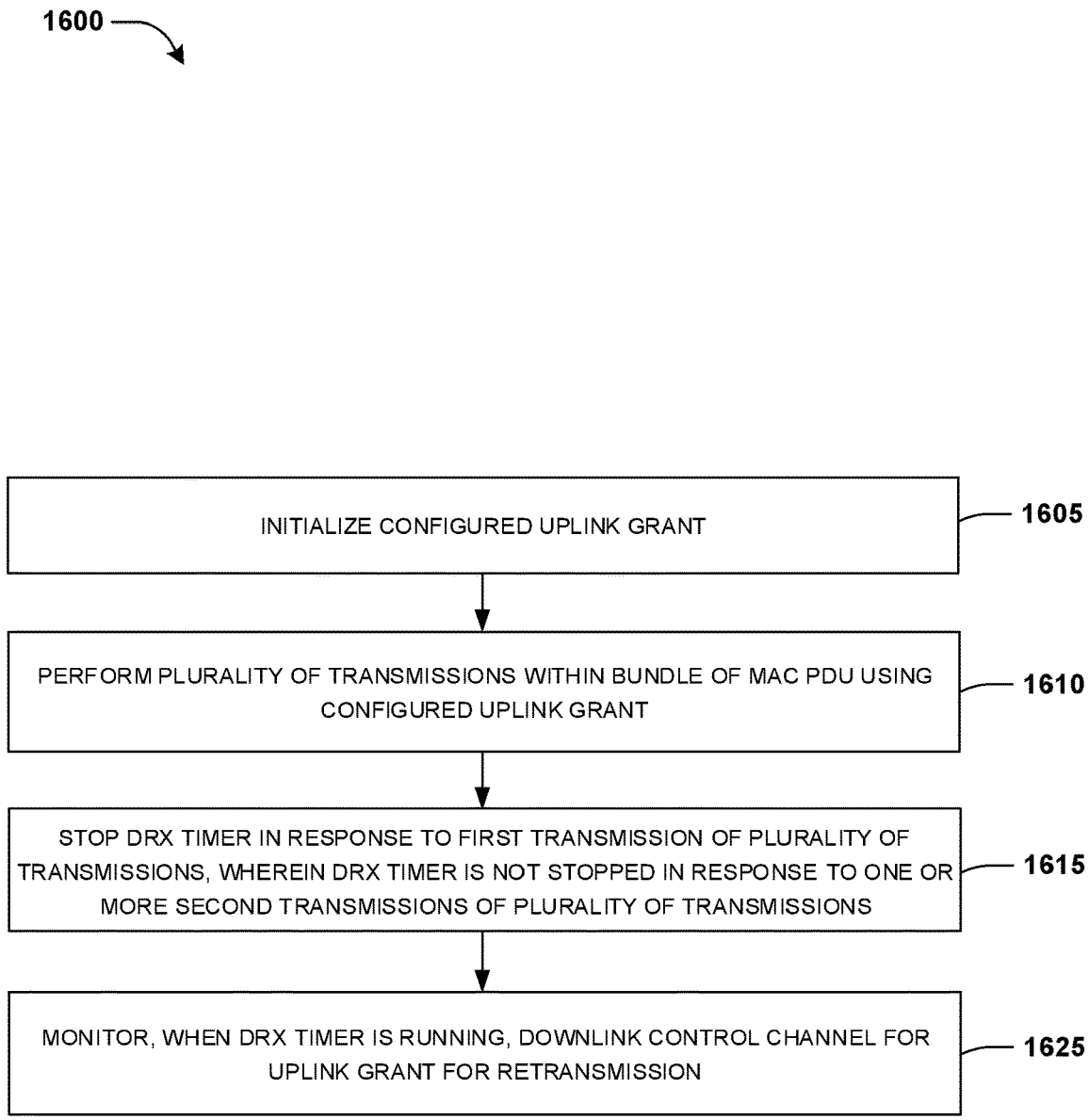
FIG. 16 is a flow chart according to one exemplary embodiment.

FIG. 16 is a flow chart 1600 according to one exemplary embodiment from the perspective of a UE configured with bundled transmission. In step 1605, the UE initializes a configured uplink grant. In step 1610, the UE performs a plurality of transmissions within a bundle of a MAC PDU using the configured uplink grant. In step 1615, the UE stops a DRX timer in response to a first transmission of the plurality of transmissions, wherein the DRX timer is not stopped in response to one or more second transmissions of the plurality of transmissions. In step 1620, when the DRX timer is running, the UE monitors a downlink control channel for an uplink grant for retransmission (e.g., retransmission of the MAC PDU).

In one embodiment, the one or more second transmissions comprise transmissions, of the plurality of transmissions and/or the bundle, other than the first transmission (e.g., the one or more second transmissions may comprise all transmissions, of the plurality of transmissions and/or the bundle, other than the first transmission).

In one embodiment, the first transmission is an earliest transmission within the bundle (e.g., the first transmission is sequentially and/or temporally the first transmission, such as an initial and/or earliest transmission of the plurality of transmissions and/or the bundle).

In one embodiment, the one or more second transmissions are one or more retransmissions of the first transmission.

In one embodiment, the DRX timer is stopped at the first transmission (e.g., the DRX timer is stopped at the beginning of and/or during the first transmission).

In one embodiment, the UE starts a HARQ RTT timer in response to (and/or after completion of) the first transmission and the UE starts the DRX timer in response to expiration of the HARQ RTT timer (e.g., HARQ RTT timer expiry).

In one embodiment, a duration of the HARQ RTT timer corresponds to (e.g., is equal to and/or based on) a duration of time between a time at which the HARQ RTT timer is started and an earliest expected time of reception of an uplink HARQ retransmission grant (e.g., the duration the HARQ RTT timer may be/corresponds to the minimum duration of time before an uplink HARQ retransmission grant is expected). In an example, the duration of the HARQ RTT timer is a duration of time that the HARQ RTT timer runs between the HARQ RTT timer starting and the HARQ RTT timer expiring.

In one embodiment, the DRX timer is started before a transmission of the one or more second transmissions is performed. In an example, the DRX timer may be started before multiple transmissions of the one or more second transmissions are performed.

In one embodiment, a duration of the DRX timer corresponds to a duration of time between a time at which the DRX timer is started and a latest expected time of reception of the uplink grant for retransmission (e.g., the DRX timer may be/corresponds to the maximum duration of time until the uplink grant for retransmission is received).

In one embodiment, the DRX timer is drx-RetransmissionTimerUL.

In one embodiment, the UE does not receive a Listen Before Talk (LBT) failure indication (e.g., no LBT failure indication is received by the UE). For example, the UE may not receive a LBT failure indication (e.g., no LBT failure indication may be received by the UE) after initializing the configured uplink grant and/or before the plurality of transmissions are performed and/or completed.

In one embodiment, the UE initializes the configured uplink grant in response to (and/or when, after and/or upon) receiving a configuration of the configured uplink grant.

In one embodiment, the UE initializes the configured uplink grant in response to (and/or when, after and/or upon) receiving a signal for activation of the configured uplink grant.

Referring back to FIGS. 3 and 4, in one exemplary embodiment of a UE, the device 300 includes a program code 312 stored in the memory 310. The CPU 308 may execute program code 312 to enable the UE (i) to initialize a configured uplink grant, (ii) to perform a plurality of transmissions within a bundle of a MAC PDU using the configured uplink grant, (iii) to stop a DRX timer in response to a first transmission of the plurality of transmissions, wherein the DRX timer is not stopped in response to one or more second transmissions of the plurality of transmissions, and (iv) to monitor, when the DRX timer is running, a downlink control channel for an uplink grant for retransmission. Furthermore, the CPU 308 can execute the program code 312 to perform one, some and/or all of the above-described actions and steps and/or others described herein.

A communication device (e.g., a UE, a base station, a network node, etc.) may be provided, wherein the communication device may comprise a control circuit, a processor installed in the control circuit and/or a memory installed in the control circuit and coupled to the processor. The processor may be configured to execute a program code stored in the memory to perform method steps illustrated in FIGS. 10-16. Furthermore, the processor may execute the program code to perform one, some and/or all of the above-described actions and steps and/or others described herein.

A computer-readable medium may be provided. The computer-readable medium may be a non-transitory computer-readable medium. The computer-readable medium may comprise a flash memory device, a hard disk drive, a disc (e.g., a magnetic disc and/or an optical disc, such as at least one of a digital versatile disc (DVD), a compact disc (CD), etc.), and/or a memory semiconductor, such as at least one of static random access memory (SRAM), dynamic random access memory (DRAM), synchronous dynamic random access memory (SDRAM), etc. The computer-readable medium may comprise processor-executable instructions, that when executed cause performance of one, some and/or all method steps illustrated in FIGS. 10-16, and/or one, some and/or all of the above-described actions and steps and/or others described herein.

It may be appreciated that applying one or more of the techniques presented herein may result in one or more benefits including, but not limited to, increased efficiency of communication between devices (e.g., a UE and/or a network), such as where the UE is configured with bundled transmission. The increased efficiency may be a result of at least one of enabling the UE to monitor PDCCH when data is transmitted in a bundle of a configured uplink grant, enabling the UE to avoid deactivating a SCell on which data is transmitted in a bundle of a configured uplink grant, enabling the UE to avoid deactivating an active BWP on which data is transmitted in a bundle of a configured uplink grant, etc. Accordingly, the UE may receive information (e.g., HARQ information and/or an uplink grant for retransmission) that the UE may otherwise not be able to receive without using one or more of the techniques herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based on design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Alternatively and/or additionally, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method of a User Equipment (UE) configured with bundled transmission, the method comprising:
  initializing a configured uplink grant;
  performing a first transmission and a following one or more transmissions within a bundle of a Medium Access Control Protocol Data Unit (MAC PDU) using the configured uplink grant;
  stopping a Discontinuous Reception (DRX) timer in response to the first transmission, within the bundle of the MAC PDU, performed using the configured uplink grant and not stopping the DRX timer in response to the following one or more transmissions, within the bundle of the MAC PDU, performed using the configured uplink grant; and
  monitoring, when the DRX timer is running, a downlink control channel for an uplink grant for retransmission.

2. The method of claim 1, wherein:
the first transmission is an earliest transmission within the bundle.

3. The method of claim 1, wherein:
the following one or more transmissions are one or more retransmissions of the first transmission.

4. The method of claim 1, wherein:
the stopping the DRX timer is performed at the first transmission.

5. The method of claim 1, comprising:
starting a Hybrid Automatic Repeat Request (HARQ) Round-Trip Time (RTT) timer in response to the first transmission; and
starting the DRX timer in response to expiration of the HARQ RTT timer.

6. The method of claim 5, wherein:
a duration of the HARQ RTT timer corresponds to a minimum duration before a UL HARQ retransmission grant is expected.

7. The method of claim 1, comprising:
starting the DRX timer before a transmission of the following one or more transmissions is performed.

8. The method of claim 1, wherein:
a duration of the DRX timer corresponds to a maximum duration until a grant for UL retransmission is received.

9. The method of claim 1, wherein:
the DRX timer is drx-RetransmissionTimerUL.

10. The method of claim 1, wherein:
the UE does not receive a Listen Before Talk (LBT) failure indication.

11. A User Equipment (UE) configured with bundled transmission, the UE comprising:
a control circuit;
a processor installed in the control circuit; and
a memory installed in the control circuit and operatively coupled to the processor, wherein the processor is configured to execute a program code stored in the memory to perform operations, the operations comprising:
initializing a configured uplink grant;
performing a first transmission and a following one or more following transmissions within a bundle of a Medium Access Control Protocol Data Unit (MAC PDU) using the configured uplink grant;
stopping a Discontinuous Reception (DRX) timer in response to the first transmission, within the bundle of the MAC PDU, performed using the configured uplink grant and not stopping the DRX timer in response to the following one or more transmissions, within the bundle of the MAC PDU, performed using the configured uplink grant; and
monitoring, when the DRX timer is running, a downlink control channel for an uplink grant for retransmission.

12. The UE of claim 11, wherein:
the first transmission is an earliest transmission within the bundle.

13. The UE of claim 11, wherein:
the following one or more transmissions are one or more retransmissions of the first transmission.

14. The UE of claim 11, wherein:
the stopping the DRX timer is performed at the first transmission.

15. The UE of claim 11, the operations comprising:
starting a Hybrid Automatic Repeat Request (HARQ) Round-Trip Time (RTT) timer in response to the first transmission; and
starting the DRX timer in response to expiration of the HARQ RTT timer.

16. The UE of claim 15, wherein:
a duration of the HARQ RTT timer corresponds to a minimum duration before a UL HARQ retransmission grant is expected.

17. The UE of claim 11, the operations comprising:
starting the DRX timer before a transmission of the following one or more transmissions is performed.

18. The UE of claim 11, wherein:
a duration of the DRX timer corresponds to a maximum duration until a grant for UL retransmission is received.

19. The UE of claim 11, wherein:
the DRX timer is drx-RetransmissionTimerUL.

20. A non-transitory computer-readable medium comprising processor-executable instructions that when executed by a User Equipment (UE) configured with bundled transmission cause performance of operations, the operations comprising:
initializing a configured uplink grant;
performing a first transmission and a following one or more transmissions within a bundle of a Medium Access Control Protocol Data Unit (MAC PDU) using the configured uplink grant;
stopping a Discontinuous Reception (DRX) timer in response to the first transmission, within the bundle of the MAC PDU, performed using the configured uplink grant and not stopping the DRX timer in response to the following one or more transmissions, within the bundle of the MAC PDU, performed using the configured uplink grant; and
monitoring, when the DRX timer is running, a downlink control channel for an uplink grant for retransmission.

* * * * *